United States Patent
Zhang et al.

(10) Patent No.: US 10,920,021 B2
(45) Date of Patent: Feb. 16, 2021

(54) SILICONE COMPOSITIONS

(71) Applicant: Saint-Gobain Performance Plastics Corporation, Solon, OH (US)

(72) Inventors: Jianfeng Zhang, Shrewsbury, MA (US); Michael J. Tzivanis, Chicopee, MA (US); Xipeng Liu, Concord, MA (US); Jian L. Ding, Glastonbury, CT (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 0 days.

(21) Appl. No.: 16/148,766

(22) Filed: Oct. 1, 2018

(65) Prior Publication Data

US 2019/0031932 A1  Jan. 31, 2019

Related U.S. Application Data

(60) Provisional application No. 62/565,870, filed on Sep. 29, 2017, provisional application No. 62/612,336, (Continued)

(51) Int. Cl.
  *C09J 183/06* (2006.01)
  *C08L 83/06* (2006.01)
  (Continued)

(52) U.S. Cl.
  CPC .............. *C08G 77/08* (2013.01); *C08L 83/06* (2013.01); *C09J 183/06* (2013.01); *C08G 77/12* (2013.01); *C08G 77/14* (2013.01)

(58) Field of Classification Search
  CPC combination set(s) only.
  See application file for complete search history.

(56) References Cited

U.S. PATENT DOCUMENTS

| 6,743,883 | B1* | 6/2004 | Frances | ................ A61K 6/0017 106/35 |
| 2003/0139287 | A1* | 7/2003 | Deforth | .................. C08G 77/08 502/202 |

(Continued)

FOREIGN PATENT DOCUMENTS

| EP | 3031845 A1 | 6/2016 |
| EP | 3118277 A1 | 1/2017 |

(Continued)

OTHER PUBLICATIONS

"Metal-Free Room-temperature Vulcanization of Silicones via Borane Hydrosilylation" authored by Sample et al. published in Macromolecules (2019) 52, 7244-7250.*

(Continued)

*Primary Examiner* — Marc S Zimmer
(74) *Attorney, Agent, or Firm* — McDonnell Boehnen Hulbert & Berghoff LLP

(57) ABSTRACT

This disclosure relates to polymerizable silicone compositions, methods for polymerizing such compositions, and to polymerized silicone compositions formed thereby. In one embodiment, a polymerizable composition includes one or more first organosiloxanes or organosilanes, each comprising a plurality of silicon hydride functional groups, one or more second organosiloxanes or organosilanes, each comprising a plurality of reactive heterocycloalkyl functional groups; and one or more third organosiloxanes or organosilanes, each comprising at least about one silicon hydride functional group and at least about one reactive heterocycloalkyl functional group; and an effective amount of a borane catalyst, present, for example, in an amount within the range of 0.0005 wt % to about 10 wt %, wherein the ratio of reactive heterocycloalkyl functional groups to reactive silicon hydride functional groups in the composition is in the (Continued)

range of 1:5 to 5:1. The compositions and methods are useful, for example, in adhesive and sealing applications.

30 Claims, 5 Drawing Sheets

Related U.S. Application Data filed on Dec. 30, 2017, provisional application No. 62/612,337, filed on Dec. 30, 2017, provisional application No. 62/612,338, filed on Dec. 30, 2017.

(51) Int. Cl.
*C08G 77/08* (2006.01)
*C08G 77/14* (2006.01)
*C08G 77/12* (2006.01)

(56) References Cited

U.S. PATENT DOCUMENTS

| | | | |
|---|---|---|---|
| 2004/0127668 A1* | 7/2004 | Rubinsztajn | C07G 1/00 528/12 |
| 2009/0156776 A1 | 6/2009 | Rubinsztajn et al. | |
| 2016/0166495 A1 | 6/2016 | Sarkar et al. | |
| 2016/0369058 A1 | 12/2016 | Zhang et al. | |

FOREIGN PATENT DOCUMENTS

| | | |
|---|---|---|
| WO | WO 02/092665 A1 | 11/2002 |
| WO | WO 02/092717 A1 * | 11/2002 |
| WO | WO 2019/068093 A1 * | 4/2019 |

OTHER PUBLICATIONS

"Boron-Catalyzed Silylative Reduction of Quinolines: Selective sp3 C—Si Bond Formation" authored by Gandhamsetty et al. and published in the Journal of the American Chemical Society (2014) 136, 16780-16783.*
"Piers' Borane-mediated Hydrosilylation of Epoxides and Cyclic Ethers" authored by Zhang et al. and published in Chemical Communications (2018) 54, 7243-7246.*
"Precise Synthesis of Poly(silphenylsiloxane)s with Epoxy Side Funcitonal Groups by Tris(pentafluorophenyl)borane as a Catalyst" authored by Xue et al. and published in Polymer Journal (2007) 39(4), 379-388.*
Grande, John B. et al., "Testing theFunctional Tolerance of the Piers-Rubinsztajn Reaction: A New Strategy for Functional Silicones," Chem. Commun.,, 2010, 46, 4988-4990.
International Search Report issued in co-pending International Patent Application No. PCT/US2018/053774, ISA/KR (Korean Patent Office) dated Jan. 29, 2019, 4 pages.
Written Opinion issued in co-pending International Patent Application No. PCT/US2018/053774, ISA/KR (Korean Patent Office) dated Jan. 29, 2019, 6 pages.
James Blackwell, "Mechanistic Studies of B(C6F5)3-catalyzed Reactions of Si and Sn Reagents," Dissertation, Department of Chemistry, University of Calgary, Dec. 2001.

* cited by examiner

SILICONE COMPOSITIONS

CROSS-REFERENCE TO RELATED APPLICATIONS

This application claims the benefit of priority of U.S. Provisional Patent Applications No. 62/565,870, filed Sep. 29, 2017; No. 62/612,336, filed Dec. 30, 2017; No. 62/612,337, filed Dec. 30, 2017; and No. 62/612,338, filed Dec. 30, 2017, each of which is hereby incorporated herein by reference in its entirety.

BACKGROUND OF THE DISCLOSURE

Field of the Disclosure

This disclosure relates generally to silicone compositions. More particularly, the present disclosure relates to polymerizable silicone compositions, methods for polymerizing such compositions, and to polymerized silicone compositions formed thereby, including compositions useful as adhesives (including pressure-sensitive adhesives), sealants and release materials.

Technical Background

Silicones, also known as polysiloxanes, are polymers that include any inert, synthetic compound made up of repeating units of siloxane, which is a chain of alternating silicon atoms and oxygen atoms, frequently combined with carbon and hydrogen. Silicones are widely used in applications including electronics, household goods, automobiles, and cosmetics.

While linear silicones of any molecular weight are fluidic due to the flexibility of silicon-oxygen bonds, silicones can be polymerized, or crosslinked (i.e., cured or vulcanized), to provide, for example, liquids, elastomers, gels, hard plastics, and resins, for use in applications such as sealants, adhesives, lubricants, thermal and electrical insulation, cooking utensils, etc.

Silicones are conventionally crosslinked via peroxide curing, addition curing, and condensation curing. Peroxide curing, often utilized to cure molded or extruded high-consistency silicone rubber (HCR), involves thermally decomposing peroxides to provide free radicals that initiate crosslinking between silicones. Peroxides such as di-aralkyl peroxides, alkyl-aralkyl peroxides, and di-alkyl peroxides decompose at relatively low temperatures, but provide radicals capable of forming crosslinks between an alkyl group and a vinyl group. Non-vinyl specific peroxides, such as diacyl peroxides and peroxy esters, provide radicals capable of forming crosslinks between two alkyl groups, but decompose only at relatively high temperatures. Peroxides are normally included in amounts of about 1% of a composition to achieve effective curing. While some, or even most, of the decomposed peroxide derivatives are consumed during processing and/or post-curing at elevated temperatures, byproducts that may be undesirable in, for example, medical or pharmaceutical applications remain in the silicone composition.

Addition curing of silicones involves a metal-catalyzed addition reaction between a vinyl group and a silicon hydride group (i.e., hydrosilylation). Addition-cured compositions are conventionally provided as two-part kits including a catalyst and vinyl-functionalized silicone composition, and a vinyl-silicone and silicon-hydride-functionalized silicone composition. Platinum is the most widely used hydrosilylation catalyst for addition curing processes. Platinum-catalyzed addition curing, which does not form volatile byproducts, is useful for both HCR and liquid silicone rubber (LCR) applications, but requires a costly, sensitive catalyst material. Platinum is also very sensitive to certain contaminants in epoxy, natural rubber, PVC, and moisture cure silicones, and the application on these substrates is limited. Moreover, the efficiency of the crosslinking reaction necessitates the use of inhibitors, such as acetylenic alcohols, or fumarate- or maleate-based compounds, the inclusion of which increases the temperature required to drive the crosslinking reaction.

Condensation curing of silicones involves the reaction of a hydroxyl group and a silane. For example, methyltriacetoxysilane, upon exposure to moisture, hydrolyzes to form hydroxyl groups, which can subsequently form crosslinks with other hydroxyl groups, such as those on a hydroxyl-terminated silicone. Such condensation-cured compositions can be provided as one-part kits that cure upon exposure to atmospheric moisture. Because diffusion of atmospheric moisture through a silicon composition is limited, however, it can be difficult to cure portions of the composition more than, for example, about 10 mm below the surface of the composition. To ensure that condensation-cured silicone compositions are fully crosslinked, an organometallic tin catalyst can be included with the crosslinker, separate from the polymer in a two-part condensation system; however, the toxicity of tin greatly limits the applications for which silicones cured by such means may be used. Moreover, in all condensation curing processes, loss of volatile byproducts causes significant volume shrinkage.

Radiation curing of silicones may involve for example, the reaction of epoxides (i.e., a cationic curing mechanism), the reaction of acrylates (a free radical curing mechanism), the reaction of an unsaturated aliphatic group (e.g., a vinyl group) and a thiol group, etc. UV light can be used as an energy source for all chemistries, with these reactions requiring the use of a photoinitiator. E-beam is restricted to free radical chemistry and may be used without a photoinitiator. Radiation curing has advantages in curing control, but the photoinitiators used could be very sensitive to the environmental humidity. In addition, using E-beam and UV light requires certain safety precautions.

Moreover, use of curable materials as adhesives or sealants brings a special set of issues. It is typically desirable for adhesives to have a long pot life, i.e., the time during which the uncured material remains workable so that it can be dispensed and disposed on the body or bodies to which it is to adhere. But, at the same time, it is desirable for an adhesive or sealant to have a relatively fast cure rate, so that, once started, adhesion does not take too long a time. On top of this, adhesives and sealants have to have desirable mechanical and adhesive properties to make them suitable for use.

Silicone-based pressure-sensitive adhesive compositions are very versatile because they exhibit good adhesion to a variety of substrates including glass, ceramic, vinyl siding, finished wood, and painted drywall under challenging environmental conditions, including temperature and humidity extremes. But, pressure-sensitive adhesives require a delicate balance of viscous and elastic properties that impact adhesion, cohesion, stretchiness and elasticity. While numerous silicone-based pressure-sensitive adhesive compositions are available, advances in end use requirements continues to drive a need for new adhesive compositions and tape constructions. In addition to performance properties, environmental regulations and processing costs also influence the adhesive production requirements.

Many silicone-based pressure-sensitive adhesive compositions are coated onto a release liner. Release liners, thus, provide a variety of functions for pressure-sensitive adhesive compositions including, e.g., preventing contamination of the adhesive layer and facilitating handling of the adhesive or an adhesive-coated article. A release liner is often left in place on a pressure-sensitive adhesive composition is adhered to another substrate. The release liner, therefore, may experience a variety of environmental conditions including changes in temperature and humidity. As a result, the release liner must be functional over extended periods of time.

The strength of the adhesive bond formed between a silicone-based pressure-sensitive adhesive composition and a release material (e.g., in the form of a liner) tends to increase over time and upon exposure to elevated temperatures. This is known as "adhesion build." If the strength of the bond between the adhesive composition and the release liner is too great, the release liner and the adhesive composition cannot be separated from each other or can be separated only with difficulty, rendering the adhesive unsuitable for its intended purpose. One of decreasing the degree of adhesion build method involves altering the surface chemistry of the liner by coating the liner with a surface chemistry modifier, such as fluorosilicones. While the current methods have reduced the adhesion levels, adhesion build continues to occur.

More generally, providing a material suitable for use as a release material is an especial challenge, because it is necessary to provide a desirably low release force while simultaneously providing other desirable properties to the material (e.g., fast cure, long pot life, desirable mechanical and thermal properties).

Accordingly, there remains a need for a silicone curing process that does not require a sensitive and/or toxic catalyst, does not result in significant volume shrinkage, does not provide undesirable crosslinking byproducts, and/or provides an evenly cured silicone composition, especially suitable for use as an adhesive (e.g., a pressure-sensitive adhesive), a sealant, or a release material.

SUMMARY OF THE DISCLOSURE

One aspect of the disclosure is a polymerizable composition that includes
one or more organosiloxanes or organosilanes, the one or more organosiloxanes or organosilanes comprising one or more of
one or more first organosiloxanes or organosilanes, each comprising a plurality of silicon hydride functional groups, present in an amount within the range of about 0.05 wt % to about 99.95 wt %;
one or more second organosiloxanes or organosilanes, each comprising a plurality of reactive heterocycloalkyl functional groups, present in an amount within the range of about 0.05 wt % to about 99.95 wt %; and
one or more third organosiloxanes or organosilanes, each comprising at least about one silicon hydride functional group and at least about one reactive heterocycloalkyl functional group, present in an amount within the range of about 0.05 wt % to about 99.9999 wt %,
an effective amount of a borane catalyst, present, for example, in an amount within the range of 0.0005 wt % to about 10 wt %,
wherein the ratio of reactive heterocycloalkyl functional groups to reactive silicon hydride functional groups in the composition is in the range of 1:5 to 5:1.

In certain additional aspects of the disclosure, the polymerizable composition as described above, when polymerized, has a release force of no more than about 200 gf/inch (e.g., no more than about 100 gf/inch, no more than about 75 gf/inch, no more than about 50 gf/inch, no more than about 25 gf/inch, no more than about 10 gf/inch, or no more than about 5 gf/inch) as measured by PSTC 4 test procedure.

Another aspect of the disclosure is the use of a polymerized composition of the disclosure as a release material, e.g., in the form of a release layer. Such a release material can be formed, e.g., as a coating or film on a surface of an article. Such release materials can be used in, for example, life science applications, electronic devices such as a microelectronic device, electrooptic devices, and products for retail and consumer applications and industrial applications. The release material can be configured, e.g., as a release liner for an adhesive such as a pressure-sensitive adhesive.

Another aspect of the disclosure is a polymerized composition that is the polymerization product of a polymerizable composition as described herein.

Another aspect of the disclosure is a polymerizable composition that includes
one or more organosiloxanes or organosilanes, the one or more organosiloxanes or organosilanes comprising one or more of
one or more first organosiloxanes or organosilanes, each comprising a plurality of silicon hydride functional groups, present in an amount within the range of about 0.05 wt % to about 90 wt %;
one or more second organosiloxanes or organosilanes, each comprising a plurality of reactive heterocycloalkyl functional groups, present in an amount within the range of about 0.05 wt % to about 90 wt %; and
one or more third organosiloxanes or organosilanes, each comprising at least about one silicon hydride functional group and at least about one reactive heterocycloalkyl functional group, present in an amount within the range of about 0.05 wt % to about 90 wt %;
one or more tackifiers, present in an amount within the range of about 10 wt % to about 99.95 wt %; and
an effective amount of a borane catalyst, present, for example, in an amount within the range of 0.0005 wt % to about 10 wt %,
wherein the ratio of reactive heterocycloalkyl functional groups to reactive silicon hydride functional groups in the composition is in the range of 1:5 to 5:1.

In certain such embodiments, the tackifier is present in an amount in the range of about 20 wt % to about 75 wt % of the composition.

Another aspect of the disclosure is a pressure-sensitive adhesive that is the polymerization product of a polymerizable composition as described herein.

Another aspect of the disclosure is a pressure-sensitive adhesive that includes
a polymerization product of a polymerizable composition comprising
one or more organosiloxanes or organosilanes, the one or more organosiloxanes or organosilanes comprising one or more of one or more first organosiloxanes or organosilanes, each comprising a plurality of silicon hydride functional groups, present in an amount within the range of about 0.05 wt % to about 90 wt %;

one or more second organosiloxanes or organosilane, each comprising a plurality of reactive heterocycloalkyl functional groups, present in an amount within the range of about 0.05 wt % to about 90 wt %; and one or more third organosiloxanes or organosilanes, each comprising at least about one silicon hydride functional group and at least about one reactive heterocycloalkyl functional group, present in an amount within the range of about 0.05 wt % to about 90 wt %; and an effective amount of a borane catalyst, present, for example, in an amount within the range of 0.0005 wt % to about 10 wt %, wherein the ratio of reactive heterocycloalkyl functional groups to reactive silicon hydride functional groups in the composition is in the range of 1:5 to 5:1; and one or more tackifiers, present in an amount within the range of about 10 wt % to about 99.95 wt %.

In certain such embodiments, the tackifier is present in an amount in the range of about 20 wt % to about 75 wt % of the composition.

Another aspect of the disclosure is an article comprising:
a substrate; and
a pressure-sensitive adhesive or release material as described herein disposed on the substrate.

The articles of the disclosure can further include a release liner, e.g., disposed on a layer of pressure-sensitive adhesive opposite the substrate.

Another aspect of the disclosure is a method for preparing an article of the disclosure, the method comprising:
disposing a polymerizable composition of the disclosure onto a substrate; and
polymerizing the polymerizable composition to provide a pressure-sensitive adhesive disposed on the substrate.

Another aspect of the disclosure is the use of a polymerized composition of the disclosure in a product for a life science application, an electronic device such as a microelectronic device, or an electrooptic device.

Another aspect of the disclosure is the use of a polymerized composition of the disclosure in a product for retail and consumer applications (sealants and adhesives), and industrial applications (e.g., construction, fluid system, and automotive applications).

Another aspect of the disclosure is an electrooptic device that includes:
an electrooptic die;
a die attachment material adhering the electrooptic die to a substrate; and
an encapsulant material encapsulating the electrooptic die,
one or more of the die attachment material and the encapsulant material being a polymerized composition as described herein.

Another aspect of the disclosure is an electrooptic device that includes:
an electrooptic die;
a die attachment material adhering the electrooptic die to a substrate; and
an encapsulant material encapsulating the electrooptic die; and an optic material disposed on the encapsulant and configured in an operative optical beam path of the electrooptic die,
one or more of the die attachment material, the optic material and the encapsulant material being a polymerized composition as described herein.

Another aspect of the disclosure is an article comprising:
a first surface;
a second surface; and
a polymerized composition adhering or sealing the first surface to the second surface, wherein the polymerized composition is a polymerization product of a polymerizable composition comprising:
one or more organosiloxanes or organosilanes, the one or more organosiloxanes or organosilanes comprising one or more of
one or more first organosiloxanes or organosilanes, each comprising a plurality of silicon hydride functional groups, present in an amount within the range of about 0.05 wt % to about 99.95 wt %;
one or more second organosiloxanes or organosilanes, each comprising a plurality of reactive heterocycloalkyl functional groups, present in an amount within the range of about 0.05 wt % to about 99.95 wt %; and
one or more third organosiloxanes or organosilanes, each comprising at least about one silicon hydride functional group and at least about one reactive heterocycloalkyl functional group, present in an amount within the range of about 0.05 wt % to about 99.9999 wt %;
an effective amount of a borane catalyst, present, for example, in an amount within the range of 0.0005 wt % to about 10 wt %,
wherein the ratio of reactive heterocycloalkyl functional groups to reactive silicon hydride functional groups in the composition is in the range of 1:5 to 5:1.

Another aspect of the disclosure is a method for affixing or sealing a first surface to a second surface to prepare the article of the disclosure, the method comprising
disposing a polymerizable composition such that it is in contact with the first surface and the second surface; and then
polymerizing the polymerizable composition to adhere or seal the first surface to the second surface,
wherein the polymerizable composition comprises:
one or more organosiloxanes or organosilanes, the one or more organosiloxanes or organosilanes comprising one or more of
one or more first organosiloxanes or organosilanes, each comprising a plurality of silicon hydride functional groups, present in an amount within the range of about 0.05 wt % to about 99.95 wt %;
one or more second organosiloxanes or organosilane, each comprising a plurality of reactive heterocycloalkyl functional groups, present in an amount within the range of about 0.05 wt % to about 99.95 wt %; and
one or more third organosiloxanes or organosilanes, each comprising at least about one silicon hydride functional group and at least about one reactive heterocycloalkyl functional group, present in an amount within the range of about 0.05 wt % to about 99.9999 wt %; and an effective amount of a borane catalyst, present, for example, in an amount within the range of 0.0005 wt % to about 10 wt %, wherein the ratio of reactive heterocycloalkyl functional groups to reactive silicon hydride functional groups in the composition is in the range of 1:5 to 5:1.

Other aspects of the disclosure will be apparent from the description provided herein.

DETAILED DESCRIPTION

Figure 1:
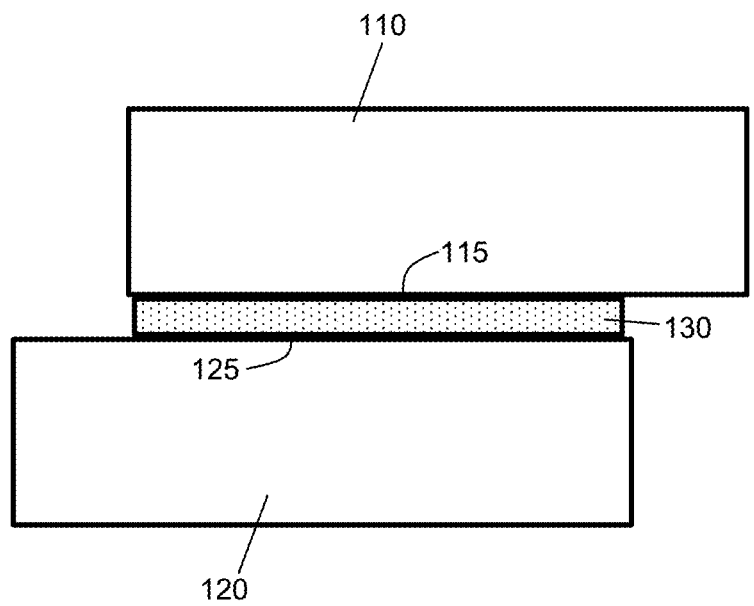
FIG. 1 is a schematic cross-sectional view of an article according to one embodiment of the disclosure.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

Terms used herein may be preceded and/or followed by a single dash, "—", or a double dash, "═", to indicate the bond order of the bond between the named substituent and its parent moiety; a single dash indicates a single bond and a double dash indicates a double bond or a pair of single bonds in the case of a spiro-substituent. In the absence of a single or double dash it is understood that a single bond is formed between the substituent and its parent moiety; further, substituents are intended to be read "left to right" unless a dash indicates otherwise. For example, arylalkyl, arylalkyl-, and -alkylaryl indicate the same functionality.

For simplicity, chemical moieties are defined and referred to throughout primarily as univalent chemical moieties (e.g., alkyl, aryl, etc.). Nevertheless, such terms are also used to convey corresponding multivalent moieties under the appropriate structural circumstances clear to those skilled in the art. For example, while an "alkyl" moiety can refer to a monovalent radical (e.g. $CH_3$—$CH_2$—), in some circumstances a bivalent linking moiety can be "alkyl," in which case those skilled in the art will understand the alkyl to be a divalent radical (e.g., —$CH_2$—$CH_2$—), which is equivalent to the term "alkylene." (Similarly, in circumstances in which a divalent moiety is required and is stated as being "aryl," those skilled in the art will understand that the term "aryl" refers to the corresponding divalent moiety, arylene). All atoms are understood to have their normal number of valences for bond formation (i.e., 4 for carbon, 3 for N, 2 for O, and 2, 4, or 6 for S, depending on the oxidation state of the S). Nitrogens in the presently disclosed compounds can be hypervalent, e.g., an N-oxide or tetrasubstituted ammonium salt. On occasion a moiety may be defined, for example, as —B-(A)$_a$, wherein a is 0 or 1. In such instances, when a is 0 the moiety is —B and when a is 1 the moiety is —B-A.

As used herein, the term "hydrocarbon" includes linear hydrocarbons, branched hydrocarbons, acyclic hydrocarbons, alicyclic hydrocarbons, and aromatic hydrocarbons, including, for example, alkyl, alkoxy, alkoxyalkyl alkenyl, alkynyl, aryl, heteroaryl, heterocycloalkyl, and cycloalkyl. A "hydrocarbonylene" is a divalent hydrocarbon radical (i.e., with two attachment points). In certain desirable embodiments, each hydrocarbonylene does not include a carbon-carbon double bond. Particular desirable hydrocarbonylene moieties include —($C_1$-$C_6$alkyl)-, —($C_1$-$C_6$alkyl)-O—. —O—($C_1$-$C_6$alkyl)-, and —($C_1$-$C_6$alkyl)-O—($C_1$-$C_6$alkyl)-. Each alkyl in these moieties can be unsubstituted, or in other embodiments can be substituted by one or two ═O or —OH groups. In each and every embodiment as described herein that includes a hydrocarbylene moiety, each such hydrocarbonylene moiety can be selected from the moieties described above.

As used herein, the term "alkyl" includes a saturated hydrocarbon having a designed number of carbon atoms, such as 1 to 10 carbons (i.e., inclusive of 1 and 10), 1 to 8 carbons, 1 to 6 carbons, 1 to 3 carbons, or 1, 2, 3, 4, 5 or 6. Alkyl group may be straight or branched and depending on context, may be a monovalent radical or a divalent radical (i.e., an alkylene group). For example, the moiety "—($C_1$-$C_6$alkyl)-O—" signifies connection of an oxygen through an alkylene bridge having from 1 to 6 carbons and $C_1$-$C_3$alkyl represents methyl, ethyl, and propyl moieties. Examples of "alkyl" include, for example, methyl, ethyl, propyl, isopropyl, butyl, iso-, sec-, and tert-butyl, pentyl, and hexyl.

The term "alkoxy" represents an alkyl group of an indicated number of carbon atoms attached to the parent molecular moiety through an oxygen bridge. Examples of "alkoxy" include, for example, methoxy, ethoxy, propoxy, and isopropoxy.

As used herein, the term "alkenyl" includes unsaturated hydrocarbons containing from 2 to 10 carbons (i.e., inclusive of 2 and 10), 2 to 8 carbons, 2 to 6 carbons, or 2, 3, 4, 5, or 6, unless otherwise specified, and containing at least one carbon-carbon double bond. An alkenyl group may be straight or branched and depending on context, may be a monovalent radical or a divalent radical (i.e., an alkenylene group). For example, the moiety "—($C_2$-$C_6$ alkenyl)-O—" signifies connection of an oxygen through an alkenylene bridge having from 2 to 6 carbons. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, and 3,7-dimethylocta-2,6-dienyl.

As used herein, the term "alkynyl" includes unsaturated hydrocarbons containing from 2 to 10 carbons (i.e., inclusive of 2 and 10), 2 to 8 carbons, 2 to 6 carbons, or 2, 3, 4, 5, or 6, unless otherwise specified, and containing at least one carbon-carbon triple bond. An alkynyl group may be straight or branched and depending on context, may be a monovalent radical or a divalent radical (i.e., an alkynylene group). For example, the moiety "—($C_2$-$C_6$ alkynyl)-O—" signifies connection of an oxygen through an alkynylene bridge having from 2 to 6 carbons. Representative examples of alkynyl include, but are not limited to, acetylenyl, 1-propynyl, 2-propynyl, 3-butynyl, 2-pentynyl, and 1-butynyl.

The term "aryl" represents an aromatic ring system having a single ring (e.g., phenyl) which is optionally fused to other aromatic hydrocarbon rings or non-aromatic hydrocarbon or heterocycle rings. "Aryl" includes ring systems having multiple condensed rings and in which at least one is carbocyclic and aromatic, (e.g., 1,2,3,4-tetrahydronaphthyl, naphthyl). Examples of aryl groups include phenyl, 1-naphthyl, 2-naphthyl, indanyl, indenyl, dihydronaphthyl, fluorenyl, tetralinyl, and 6,7,8,9-tetrahydro-5H-benzo[a]cycloheptenyl. "Aryl" also includes ring systems having a first carbocyclic, aromatic ring fused to a nonaromatic heterocycle, for example, 1H-2,3-dihydrobenzofuranyl and tetrahydroisoquinolinyl. The aryl groups herein are unsubstituted or, when specified as "optionally substituted", can, unless stated otherwise, be substituted in one or more substitutable positions with various groups, as indicated.

The terms "halogen" or "halo" indicate fluorine, chlorine, bromine, and iodine.

The term "heteroaryl" refers to an aromatic ring system containing at least one heteroatom selected from nitrogen, oxygen and sulfur. Most commonly, the heteroaryl groups will have 1, 2, 3, or 4 heteroatoms. The heteroaryl may be fused to one or more non-aromatic rings, for example, cycloalkyl or heterocycloalkyl rings, wherein the cycloalkyl and heterocycloalkyl rings are described herein. In one embodiment of the present compounds the heteroaryl group is bonded to the remainder of the structure through an atom in a heteroaryl group aromatic ring. In another embodiment, the heteroaryl group is bonded to the remainder of the structure through a non-aromatic ring atom. Examples of heteroaryl groups include, for example, pyridyl, pyrimidinyl, quinolinyl, benzothienyl, indolyl, indolinyl, pyridazinyl, pyrazinyl, isoindolyl, isoquinolyl, quinazolinyl, quinoxalinyl, phthalazinyl, imidazolyl, isoxazolyl, pyrazolyl, oxazolyl, thiazolyl, indolizinyl, indazolyl, benzothiazolyl, benzimidazolyl, benzofuranyl, furanyl, thienyl, pyrrolyl, oxadiazolyl, thiadiazolyl, benzo[1,4]oxazinyl, triazolyl, tetrazolyl, isothiazolyl, naphthyridinyl, isochromanyl, chromanyl, isoindolinyl, isobenzothienyl, benzoxazolyl, pyridopyridinyl, purinyl, benzodioxolyl, triazinyl, pteridinyl, benzothiazolyl, imidazopyridinyl, imidazothiazolyl, benzisoxazinyl, benzoxazinyl, benzopyranyl, benzothiopyranyl, chromonyl, chromanonyl, pyridinyl-N-oxide, isoindolinonyl, benzodioxanyl, benzoxazolinonyl, pyrrolyl N-oxide, pyrimidinyl N-oxide, pyridazinyl N-oxide, pyrazinyl N-oxide, quinolinyl N-oxide, indolyl N-oxide, indolinyl N-oxide, isoquinolyl N-oxide, quinazolinyl N-oxide, quinoxalinyl N-oxide, phthalazinyl N-oxide, imidazolyl N-oxide, isoxazolyl N-oxide, oxazolyl N-oxide, thiazolyl N-oxide, indolizinyl N-oxide, indazolyl N-oxide, benzothiazolyl N-oxide, benzimidazolyl N-oxide, pyrrolyl N-oxide, oxadiazolyl N-oxide, thiadiazolyl N-oxide, triazolyl N-oxide, tetrazolyl N-oxide, benzothiopyranyl S-oxide, benzothiopyranyl S,S-dioxide. Preferred heteroaryl groups include pyridyl, pyrimidyl, quinolinyl, indolyl, pyrrolyl, furanyl, thienyl and imidazolyl, pyrazolyl, indazolyl, thiazolyl and benzothiazolyl. In certain embodiments, each heteroaryl is selected from pyridyl, pyrimidinyl, pyridazinyl, pyrazinyl, imidazolyl, isoxazolyl, pyrazolyl, oxazolyl, thiazolyl, furanyl, thienyl, pyrrolyl, oxadiazolyl, thiadiazolyl, triazolyl, tetrazolyl, isothiazolyl, pyridinyl-N-oxide, pyrrolyl N-oxide, pyrimidinyl N-oxide, pyridazinyl N-oxide, pyrazinyl N-oxide, imidazolyl N-oxide, isoxazolyl N-oxide, oxazolyl N-oxide, thiazolyl N-oxide, pyrrolyl N-oxide, oxadiazolyl N-oxide, thiadiazolyl N-oxide, triazolyl N-oxide, and tetrazolyl N-oxide. Preferred heteroaryl groups include pyridyl, pyrimidyl, quinolinyl, indolyl, pyrrolyl, furanyl, thienyl, imidazolyl, pyrazolyl, indazolyl, thiazolyl and benzothiazolyl. The heteroaryl groups herein are unsubstituted or, when specified as "optionally substituted," can, unless stated otherwise, be substituted in one or more substitutable positions with various groups, as indicated.

The term "heterocycloalkyl" refers to a non-aromatic ring or ring system containing at least one heteroatom that is selected from nitrogen, oxygen and sulfur, wherein said heteroatom is in a non-aromatic ring. The heterocycloalkyl may have 1, 2, 3, or 4 heteroatoms. The heterocycloalkyl may be saturated (i.e., a heterocycloalkyl) or partially unsaturated (i.e., a heterocycloalkenyl). Heterocycloalkyl includes monocyclic groups of 3 to 8 annular atoms as well as bicyclic and polycyclic ring systems, including bridged and fused systems, wherein each ring includes 3 to 8 annular atoms. The heterocycloalkyl ring is optionally fused to other heterocycloalkyl rings and/or non-aromatic hydrocarbon rings. In certain embodiments, the heterocycloalkyl groups have from 3 to 7 members in a single ring. In other embodiments, heterocycloalkyl groups have 5 or 6 members in a single ring. In some embodiments, the heterocycloalkyl groups have 3, 4, 5, 6, or 7 members in a single ring. Examples of heterocycloalkyl groups include, for example, azabicyclo[2.2.2]octyl, azabicyclo[3.2.1]octyl, 2,5-diazabicyclo[2.2.1]heptyl, morpholinyl, thiomorpholinyl, thiomorpholinyl S-oxide, thiomorpholinyl S,S-dioxide, 2-oxazolidonyl, piperazinyl, homopiperazinyl, piperazinonyl, pyrrolidinyl, azepanyl, azetidinyl, pyrrolinyl, tetrahydropyranyl, piperidinyl, tetrahydrofuranyl, tetrahydrothienyl, 3,4-dihydroisoquinolin-2(1H)-yl, isoindolindionyl, homopiperidinyl, homomorpholinyl, homothiomorpholinyl, homothiomorpholinyl S,S-dioxide, oxazolidinonyl, dihydropyrazolyl, dihydropyrrolyl, dihydropyrazinyl, dihydropyridinyl, dihydropyrimidinyl, dihydrofuryl, dihydropyranyl, imidazolidonyl, tetrahydrothienyl S-oxide, tetrahydrothienyl S,S-dioxide and homothiomorpholinyl S-oxide. Heterocycloalkyl groups include morpholinyl, 3,4-dihydroisoquinolin-2(1H)-yl, tetrahydropyranyl, piperidinyl, aza-bicyclo[2.2.2]octyl, γ-butyrolactonyl (i.e., an oxo-substituted tetrahydrofuranyl), γ-butyrolactamyl (i.e., an oxo-substituted pyrrolidine), pyrrolidinyl, piperazinyl, azepanyl, azetidinyl, thiomorpholinyl, thiomorpholinyl S,S-dioxide, 2-oxazolidonyl, imidazolidonyl, isoindolindionyl, piperazinonyl. The heterocycloalkyl groups herein are unsubstituted or, when specified as "optionally substituted," can, unless stated otherwise, be substituted in one or more substitutable positions with various groups, as indicated.

Specifically, "reactive heterocycloalkyl" refer to heterocycloalkyl groups that are reactive to borane-catalyzed hydrosilylation. Reactive heterocycloalkyl groups include cyclic ethers such as, for example, epoxides and oxetanes, and cyclic thioethers, such as episulfide groups. In certain embodiments as disclosed herein, "reactive heterocycloalkyl" refers herein to epoxide functional groups.

The term "cycloalkyl" refers to a non-aromatic carbocyclic ring or ring system, which may be saturated (i.e., a cycloalkyl) or partially unsaturated (i.e., a cycloalkenyl). The cycloalkyl ring optionally may be fused to or otherwise attached (e.g., bridged systems) to other cycloalkyl rings. Certain examples of cycloalkyl groups present in the disclosed compounds have from 3 to 7 members in a single ring, such as having 5 or 6 members in a single ring. In some embodiments, the cycloalkyl groups have 3, 4, 5, 6, or 7 members in a single ring. Examples of cycloalkyl groups include, for example, cyclohexyl, cyclopentyl, cyclobutyl, cyclopropyl, tetrahydronaphthyl and bicyclo[2.2.1]heptane. The cycloalkyl groups herein are unsubstituted or, when specified as "optionally substituted," may be substituted in one or more substitutable positions with various groups, as indicated.

The term "siloxane" refers to the functional group Si—O—Si. The term "siloxane" may refer to disiloxane, i.e., $R_3Si$—O—Si—$R_3$, or polysiloxane, i.e., $R_3Si$—O—$[SiR_2$—$O]_n$—$SiR_3$, wherein n is at least one. As used herein, the term "siloxane" includes cyclic polysiloxanes. The term "siloxane repeat unit" refers to the repeating —$[SiR_2$—O]— units comprising a polysiloxane.

The term "organosiloxane" refers to compounds including the siloxane functional group, i.e., Si—O—Si, wherein one or more silicon atom is bound to carbon and/or hydrogen, e.g., $R_3Si$—O—Si—$R_3$ or $R_3Si$—O—$[SiR_2$—O]n-$SiR_3$, wherein at least one R includes carbon and/or hydrogen. For example, hexamethyldisiloxane, poly(dimethylsiloxane), and methyl hydrosiloxane-dimethylsiloxane copolymer are organosiloxanes.

The term "silane" refers to saturated chemical compounds including one or multiple silicon atoms linked to each other or one or multiple atoms of other chemical elements as the tetrahedral centers of multiple single bonds. The person of ordinary skill in the art will appreciate that certain siloxanes, e.g., tetrakis(dimethylsilyl) orthosilicate, may also be referred to as silanes.

The term "organosilane" refers to silanes, wherein one or more silicon atoms is bound to carbon and/or hydrogen. For example, tetrakis(dimethylsilyl) orthosilicate and tetramethyl silane are organosilanes.

The term "hydride" refers to a hydrogen functional group bonded to a more electropositive element or group. For example, calcium hydride and sodium hydride both comprise hydride functional groups. In another example, trimethylsilane and hydride-terminated poly(dimethylsiloxane) both comprise hydride functional groups.

The term "epoxide" refers to a three-membered ring having two carbons atoms and one oxygen atom. For example, 3-(2,3-epoxypropoxy)-propyl and 3,4-epoxycyclohexylethyl groups include an epoxide functional group. The term "oxetane" refers to a four-membered ring having three carbon atoms and one oxygen atom. For example, 2-ethyloxetane groups include an oxetane functional group.

The term "ring system" encompasses monocycles, as well as fused and/or bridged polycycles.

The term "oxo" means a doubly bonded oxygen, sometimes designated as =O or, for example, in describing a carbonyl, "C(O)" may be used to show an oxo substituted carbon.

The term "substituted," when used to modify a specified group or radical, means that one or more hydrogen atoms of the specified group or radical are each, independently of one another, replaced with the same or different substituent groups as defined below, unless specified otherwise.

The terms "polymerizable" and "polymerized" refer to one or more compounds that can be reacted to provide a larger compound, and to one or more compounds that have been reacted to provide a larger compound, respectively. For example, a composition of a single compound may be polymerizable (i.e., a monomer), and, upon polymerization, may provide a polymerized compound comprising repeating monomer units. Polymerizable or polymerized compositions may also include "curable" or "cured" compositions, in which "cross-linkable" or "cross-linked" compositions, in which compositions comprising polymers and, optionally, monomers and/or cross-linkers, can be, or have been, reacted to provide a composition of larger compounds.

The present inventors have determined that the hydrosilylation of reactive heterocycloalkanes such as epoxides can advantageously be used to form polymers, for example, when catalyzed by borane catalysts. Accordingly, the disclosure relates to polymerizable silicone compositions that include one or more organosiloxane(s) or organosilane(s) that include silicon hydrides and reactive heterocycloalkyls in a configuration suitable to provide polymeric material when reacted, and a borane catalyst. The disclosure demonstrates that such compositions, which may be free of sensitive and/or toxic catalysts, can be polymerized evenly, in a controlled manner, without forming undesirable byproducts. The compositions of the disclosure can be also less sensitive to contaminants, such as thiol and tin, as compared to the metal-catalyzed formulations. The compositions of the disclosure can also have a desirably long pot life. For example, in certain embodiments the compositions of the disclosure have working time from 2 hours to a few days, whereas conventional metal-catalyzed formulations typically have working times up to only 90 minutes. In addition, the time and temperature at which the compositions of the disclosure may be cured can be fine-tuned depending on the desired application. In various particular embodiments, the compositions of the disclosure can be cured in timeframes in the range of, for example, 1 minute and up to 10 days, depending on the polymerization temperature.

One aspect of the disclosure is a polymerizable composition that includes
  one or more organosiloxanes or organosilanes, the one or more organosiloxanes or organosilanes comprising one or more of
    one or more first organosiloxanes or organosilanes, each comprising a plurality of silicon hydride functional groups, present in an amount within the range of about 0.05 wt % to about 99.95 wt %;
    one or more second organosiloxanes or organosilanes, each comprising a plurality of reactive heterocycloalkyl functional groups, present in an amount within the range of about 0.05 wt % to about 99.95 wt %; and
    one or more third organosiloxanes or organosilanes, each comprising at about least one silicon hydride functional group and at least about one reactive heterocycloalkyl functional group, present in an amount within the range of about 0.05 wt % to about 99.9999 wt % and
  an effective amount of a borane catalyst, for example, present in an amount within the range of 0.0001 wt % to about 10 wt %,
  wherein the ratio of reactive heterocycloalkyl functional groups to reactive silicon hydride functional groups in the composition is in the range of 1:5 to 5:1.

As described above, the polymerizable composition includes one or more organosiloxanes or organosilanes, the one or more organosiloxanes or organosilanes comprising one or more of: one or more first organosiloxanes or organosilanes, one or more second organosiloxanes or organosilanes, and one or more third organosiloxanes or organosilanes. That is, any combination of "first," "second" and/or "third" materials can be used to provide a composition having a ratio of reactive heterocycloalkyl functional groups to reactive silicon hydride functional groups in the composition that is in the range of 1:5 to 5:1 (or some other desired range, e.g., as described herein).

In certain embodiments, the polymerizable composition includes one or more first organosiloxanes or organosilanes and one or more second organosiloxanes or organosilanes. In certain such embodiments, the polymerizable composition is substantially free of (e.g., less than 1% of) the one or more third organosiloxanes or organosilanes. In such embodiments, a polyfunctional silicon hydride containing material can be reacted with a polyfunctional reactive heterocycloalkyl-containing material to form a polymer, e.g., using borane catalysis.

In other embodiments, the polymerizable composition includes one or more third organosiloxanes. In certain such embodiments, the polymerizable composition is substantially free of (e.g., less than 1% of) the one or more first organosiloxanes or organosilanes and the one or more second organosiloxanes or organosilanes. In such embodiments, an organosiloxane or organosilane bearing at least one silicon hydride and at least one reactive heterocycloalkyl can be polymerized, e.g., using borane catalysis.

The person of ordinary skill in the art will appreciate that one or more of the first, second and/or third organosiloxanes or organosilanes can be combined in a variety of ways to provide polymerizable compositions in which the ratio of reactive heterocycloalkyl functional groups to reactive silicon hydride functional groups in the composition is in the range of 1:5 to 5:1.

The person of ordinary skill in the art will appreciate that the various organosiloxanes and organosilanes described herein can be provided in a variety of molecular weights. The molecular weights can help to provide a desired viscosity to the material, e.g., a higher viscosity for some conventional coating and molding technologies, or a lower viscosity for certain 3D printing technologies. The person of ordinary skill in the art will appreciate that a given organosiloxane or organosilane (or other component, e.g., tackifier) will often be in the form an oligomer, and thus may have a variety of molecular weights and structures in a given sample. Unless otherwise indicated, a "molecular weight" as used throughout is "weight-average" molecular weight, $M_w$. $M_w$ may be calculated by using the equation: $\Sigma M_i^2 n_i / \Sigma M_i n_i$, where $n_i$ is the number of molecules of molecular weight $M_i$. The $M_w$ is determined, for purposes of the disclosure herein, using gel-permeation chromatography by comparison with an appropriate standard. The structures provided herein represent a weight average structure over the sample of the organosiloxane or other oligomeric or polymeric material. The person of ordinary skill in the art will be able to distinguish between different materials, as having substantially different average molecular weights, or substantially different structures.

As described above, in the polymerizable compositions of the disclosure, the one or more first organosiloxanes or organosilanes may be present in an amount within the range of about 0.05 wt % to about 99.95 wt % based on the total weight of the polymerizable composition. All wt % values described in this disclosure are on a dry weight basis of the total weight of the polymerizable composition, that is, excluding any solvents evaporable under polymerization conditions, unless otherwise made clear by context. For example, in certain embodiments of the compositions as otherwise described herein, the one or more first organosiloxanes or organosilanes are present in a total amount within the range of about 0.05 wt % to about 99.5 wt %, or about 0.05 wt % to about 99 wt %, or about 0.05 wt % to about 95 wt %, or about 0.05 wt % to about 90 wt %, or about 0.05 wt % to about 85 wt %, or about 0.05 wt % to about 80 wt %, or about 0.05 wt % to about 75 wt %, or about 0.05 wt % to about 70 wt %, or about 0.05 wt % to about 65 wt %, or about 0.05 wt % to about 60 wt %, or about 0.05 wt % to about 55 wt %, or about 0.05 wt % to about 50 wt %, or about 0.05 wt % to about 45 wt %, or about 0.05 wt % to about 50 wt %, or about 0.05 wt % to about 45 wt %, or about 0.05 wt % to about 40 wt %, or about 0.05 wt % to about 35 wt %, or about 0.05 wt % to about 30 wt %, or about 0.5 wt % to about 99.95 wt %, or about 1 wt % to about 99.95 wt %, or about 1 wt % to about 99 wt %, or about 1 wt % to about 95 wt %, or about 1 wt % to about 90 wt %, or about 1 wt % to about 85 wt %, or about 1 wt % to about 80 wt %, or about 1 wt % to about 75 wt %, or about 1 wt % to about 70 wt %, or about 1 wt % to about 65 wt %, or about 1 wt % to about 60 wt %, or about 1 wt % to about 55 wt %, or about 1 wt % to about 50 wt %, or about 1 wt % to about 45 wt %, or about 1 wt % to about 50 wt %, or about 1 wt % to about 45 wt %, or about 1 wt % to about 40 wt %, or about 1 wt % to about 35 wt %, or about 1 wt % to about 30 wt %, or about 5 wt % to about 99.95 wt %, or about 10 wt % to about 99.95 wt %, or about 15 wt % to about 99.95 wt %, or about 20 wt % to about 99.95 wt %, or about 25 wt % to about 99.95 wt %, or about 30 wt % to about 99.95 wt %, or about 35 wt % to about 99.95 wt %, or about 40 wt % to about 99.95 wt %, or about 45 wt % to about 99.95 wt %, or about 50 wt % to about 99.95 wt %, or about 55 wt % to about 99.95 wt %, or about 60 wt % to about 99.95 wt %, or about 65 wt % to about 99.95 wt %, or about 70 wt % to about 99.95 wt %, or about 5 wt % to about 95 wt %, or about 5 wt % to about 90 wt %, or about 10 wt % to about 90 wt %, or about 10 wt % to about 90 wt %, or about 15 wt % to about 90 wt %, or about 20 wt % to about 90 wt %, or about 25 wt % to about 90 wt %, or about 30 wt % to about 90 wt %, or about 35 wt % to about 90 wt %, or about 40 wt % to about 90 wt %, or about 45 wt % to about 90 wt %, or about 50 wt % to about 90 wt %, or about 55 wt % to about 90 wt %, or about 60 wt % to about 90 wt %, or about 65 wt % to about 90 wt %, or about 70 wt % to about 90 wt %, or about 15 wt % to about 85 wt %, or about 20 wt % to about 80 wt %, or about 25 wt % to about 75 wt %, or about 30 wt % to about 70 wt % based on the total weight of the polymerizable composition. But in other embodiments, there is substantially no first organosiloxane or organosilane (e.g., less than 1 wt %, or even less than 0.5 wt %).

As described above, the polymerizable composition may include one or more first organosiloxanes or organosilanes, each comprising a plurality of silicon hydride functional groups. In certain embodiments of the compositions as otherwise described herein, one or more (e.g., each) the first organosiloxane or organosilane comprises about two silicon hydride functional groups (i.e., per molecule on average over the sample), e.g., 1.7 to 2.3 silicon hydride functional groups per molecule. For example, in certain embodiments of the compositions as otherwise described herein, one or more of (e.g., each) first organosiloxane comprises tetramethyldisiloxane or hydride-terminated poly(dimethylsiloxane). In certain embodiments of the compositions as otherwise described herein, a first organosiloxane or organosilane comprises about three or more silicon hydride functional groups. For example, in certain embodiments of the compositions as otherwise described herein, a first organosiloxane comprises trimethylsiloxane-terminated poly(methylhydrosiloxane) or trimethylsiloxane-terminated poly(methylhydrosiloxane)-poly(dimethylsiloxane) copolymer. In certain embodiments of the compositions as otherwise described herein, one or more (e.g., each) first organosiloxane or organosilane comprises a number of silicon hydride functional groups within the range of about 4 to about 1,000, or about 5 to about 1,000, or about 10 to about 1,000, or about 50 to about 1,000, or about 100 to about 1,000, or about 5 to about 500, or about 10 to about 500, or about 50 to about 500, or about 100 to about 500, or about 5 to about 100, or about 10 to about 100, or about 50 to about 100, or about 3 to about 100, or about 3 to about 50, or about 3 to about 20 (i.e., per molecule on average over the sample).

In certain embodiments of the compositions as otherwise described herein, one or more of the first organosiloxane or organosilanes is an organosiloxane that includes about two or more siloxane repeat units. In certain such embodiments, the number of siloxane repeat units comprising a silicon hydride functional group is within the range of about 0.01% to about 100%, or about 0.1% to about 100%, or about 0.5% to about 20% of the total number of siloxane repeat units of the organosiloxane. For example, in certain embodiments of the compositions as otherwise described herein, the amount of siloxane repeat units comprising a silicon hydride functional group is within the range of about 0.5% to about 10%, or about 0.5% to about 5%, or about 2% to about 20%, or about 2% to about 10%, or about 2% to about 5%, or about 5% to about 20%, or about 5% to about 10%, or about 10% to about 20% of the total number of siloxane repeat units of the organosiloxane (i.e., per molecule on average over the sample). In certain such embodiments, the number of siloxane repeat units comprising a silicon hydride functional group is within the range of about 20% to about 60% of the total number of siloxane repeat units of the organosiloxane. For example, in certain embodiments of the compositions as otherwise described herein, the amount of siloxane repeat units comprising a silicon hydride functional group is within the range of about 20% to about 40%, or about 30% to about 60%, or about 30% to about 50% of the total number of siloxane repeat units of the organosiloxane (i.e., per molecule on average over the sample).

In certain embodiments of the compositions as otherwise described herein, one or more of (e.g., each of) the first organosiloxane or organosilanes is an organosiloxane in which each non-terminal siloxane repeat comprises a silicon hydride functional group. For example, in certain embodiments of the compositions as otherwise described herein, a first organosiloxane comprises trimethylsiloxane terminated poly(methylhydrosiloxane). In certain embodiments of the compositions as otherwise described herein, each silicon atom of a disiloxane comprises a silicon hydride functional group. For example, in certain embodiments of the compositions as otherwise described herein, the organosiloxane comprises tetramethyldisiloxane.

In certain embodiments of the compositions as otherwise described herein, at least one of (e.g., each of) the first organosiloxane or organosilanes is a compound of Formula I-A:

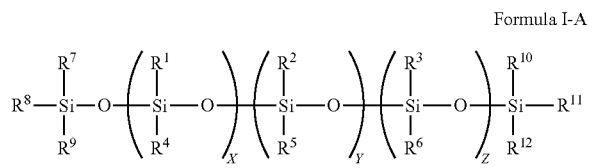

Formula I-A wherein:
each of $R^1$, $R^2$, and $R^3$ is independently hydrogen, $C_1$-$C_{60}$ (e.g., $C_1$-$C_6$ or $C_1$-$C_3$) hydrocarbon;
each of $R^4$, $R^5$, and $R^6$ is independently $C_1$-$C_{60}$ (e.g., $C_1$-$C_6$ or $C_1$-$C_3$) hydrocarbon;
each of $R^7$, $R^9$, $R^{10}$, and $R^{12}$ is independently hydrogen or $C_1$-$C_{60}$ (e.g., $C_1$-$C_6$ or $C_1$-$C_3$) hydrocarbon;
$R^8$ is hydrogen, O, or $C_1$-$C_{60}$ (e.g., $C_1$-$C_6$ or $C_1$-$C_3$) hydrocarbon;
$R^{11}$ is a covalent bond to $R^8$ if $R^8$ is O and is otherwise hydrogen or $C_1$-$C_{60}$ (e.g., $C_1$-$C_6$ or $C_1$-$C_3$) hydrocarbon; and
each of X, Y, and Z is independently 0-20,000, provided that at least one of X, Y and Z is not zero, and that the molecule bears at least two reactive silicon hydride groups.

For example, in certain embodiments of the compositions as otherwise described herein, one or more of the first organosiloxanes or organosilanes is a compound of Formula I-A in which $R^8$ and $R^{11}$ are hydrogen, and each of $R^7$, $R^9$, $R^{10}$, and $R^{12}$ is independently $C_1$-$C_{60}$ (e.g., $C_1$-$C_6$ or $C_1$-$C_3$) hydrocarbon. In certain such embodiments, each $C_1$-$C_{60}$ hydrocarbon is independently linear or branched $C_1$-$C_6$ alkyl. In certain such embodiments, each of $R^1$, $R^2$, and $R^3$ is independently $C_1$-$C_{60}$ (e.g., $C_1$-$C_6$ or $C_1$-$C_3$) hydrocarbon. In certain embodiments, each of X, Y and Z are 0 (i.e., the first organosiloxane is a disiloxane).

In certain embodiments of the compositions as otherwise described herein, one or more of the first organosiloxanes or organosilanes is a compound of Formula I-A in which $R^1$ is $C_1$-$C_{60}$ (e.g., $C_1$-$C_6$ or $C_1$-$C_3$) hydrocarbon, X is 1-10000 (e.g., 1-1000 or 1-500), and Y and Z are 0. In certain such embodiments, $R^8$ and $R^{11}$ are hydrogen, and each of $R^7$, $R^9$, $R^{10}$, and $R^{12}$ is independently $C_1$-$C_{60}$ (e.g., $C_1$-$C_6$ or $C_1$-$C_3$) hydrocarbon. In certain such embodiments, each $C_1$-$C_{60}$ hydrocarbon is independently linear or branched $C_1$-$C_6$ alkyl.

In certain embodiments of the compositions as otherwise described herein, one or more of the first organosiloxanes or organosilanes is a compound of Formula I-A in which one or more of one or more of $R^1$, $R^2$ and $R^3$ is hydrogen. In certain such embodiments, $R^8$ and $R^{11}$ are not hydrogen. For example, in certain such embodiments, $R_8$ is O and $R^{11}$ is a covalent bond to $R^8$.

In certain embodiments of the compositions as otherwise described herein, one or more of the first organosiloxanes or organosilanes is a compound of Formula I-A in which each of $R^1$ and $R^3$ is independently $C_1$-$C_{60}$ hydrocarbon, $R^2$ is hydrogen, each of X and Z is independently 0-1,000 (e.g., 0-500) and Y is 1-2000 (e.g., 1-500). In certain such embodiments, $R^8$ and $R^{11}$ are hydrogen, and each of $R^7$, $R^9$, $R^{10}$, and $R^{12}$ is independently $C_1$-$C_{60}$ hydrocarbon. But in other such embodiments, neither of $R^8$ or $R^{11}$ are hydrogen. In certain such embodiments, the ratio of Y to the total of X and Z is within the range of 1:199 to 1:4. For example, in certain embodiments of the compositions as otherwise described herein, the ratio of Y to the total of X and Z is within the range of 1:150 to 1:4, or 1:100 to 1:4, or 1:50 to 1:4, or 1:199 to 1:10, or 1:199 to 1:25, or 1:199 to 1:50, or 1:199 to 1:100, or 1:199 to 1:50, or 1:150 to 1:10, or 1:100 to 1:25. In other such embodiments, the ratio of Y to the total of X and Z is within the range of 1:4 to 3:2. For example, in certain embodiments of the compositions as otherwise described herein, the ratio of Y to the total of X and Z is within the range of 1:3 to 3:2, or 1:2 to 3:2, or 1:1 to 3:2, or 1:4 to 1:1, or 1:4 to 1:2, or 1:4 to 1:3, or 1:3 to 1:1. In certain such embodiments, each $C_1$-$C_{60}$ hydrocarbon is independently linear or branched $C_1$-$C_6$ alkyl.

In certain embodiments of the compositions as otherwise described herein, one or more of (e.g., each of) the first organosiloxanes or organosilanes is a compound of Formula I-B:

Formula I-B wherein:
each of $R^{13}$, $R^{14}$, $R^{15}$, and $R^{16}$ is independently hydrogen, $C_1$-$C_{50}$ (e.g., $C_1$-$C_6$ or $C_1$-$C_3$) hydrocarbon, or $R^L$; and $R^L$ is

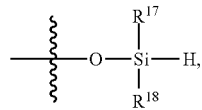

in which each of $R^{17}$ and $R^{18}$ is independently $C_1$-$C_4$ hydrocarbon, provided that the compound bears at least two reactive silicon hydride groups.

Accordingly, in various embodiments described herein, the one or more one or more first organosiloxanes or organosilanes can comprise a hydride terminated polysiloxane, or a polysiloxane having silicon hydrides along its polysiloxane backbone, or a silane or disiloxane bearing two silicon hydrides.

In certain embodiments of the compositions as otherwise described herein, the one or more first organosiloxanes or organosilanes include one or more of hydride-terminated PDMS; methylhydrosiloxane-dimethylsiloxane copolymer; polymethylhydrosiloxanes; methylhydrogen silicone fluid (side chain type); 2,4,6,8-tetramethylcyclotetrasiloxane; and methylhydrosiloxane-phenylmethylsiloxane copolymer.

In certain embodiments of the compositions as otherwise described herein, the molecular weight of one or more of (e.g., each of) the first organosiloxanes or organosilanes is within the range of about 88 Da to about 1 MDa, e.g., about 88 Da to about 10 kDa, or about 130 kDa to about 10 kDa. For example, in certain embodiments of the compositions as otherwise described herein, the molecular weight of one or more of (e.g., each of) the first organosiloxanes or organosilanes is within the range of about 250 Da to about 10 kDa, or about 500 Da to about 500 kDa, or about 500 Da to about 10 kDa, or about 1 kDa to about 100 kDa, or about 1 kDa to about 10 kDa, or about 2 kDa to about 10 kDa, or about 3 kDa to about 10 kDa, or about 4 kDa to about 10 kDa, or about 5 kDa to about 10 kDa, or about 6 kDa to about 10 kDa, or about 7 kDa to about 10 kDa, or about 130 Da to about 9 kDa, or about 130 Da to about 8 kDa, or about 130 Da to about 7 kDa, or about 130 Da to about 6 kDa, or about 130 Da to about 5 kDa, or about 130 Da to about 4 kDa, or about 130 Da to about 3 kDa, or about 130 Da to about 2 kDa, or about 130 Da to about 1 kDa, or about 130 Da to about 750 Da, or about 400 Da to about 500 Da, or about 0.9 kDa to about 1.2 kDa, or about 1 kDa to about 1.1 kDa, or about 1.4 kDa to about 1.8 kDa, or about 1.8 kDa to about 2.1 kDa, or about 1.9 kDa to about 2 kDa, or about 2.1 kDa to about 2.4 kDa, or about 4 kDa to about 5 kDa, or about 5.5 kDa to about 6.5 kDa. In certain embodiments of the compositions as otherwise described herein, the molecular weight of one or more of (e.g., each of) the first organosiloxanes or organosilanes is within the range of about 10 kDa to about 65 kDa. For example, in certain embodiments of the compositions as otherwise described herein, the molecular weight of one or more of (e.g., each of) the first organosiloxanes or organosilanes is within the range of about 10 kDa to about 55 kDa, or about 10 kDa to about 45 kDa, or about 10 kDa to about 40 kDa, or about 10 kDa to about 35 kDa, or about 10 kDa to about 30 kDa, or about 10 kDa to about 25 kDa, or about 20 kDa to about 65 kDa, or about 30 kDa to about 65 kDa, or about 35 kDa to about 65 kDa, or about 40 kDa to about 65 kDa, or about 45 kDa to about 65 kDa, or about 50 kDa to about 65 kDa, or about 15 kDa to about 20 kDa, or about 20 kDa to about 25 kDa, or about 25 kDa to about 30 kDa, or about 45 kDa to about 60 kDa, or about 50 kDa to about 50 kDa, or about 60 kDa to about 65 kDa. In certain embodiments of the compositions as otherwise described herein, the molecular weight of the one or more of (e.g., each of) the first organosiloxanes or organosilanes is within the range of about 25 kDa to about 1 MDa. For example, in certain embodiments of the compositions as otherwise described herein, the molecular weight of one or more of (e.g., each of) the first organosiloxanes or organosilanes is within the range of about 50 kDa to about 1 MDa, or about 75 kDa to about 1 MDa, or about 100 kDa to about 1 MDa, or about 150 kDa to about 1 MDa, or about 200 kDa to about 1 MDa, or about 300 kDa to about 1 MDa, or about 400 kDa to about 1 MDa, or about 500 kDa to about 1 MDa, or about 600 kDa to about 1 MDa, or about 700 kDa to about 1 MDa, or about 25 kDa to about 900 kDa, or about 25 kDa to about 800 kDa, or about 25 kDa to about 700 kDa, or about 25 kDa to about 600 kDa, or about 25 kDa to about 500 kDa, or about 25 kDa to about 400 kDa, or about 25 kDa to about 300 kDa, or about 25 kDa to about 250 kDa, or about 25 kDa to about 200 kDa, or about 25 kDa to about 150 kDa, or about 25 kDa to about 100 kDa, or about 50 kDa to about 900 kDa, or about 100 kDa to about 800 kDa, or about 200 kDa to about 700 kDa, or about 300 kDa to about 600 kDa.

The person of ordinary skill in the art will appreciate that the values of X, Y and Z can be selected in conjunction with the identities of the siloxane components to provide such molecular weights.

For example, in certain embodiments as otherwise described herein, in one or more of (e.g., each of) the organosiloxanes of formula I-A, X is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

Similarly, in certain embodiments as otherwise described herein, in one or more of (e.g., each of) the organosiloxanes of formula I-A, Y is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

Similarly, in certain embodiments as otherwise described herein, in one or more of (e.g., each of) the organosiloxanes of formula I-A, Z is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

As described above, in the polymerizable compositions of the disclosure, a second organosiloxane or organosilane may be present in an amount within the range of about 0.5 wt % to about 99.5 wt % based on the total weight of the polymerizable composition. For example, in certain embodiments of the compositions as otherwise described herein, the one or more second organosiloxanes or organosilanes are present in a total amount within the range of about 0.05 wt % to about 99.5 wt %, or about 0.05 wt % to about 99 wt %, or about 0.05 wt % to about 95 wt %, or about 0.05 wt % to about 90 wt %, or about 0.05 wt % to about 85 wt %, or about 0.05 wt % to about 80 wt %, or about 0.05 wt % to about 75 wt %, or about 0.05 wt % to about 70 wt %, or about 0.05 wt % to about 65 wt %, or about 0.05 wt % to about 60 wt %, or about 0.05 wt % to about 55 wt %, or about 0.05 wt % to about 50 wt %, or about 0.05 wt % to about 45 wt %, or about 0.05 wt % to about 40 wt %, or about 0.05 wt % to about 35 wt %, or about 0.05 wt % to about 30 wt %, or about 1 wt % to about 99.95 wt %, or about 1 wt % to about 99 wt %, or about 1 wt % to about 95 wt %, or about 1 wt % to about 90 wt %, or about 1 wt % to about 85 wt %, or about 1 wt % to about 80 wt %, or about 1 wt % to about 75 wt %, or about 1 wt % to about 70 wt %, or about 1 wt % to about 65 wt %, or about 1 wt % to about 60 wt %, or about 1 wt % to about 55 wt %, or about 1 wt % to about 50 wt %, or about 1 wt % to about 45 wt %, or about 1 wt % to about 50 wt %, or about 1 wt % to about 45 wt %, or about 1 wt % to about 40 wt %, or about 1 wt % to about 35 wt %, or about 1 wt % to about 30 wt %, or about 5 wt % to about 99.95 wt %, or about 5 wt % to about 90 wt %, or about 10 wt % to about 90 wt %, or about 15 wt % to about 90 wt %, or about 20 wt % to about 90 wt %, or about 25 wt % to about 90 wt %, or about 30 wt % to about 90 wt %, or about 35 wt % to about 90 wt %, or about 40 wt % to about 90 wt %, or about 45 wt % to about 90 wt %, or about 50 wt % to about 90 wt %, or about 55 wt % to about 90 wt %, or about 60 wt % to about 90 wt %, or about 65 wt % to about 90 wt %, or about 70 wt % to about 90 wt %, or about 10 wt % to about 99.95 wt %, or about 15 wt % to about 99.95 wt %, or about 20 wt % to about 99.95 wt %, or about 25 wt % to about 99.95 wt %, or about 30 wt % to about 99.95 wt %, or about 35 wt % to about 99.95 wt %, or about 40 wt % to about 99.95 wt %, or about 45 wt % to about 99.95 wt %, or about 50 wt % to about 99.95 wt %, or about 55 wt % to about 99.95 wt %, or about 60 wt % to about 99.95 wt %, or about 65 wt % to about 99.95 wt %, or about 70 wt % to about 99.95 wt %, or about 5 wt % to about 95 wt %, or about 15 wt % to about 85 wt %, or about 20 wt % to about 80 wt %, or about 25 wt % to about 75 wt %, or about 30 wt % to about 70 wt % based on the total weight of the polymerizable composition. But in other embodiments, there is substantially no second organosiloxane or organosilane (e.g., less than 1 wt %, or even less than 0.5 wt %).

As described above, the polymerizable composition may include one or more second organosiloxanes or organosilanes, each comprising a plurality of reactive heterocycloalkyl functional groups. In certain embodiments of the compositions as otherwise described herein, each reactive heterocycloalkyl functional group is a cyclic ether. For example, in certain embodiments of the compositions as otherwise described herein, each reactive functional group is an epoxide functional group or an oxetane functional group. In certain embodiments of the compositions as otherwise described herein, one or more (e.g., each) second organosiloxane or organosilane comprises at least about two (e.g., about two, for example, 1.7-2.3) reactive heterocycloalkyl functional groups (i.e., per molecule on average over the sample). For example, in certain embodiments of the compositions as otherwise described herein, a second organosiloxane comprises 1,3-bis(3-(2,3-epoxypropoxy)propyl)tetramethyldisiloxane or 3-(2,3-epoxypropoxy)propyl-terminated poly(dimethylsiloxane). In certain embodiments of the compositions as otherwise described herein, one or more (e.g., each) second organosiloxane or organosilane comprises about three or more heterocycloalkyl functional groups. For example, in certain embodiments of the compositions as otherwise described herein, a second organosiloxane comprises trimethylsiloxane-terminated poly((3-(2,3-epoxypropoxy)propyl)methylsiloxane)-poly(dimethylsiloxane) copolymer. In certain embodiments of the compositions as otherwise described herein, one or more (e.g., each) second organosiloxane or organosilane comprises a number of reactive heterocycloalkyl functional groups within the range of about 5 to about 500, or about 10 to about 500, or about 50 to about 500, or about 100 to about 500, or about 5 to about 100, or about 10 to about 100, or about 20 to about 100, or about 3 to about 50, or about 5 to about 50, or about 10 to about 50, or about 3 to about 20 or about 5 to about 20 or about 100 to about 500, or about 2 to about 1000 (i.e., per molecule on average over the sample).

In certain embodiments of the compositions as otherwise described herein, one or more of (e.g., each of) the second organosiloxane or organosilanes is an organosiloxane that includes about two or more siloxane repeat units. In certain such embodiments, the number of siloxane repeat units comprising a reactive heterocycloalkyl functional group is within the range of about 0.01% to about 100%, or about 0.5% to about 20% of the total number of siloxane repeat units of the organosiloxane. For example, in certain embodiments of the compositions as otherwise described herein, the amount of siloxane repeat units comprising a reactive heterocycloalkyl functional group is within the range of about 0.5% to about 10%, or about 0.5% to about 5%, or about 0.5% to about 3%, or about 2% to about 20%, or about 2% to about 10%, or about 2% to about 5%, or about 5% to about 20%, or about 0.5% to about 15%, or about 5% to about 10%, or about 10% to about 20% of the total number of siloxane repeat units of the organosiloxane (i.e., per molecule on average over the sample).

In certain embodiments of the compositions as otherwise described herein, one or more of the second organosiloxane or organosilanes is a disiloxane that in which each silicon atom bears a heterocycloalkyl functional group. For example, in certain embodiments of the compositions as otherwise described herein, the second organosiloxane comprises 1,3-bis(3-(2,3-epoxypropoxy)propyl)tetramethyldisiloxane.

In certain embodiments of the compositions as otherwise described herein, at least one of (e.g., each of) the second organosiloxane or organosilanes is a compound of Formula II-A:

Formula II-A

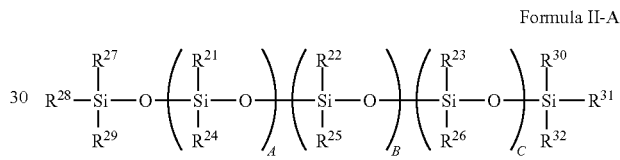

wherein:
each of $R^{21}$, $R^{22}$, $R^{23}$, $R^{27}$, and $R^{30}$ is independently $C_1$-$C_{60}$ (e.g., $C_1$-$C_6$ or $C_1$-$C_3$) hydrocarbon, $R^A$ or $R^B$;
$R^A$ is

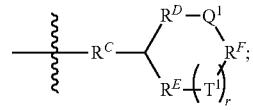

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbyonlene or a covalent bond;
r is 0 or 1; and
$R^F$ is $C_1$-$C_6$ hydrocarbonylene;
$R^B$ is

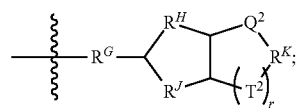

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0;

each of $R^{24}$, $R^{25}$, and $R^{26}$ is independently $C_1$-$C_{60}$ (e.g., $C_1$-$C_6$ or $C_1$-$C_3$) hydrocarbon;

each of $R^{29}$ and $R^{32}$ is independently hydrogen or $C_1$-$C_{60}$ (e.g., $C_1$-$C_6$ or $C_1$-$C_3$) hydrocarbon;

$R^{28}$ is O, or $C_1$-$C_{60}$ hydrocarbon;

$R^{31}$ is a covalent bond to $R^{28}$ if $R^{28}$ is O, or is otherwise $C_1$-$C_{60}$ (e.g., $C_1$-$C_6$ or $C_1$-$C_3$) hydrocarbon;

each of A, B, and C is independently 0-20,000, provided that at least one of A, B and C is not zero, and that the molecule bears at least two reactive heterocycloalkyl groups.

For example, in certain embodiments of the compositions as otherwise described herein, one or more of the second organosiloxane organosilanes is a compound of Formula II-A in which each of $R^{21}$, $R^{23}$, $R^{27}$, and $R^{30}$ is independently $C_1$-$C_{60}$ (e.g., $C_1$-$C_6$ or $C_1$-$C_3$) hydrocarbon; $R^{22}$ is $R^A$ or $R^B$, each of A and C is independently 0-1000, and B is 1-2000. In certain such embodiments, the ratio of B to the sum of A and C is within the range of 1:99 to 1:9. In certain such embodiments, the ratio of B to the sum of A and C is within the range of 1:199 to 1:9. For example, in certain embodiments of the compositions as otherwise described herein, the ratio of B to the total of A and C is within the range of 1:150 to 1:9, or 1:100 to 1:9, or 1:50 to 1:9, or 1:199 to 1:15, or 1:199 to 1:25, or 1:199 to 1:50, or 1:199 to 1:100, or 1:199 to 1:50, or 1:150 to 1:10, or 1:100 to 1:25.

In certain embodiments of the compounds of formula II-A, $R^{28}$ is O and $R^{31}$ is a covalent bond to $R^{28}$.

In certain embodiments of the compositions as otherwise described herein, one or more of the second organosiloxanes or organosilanes (e.g., each of) is a compound of Formula II-B:

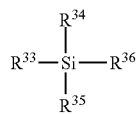
(II-B)

wherein:
each of $R^{33}$, $R^{34}$, $R^{35}$, and $R^{35}$ is independently $C_1$-$C_{60}$ (e.g., $C_1$-$C_6$ or $C_1$-$C_3$) hydrocarbon, $R^A$, $R^B$, or $R^M$;

$R^M$ is

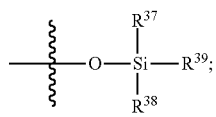

in which
each of $R^{37}$ and $R^{38}$ is independently $C_1$-$C_{60}$ (e.g., $C_1$-$C_6$ or $C_1$-$C_3$) hydrocarbon; and
$R^{39}$ is $R^A$ or $R^B$;

$R^A$ is

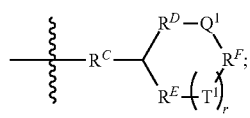

in which
each of $Q^1$ and $T^1$ is independently O, or S;
$R^C$ is $C_1$-$C_{20}$ hydrocarbonylene;

each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is

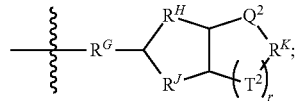

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0, provided that the compound bears at least two reactive heterocycloalkyl functional groups.

Accordingly, in various embodiments described herein, the one or more second organosiloxanes or organosilanes can comprise an reactive heterocycloalkyl (e.g., epoxy)-terminated polysiloxane, or a polysiloxane having reactive heterocycloalkyls (e.g., epoxies) along its polysiloxane backbone, or a silane or disiloxane bearing two reactive heterocycloalkyls (e.g., epoxides).

In certain embodiments of the compositions as otherwise described herein, the one or more second organosiloxanes or organosilanes include one or more of epoxide-terminated polysiloxanes; epoxycyclohexylethylmethylsiloxane-dimethylsiloxane copolymer, 2,4,6,8-tetramethyl-2,4,6,8-tetrakis(propyl glycidyl ether)cyclotetrasiloxane; and epoxy-modified side-chain type silicone fluids (e.g., epoxypropoxypropyl)methylsiloxane-siloxane copolymer).

As described a In certain embodiments of the compositions as otherwise described herein, the molecular weight of one or more of (e.g., each of) the second organosiloxanes or organosilanes is within the range of about 200 Da to about 1 MDa, or about 350 Da to about 5 kDa, or about 1 kDa to about 50 kDa. For example, in certain embodiments of the compositions as otherwise described herein, the molecular weight of one or more of (e.g., each of) the second organosiloxanes or organosilanes is within the range of about 500 kDa to about 5 kDa, or about 750 Da to about 5 kDa, or about 1 kDa to about 5 kDa, or about 1.5 kDa to about 5 kDa, or about 2 kDa to about 5 kDa, or about 2.5 kDa to about 5 kDa, or about 3 kDa to about 5 kDa, or about 3.5 kDa to about 5 kDa, or about 350 Da to about 4.5 kDa, or about 350 Da to about 4 kDa, or about 350 Da to about 3.5 kDa, or about 350 Da to about 3 kDa, or about 350 Da to about 2.5 kDa, or about 350 Da to about 2 kDa, or about 350 Da to about 1.5 kDa, or about 350 Da to about 1 kDa, or about 350 kDa to about 500 Da, or about 500 Da to about 600 Da, or about 1 kDa to about 1.4 kDa, or about 4.5 kDa to about 5 kDa. In certain embodiments of the compositions as otherwise described herein, the molecular weight of one or more of (e.g., each of) the second organosiloxanes or organosilanes is within the range of about 5 kDa to about 25 kDa. For example, in certain embodiments of the compositions as otherwise described herein, the molecular weight of one or more of (e.g., each of) the second organosiloxanes or organosilanes is within the range of about 7.5 kDa to about 25 kDa, or about 10 kDa to about 25 kDa, or about 12.5 kDa to about 25 kDa, or about 15 kDa to about 25 kDa, or about 17.5 kDa to about 25 kDa, or about 20 kDa to about 25 kDa, or about 5 kDa to about 22.5 kDa, or about 5 kDa to about 20 kDa, or about 5 kDa to about 17.5 kDa, or about 5 kDa to about 15 kDa, or about 5 kDa to about 12.5 kDa, or about 5 kDa to about 10 kDa, or about 5 kDa to about 5.5 kDa, or about 7 kDa to about 9 kDa, or about 10 kDa to about 12 kDa, or about 12 kDa to about 15 kDa, or about 18 kDa to about 20 kDa. In certain embodiments of the compositions as otherwise described herein, the molecular weight of one or more of (e.g., each of) the second organosiloxanes or organosilanes is within the range of about 25 kDa to about 1 MDa. For example, in certain embodiments of the compositions as otherwise described herein, the molecular weight of one or more of (e.g., each of) the second organosiloxanes or organosilanes is within the range of about 50 kDa to about 1 MDa, or about 75 kDa to about 1 MDa, or about 100 kDa to about 1 MDa, or about 150 kDa to about 1 MDa, or about 200 kDa to about 1 MDa, or about 300 kDa to about 1 MDa, or about 400 kDa to about 1 MDa, or about 500 kDa to about 1 MDa, or about 600 kDa to about 1 MDa, or about 700 kDa to about 1 MDa, or about 25 kDa to about 900 kDa, or about 25 kDa to about 800 kDa, or about 25 kDa to about 700 kDa, or about 25 kDa to about 600 kDa, or about 25 kDa to about 500 kDa, or about 25 kDa to about 400 kDa, or about 25 kDa to about 300 kDa, or about 25 kDa to about 250 kDa, or about 25 kDa to about 200 kDa, or about 25 kDa to about 150 kDa, or about 25 kDa to about 100 kDa, or about 50 kDa to about 900 kDa, or about 100 kDa to about 800 kDa, or about 200 kDa to about 700 kDa, or about 300 kDa to about 600 kDa.

The person of ordinary skill in the art will appreciate that the values of A, B and C can be selected in conjunction with the identities of the siloxane components to provide such molecular weights.

For example, in certain embodiments as otherwise described herein, in one or more of (e.g., each of) the organosiloxanes of formula II-A, A is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

Similarly, in certain embodiments as otherwise described herein, in one or more of (e.g., each of) the organosiloxanes of formula II-A, B is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

Similarly, in certain embodiments as otherwise described herein, in one or more of (e.g., each of) the organosiloxanes of formula II-A, C is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

As described above, in the polymerizable compositions of the disclosure, the third organosiloxane or organosilane may be present in an amount within the range of about 0.5 wt % to about 99.5 wt % based on the total weight of the polymerizable composition. For example, in certain embodiments of the compositions as otherwise described herein, the one or more third organosiloxanes or organosilanes are present in a total amount within the range of about 0.05 wt % to about 99.5 wt %, or about 0.05 wt % to about 99 wt %, or about 0.05 wt % to about 95 wt %, or about 0.05 wt % to about 90 wt %, or about 0.05 wt % to about 85 wt %, or about 0.05 wt % to about 80 wt %, or about 0.05 wt % to about 75 wt %, or about 0.05 wt % to about 70 wt %, or about 0.05 wt % to about 65 wt %, or about 0.05 wt % to about 60 wt %, or about 0.05 wt % to about 55 wt %, or about 0.05 wt % to about 50 wt %, or about 0.05 wt % to about 45 wt %, or about 0.05 wt % to about 50 wt %, or about 0.05 wt % to about 45 wt %, or about 0.05 wt % to about 40 wt %, or about 0.05 wt % to about 35 wt %, or about 0.05 wt % to about 30 wt %, or about 0.5 wt % to about 99.95 wt %, or about 1 wt % to about 99.95 wt %, or about 1 wt % to about 99 wt %, or about 1 wt % to about 95 wt %, or about 1 wt % to about 90 wt %, or about 1 wt % to about 85 wt %, or about 1 wt % to about 80 wt %, or about 1 wt % to about 75 wt %, or about 1 wt % to about 70 wt %, or about 1 wt % to about 65 wt %, or about 1 wt % to about 60 wt %, or about 1 wt % to about 55 wt %, or about 1 wt % to about 50 wt %, or about 1 wt % to about 45 wt %, or about 1 wt % to about 50 wt %, or about 1 wt % to about 45 wt %, or about 1 wt % to about 40 wt %, or about 1 wt % to about 35 wt %, or about 1 wt % to about 30 wt %, or about 5 wt % to about 99.95 wt %, or about 10 wt % to about 99.95 wt %, or about 15 wt % to about 99.95 wt %, or about 5 wt % to about 90 wt %, or about 10 wt % to about 90 wt %, or about 15 wt % to about 90 wt %, or about 20 wt % to about 90 wt %, or about 25 wt % to about 90 wt %, or about 30 wt % to about 90 wt %, or about 35 wt % to about 90 wt %, or about 40 wt % to about 90 wt %, or about 45 wt % to about 90 wt %, or about 50 wt % to about 90 wt %, or about 55 wt % to about 90 wt %, or about 60 wt % to about 90 wt %, or about 65 wt % to about 90 wt %, or about 70 wt % to about 90 wt %, or about 20 wt % to about 99.95 wt %, or about 25 wt % to about 99.95 wt %, or about 30 wt % to about 99.95 wt %, or about 35 wt % to about 99.95 wt %, or about 40 wt % to about 99.95 wt %, or about 45 wt % to about 99.95 wt %, or about 50 wt % to about 99.95 wt %, or about 55 wt % to about 99.95 wt %, or about 60 wt % to about 99.95 wt %, or about 65 wt % to about 99.95 wt %, or about 70 wt % to about 99.95 wt %, or about 5 wt % to about 95 wt %, or about 15 wt % to about 85 wt %, or about 20 wt % to about 80 wt %, or about 25 wt % to about 75 wt %, or about 30 wt % to about 70 wt % based on the total weight of the polymerizable composition. But in other embodiments, there is substantially no third organosiloxane or organosilane (e.g., less than 1 wt %, or even less than 0.5 wt %).

As described above, the polymerizable composition may include one or more third organosiloxanes or organosilanes, each comprising at least about one silicon hydride functional group and at least about one reactive heterocycloalkyl functional group. In certain embodiments of the compositions as otherwise described herein, each reactive heterocycloalkyl functional group is a cyclic ether. For example, in certain embodiments of the compositions as otherwise described herein, each reactive functional group is an epoxide functional group or an oxetane functional group. In certain embodiments of the compositions as otherwise described herein, one or more (e.g., each) third organosiloxane or organosilane includes about one (e.g., 0.7-1.3) silicon hydride and about one (e.g., 0.7-1.3) reactive heterocycloalkyl functional group (i.e., per molecule on average over the sample). For example, in certain embodiments of the compositions as otherwise described herein, a third organosiloxane or organosilane is a poly(dimethylsiloxane) having a first end and a second, terminated at the first end by a silicon hydride functional group, and terminated at the second end by a reactive heterocycloalkyl functional group (e.g., a 3-(2,3-epoxypropoxy)propyl group). In certain embodiments, one or more (e.g., each) third organosiloxane or organosilane includes about two or more silicon hydrides and/or about two or more reactive heterocycloalkyl functional groups (i.e., per molecule on average over the sample). For example, in certain embodiments of the compositions as otherwise described herein, a third organosiloxane or organosilane is a polysiloxane having about two or more epoxy-functional siloxane subunits and about two or more monoalkylsiloxane subunits (i.e., per molecule on average over the sample).

In certain embodiments of the compositions as otherwise described herein, one or more of (e.g., each of) the third organosiloxane or organosilanes is an organosiloxane that includes about two or more siloxane repeat units. In certain such embodiments, the number of siloxane units comprising a heterocycloalkyl functional group or a silicon hydride functional group is within the range of about 0.01% to about 100% (e.g., about 0.5% to about 50%) of the total number of siloxane units of the total number of siloxane repeat units of the organosiloxane. For example, in certain embodiments of the compositions as otherwise described herein, the amount of siloxane repeat units comprising a reactive heterocycloalkyl functional group or a silicon hydride functional group is within the range of about 0.5% to about 20%, or about 0.5% to about 10%, or about 0.5% to about 5%, or about 2% to about 50%, or about 2% to about 20%, or about 2% to about 10%, or about 5% to about 50%, or about 5% to about 20%, or about 5% to about 10%, or about 10% to about 50% or about 10% to about 20% of the total number of siloxane repeat units of the organosiloxane (i.e., per molecule on average over the sample).

The person of ordinary skill in the art will appreciate that a wide variety of first organosiloxanes or organosilanes, second organosiloxanes or organosilanes, and third organosiloxanes or organosilanes can be used in the compositions and methods described herein.

In certain embodiments of the compositions as otherwise described herein, at least one of (e.g., each of) the third organosiloxane or organosilanes is a compound of Formula III-A:

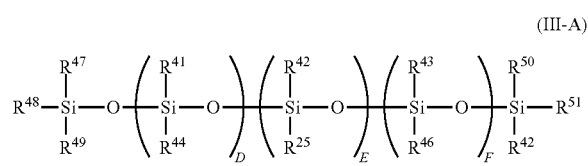

(III-A)

wherein:
each of $R^{41}$, $R^{42}$, $R^{43}$, $R^{47}$, and $R^{50}$ is independently $C_1$-$C_{60}$ (e.g., $C_1$-$C_6$ or $C_1$-$C_3$) hydrocarbon, hydrogen, $R^A$ or $R^B$;

$R^A$ is

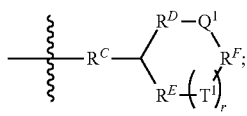

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;

$R^B$ is

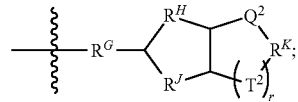

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0;
each of $R^{44}$, $R^{45}$, and $R^{46}$ is independently $C_1$-$C_{60}$ (e.g., $C_1$-$C_6$ or $C_1$-$C_3$) hydrocarbon;
each of $R^{49}$ and $R^{52}$ is independently $C_1$-$C_{60}$ (e.g., $C_1$-$C_6$ or $C_1$-$C_3$) hydrocarbon;
$R^{48}$ is O, or $C_1$-$C_{60}$ hydrocarbon;
$R^{51}$ is a covalent bond to $R^{48}$ if $R^{48}$ is O, or is otherwise $C_1$-$C_{60}$ (e.g., $C_1$-$C_6$ or $C_1$-$C_3$) hydrocarbon;
each of D, E, and F is independently 0-20,000, provided that at least one of D, E and F is not zero, and that the molecule bears at least one reactive silicon hydride and at least one reactive heterocycloalkyl group.

For example, in certain embodiments of the compositions as otherwise described herein, one or more of the third organosiloxane or organosilanes is a compound of Formula III-A in which each of $R^{43}$, $R^{47}$, and $R^{50}$ is independently $C_1$-$C_{60}$ (e.g., $C_1$-$C_6$ or $C_1$-$C_3$) hydrocarbon; $R^{41}$ is H; $R^{42}$ is $R^A$ or $R^B$; D is 1-2000, E is 1-2000; and F is 0-2000. In certain such embodiments, the ratio of E to the sum of D and F is within the range of 1:199 to 1:9, and the ratio of D to the sum of E and F is within the range of 1:199 to 1:9. For example, in certain embodiments of the compositions as otherwise described herein, each of the ratio of E to the sum of D and F and the ratio of D to the sum of E and F is independently within the range of 1:199 to 1:9, or 1:150 to 1:9, or 1:100 to 1:9, or 1:50 to 1:9, or 1:199 to 1:15, or 1:199 to 1:25, or 1:199 to 1:50, or 1:199 to 1:100, or 1:199 to 1:50, or 1:150 to 1:10, or 1:100 to 1:25.

In certain embodiments of the compounds of formula III-A, $R^{48}$ is O and $R^{51}$ is a covalent bond to $R^{48}$.

In certain embodiments of the compositions as otherwise described herein, one or more of (e.g., each of) the third organosiloxanes or organosilanes is a compound of Formula III-B:

(III-B)

wherein:
each of $R^{53}$, $R^{54}$, $R^{55}$, and $R^{56}$ is independently $C_1$-$C_{60}$ hydrocarbon, H, $R^A$, $R^B$, or $R^M$;

$R^M$ is

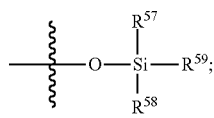

in which
each of $R^{57}$ and $R^{58}$ is independently $C_1$-$C_{60}$ hydrocarbon; and
$R^{59}$ is $R^A$ or $R^B$;
$R^A$ is

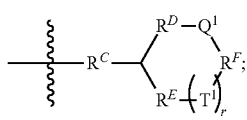

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is

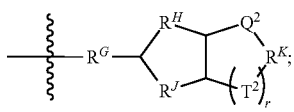

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0, provided that the molecule
bears at least one silicon hydride and at least one reactive heterocycloalkyl group.

Accordingly, in various embodiments described herein, the one or more third organosiloxanes or organosilanes can comprise one or more of an polysiloxane terminated with one or more reactive heterocycloalkyls (e.g., epoxides) and having one or more silicon hydrides along its backbone, a polysiloxane terminated with one or more silicon hydrides and having one or more reactive heterocycloalkyls (e.g., epoxides) along its backbone; a polysiloxane terminated with a silicon hydride and with a reactive heterocycloalkyl (e.g., epoxy); or a polysiloxane having one or more silicon hydrides and one or more reactive heterocycloalkyls (e.g., epoxides) along its polysiloxane backbone.

In certain embodiments of the compositions as otherwise described herein, the one or more third organosiloxanes or organosilanes include epoxypropoxypropyl methylsiloxane-dimethylsiloxane copolymer.

In certain embodiments of the compositions as otherwise described herein, the molecular weight of one or more of (e.g., each of) the third organosiloxanes or organosilanes is within the range of about 120 Da to about 1 MDa; or about 1 kDa to about 100 kDa, or about 350 Da to about 5 kDa. For example, in certain embodiments of the compositions as otherwise described herein, the molecular weight of one or more of (e.g., each of) the third organosiloxanes or organosilanes is within the range of about 500 kDa to about 5 kDa, or about 750 Da to about 5 kDa, or about 1 kDa to about 5 kDa, or about 1.5 kDa to about 5 kDa, or about 2 kDa to about 5 kDa, or about 2.5 kDa to about 5 kDa, or about 3 kDa to about 5 kDa, or about 3.5 kDa to about 5 kDa, or about 350 Da to about 4.5 kDa, or about 350 Da to about 4 kDa, or about 350 Da to about 3.5 kDa, or about 350 Da to about 3 kDa, or about 350 Da to about 2.5 kDa, or about 350 Da to about 2 kDa, or about 350 Da to about 1.5 kDa, or about 350 Da to about 1 kDa, or about 350 kDa to about 500 Da, or about 500 Da to about 600 Da, or about 1 kDa to about 1.4 kDa, or about 4.5 kDa to about 5 kDa. In certain embodiments of the compositions as otherwise described herein, the molecular weight of one or more of (e.g., each of) the third organosiloxanes or organosilanes is within the range of about 5 kDa to about 25 kDa. For example, in certain embodiments of the compositions as otherwise described herein, the molecular weight of one or more of (e.g., each of) the third organosiloxanes or organosilanes is within the range of about 7.5 kDa to about 25 kDa, or about 10 kDa to about 25 kDa, or about 12.5 kDa to about 25 kDa, or about 15 kDa to about 25 kDa, or about 17.5 kDa to about 25 kDa, or about 20 kDa to about 25 kDa, or about 5 kDa to about 22.5 kDa, or about 5 kDa to about 20 kDa, or about 5 kDa to about 17.5 kDa, or about 5 kDa to about 15 kDa, or about 5 kDa to about 12.5 kDa, or about 5 kDa to about 10 kDa, or about 5 kDa to about 5.5 kDa, or about 7 kDa to about 9 kDa, or about 10 kDa to about 12 kDa, or about 12 kDa to about 15 kDa, or about 18 kDa to about 20 kDa.

In certain embodiments of the compositions as otherwise described herein, the molecular weight of one or more of (e.g., each of) the third organosiloxanes or organosilanes is within the range of about 25 kDa to about 1 MDa. For example, in certain embodiments of the compositions as otherwise described herein, the molecular weight of one or more of (e.g., each of) the third organosiloxanes or organosilanes is within the range of about 50 kDa to about 1 MDa, or about 75 kDa to about 1 MDa, or about 100 kDa to about 1 MDa, or about 150 kDa to about 1 MDa, or about 200 kDa to about 1 MDa, or about 300 kDa to about 1 MDa, or about 400 kDa to about 1 MDa, or about 500 kDa to about 1 MDa, or about 600 kDa to about 1 MDa, or about 700 kDa to about 1 MDa, or about 25 kDa to about 900 kDa, or about 25 kDa to about 800 kDa, or about 25 kDa to about 700 kDa, or about 25 kDa to about 600 kDa, or about 25 kDa to about 500 kDa, or about 25 kDa to about 400 kDa, or about 25 kDa to about 300 kDa, or about 25 kDa to about 250 kDa, or about 25 kDa to about 200 kDa, or about 25 kDa to about 150 kDa, or about 25 kDa to about 100 kDa, or about 50 kDa to about 900 kDa, or about 100 kDa to about 800 kDa, or about 200 kDa to about 700 kDa, or about 300 kDa to about 600 kDa.

The person of ordinary skill in the art will appreciate that the values of D, E and F can be selected in conjunction with the identities of the siloxane components to provide such molecular weights.

For example, in certain embodiments as otherwise described herein, in one or more of (e.g., each of) the organosiloxanes of formula III-A, D is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

Similarly, in certain embodiments as otherwise described herein, in one or more of (e.g., each of) the organosiloxanes of formula III-A, E is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

Similarly, in certain embodiments as otherwise described herein, in one or more of (e.g., each of) the organosiloxanes of formula III-A, F is in the range of 0-10000, 0-2000, 0-1000, 0-500, 0-100, 0-50, 5-10000, 5-2000, 5-1000, 5-500, 5-100, 5-50, 10-10000, 10-2000, 10-1000, 10-500, 10-100, 50-10000, 50-2000, 50-1000 or 50-500.

In certain embodiments, the $R^A$ and $R^B$ groups of compounds II-A, II-B, III-A and III-B are as described generally above. The person of ordinary skill in the art will appreciate that a variety of $R^A$ and $R^B$ groups can be used in the compounds described herein. Each of the $R^A$ and $R^B$ groups can be independently defined as described in the further embodiments below. In certain embodiments, each $R^A$ and $R^B$ group is as defined in one of the further embodiments below.

For example, in certain embodiments as otherwise described herein, in one or more compounds (e.g., each of the compounds) II-A, II-B, III-A and IIIB, each of $R^D$ and $R^E$ is a covalent bond. In other embodiments as otherwise described herein, in one or more compounds (e.g., each of the compounds) II-A, II-B, III-A and IIIB, each of $R^D$ and $R^E$ is independently $C_1$-$C_2$ alkylene.

In certain embodiments as otherwise described herein, in one or more compounds (e.g., each of the compounds) II-A, II-B, III-A and IIIB, $R^F$ is linear or branched $C_1$-$C_4$ alkylene, for example, methylene.

In certain embodiments as otherwise described herein, in one or more compounds (e.g., each of the compounds) II-A, II-B, III-A and IIIB, each of $Q^1$ and $T^1$ of $R^A$ are O.

In certain embodiments as otherwise described herein, in one or more compounds (e.g., each of the compounds) II-A, II-B, III-A and IIIB, r of $R^A$ is 0.

In certain embodiments as otherwise described herein, in one or more compounds (e.g., each of the compounds) II-A, II-B, III-A and IIIB, $R^A$ is:

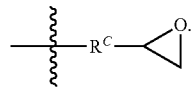

In certain embodiments as otherwise described herein, in one or more compounds (e.g., each of the compounds) II-A, II-B, III-A and IIIB, $R^C$ is linear or branched $C_1$-$C_6$ heteroalkylene. For example, in certain embodiments as otherwise described herein, in one or more compounds (e.g., each of the compounds) II-A, II-B, III-A and IIIB, $R^C$ is:

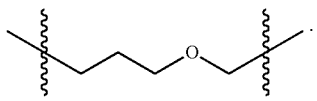 [SMILES: *CCCOC*]

In certain embodiments as otherwise described herein, in one or more compounds (e.g., each of the compounds) II-A, II-B, III-A and IIIB, $R^H$ is $C_1$-$C_2$ alkylene.

In certain embodiments as otherwise described herein, in one or more compounds (e.g., each of the compounds) II-A, II-B, III-A and IIIB, $R^J$ is methylene.

In certain embodiments as otherwise described herein, in one or more compounds (e.g., each of the compounds) II-A, II-B, III-A and IIIB, $R^K$ is methylene.

In certain embodiments as otherwise described herein, in one or more compounds (e.g., each of the compounds) II-A, II-B, III-A and IIIB, each of $Q^2$ and $T^2$ of $R^B$ are O.

In certain embodiments as otherwise described herein, in one or more compounds (e.g., each of the compounds) II-A, II-B, III-A and IIIB, r of $R^B$ is 0. In certain such embodiments, $R^K$ is a covalent bond.

In certain embodiments as otherwise described herein, in one or more compounds (e.g., each of the compounds) II-A, II-B, III-A and IIIB, $R^B$ is:

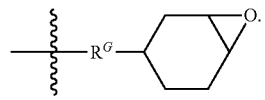

In certain embodiments as otherwise described herein, in one or more compounds (e.g., each of the compounds) II-A, II-B, III-A and IIIB, $R^G$ is linear or branched $C_1$-$C_6$ alkylene.

In certain embodiments as otherwise described herein, in one or more compounds (e.g., each of the compounds) II-A, II-B, III-A and IIIB, each $C_1$-$C_{60}$ hydrocarbon is independently linear or branched $C_1$-$C_6$ alkyl.

The person of ordinary skill in the art will appreciate that the first, second and third organosiloxanes or organosilanes can be combined in various combinations and amounts.

For example, in certain embodiments as otherwise described herein, the composition includes one or more first organosiloxanes or organosilanes present in an amount within the range of about 0.05 wt % to about 30 wt % and one or more second organosiloxanes or organosilanes present in an amount within the range of about 70 wt % to about 99.95 wt %. In other embodiments as otherwise described herein, the composition includes one or more first organosiloxanes or organosilanes present in an amount within the range of about 1 wt % to about 30 wt %, about 5 wt % to about 30 wt %, or about 10 wt % to about 30 wt %, and one or more second organosiloxanes or organosilanes present in an amount within the range of about 70 wt % to about 99 wt %, about 70 wt % to about 95 wt %, or about 70 wt % to about 90 wt %. In other embodiments as otherwise described herein, the composition includes one or more first organosiloxanes or organosilanes present in an amount within the range of about 30 wt % to about 70 wt %, and one or more second organosiloxanes or organosilanes present in an amount within the range of about 30 wt % to about 70 wt %. In other embodiments as otherwise described herein, the composition includes one or more first organosiloxanes or organosilanes present in an amount within the range of about 70 wt % to about 99.95 wt %, and one or more second organosiloxanes or organosilanes present in an amount within the range of about 0.05 wt % to about 30 wt %. In other embodiments as otherwise described herein, the composition includes one or more first organosiloxanes or organosilanes present in an amount within the range of about 70 wt % to about 99 wt %, about 70 wt % to about 95 wt %, or about 70 wt % to about 90 wt %, and one or more second organosiloxanes or organosilanes present in an amount within the range of about 1 wt % to about 30 wt %, about 5 wt % to about 30 wt %, or about 10 wt % to about 30 wt %. In certain such embodiments in which both a first organosiloxane or organosilane and a second organosiloxane or organosilane is present, substantially no third organosiloxane or organosilane is present (e.g., no more than 0.5 wt %, or no more than 0.1 wt %).

In other embodiments as otherwise described herein, the composition includes one or more third organosiloxanes or organosilanes present in an amount within the range of about 30 wt % to about 99.95 wt %. For example, in certain such embodiments, the one or more third organosiloxanes or organosilanes is present in an amount within the range of about 50 wt % to about 99.95 wt %, or about 70 wt % to about 99.95 wt %. In certain such embodiments, substantially no first organosiloxane or organosilane or second organosiloxane or organosilane is present (e.g., no more than 0.5 wt %, or no more than 0.1 wt % of each).

In other embodiments as otherwise described herein, substantial amounts of each of the first organosiloxane or organosilane, the second organosiloxane or organosilane, and the third organosiloxane or organosilane are present. For example, in certain such embodiments, a composition includes one or more first organosiloxanes or organosilanes in an amount within the range of about 5 wt % to about 80 wt %; one or more second organosiloxanes or organosilanes in an amount within the range of about 5 wt % to about 80 wt %; and one or more third organosiloxanes or organosilanes in an amount within the range of about 5 wt % to about 80 wt %.

The person of ordinary skill in the art will appreciate that the hydrosilylation reaction has a stoichiometry of one silicon hydride to one reactive heterocycloalkyl. Accordingly, as described above, in various compositions as described herein the ratio of silicon hydride functional groups to reactive heterocycloalkyl functional groups in the overall composition (i.e., including all of any first, second and third organosiloxanes or organosilanes) is within the range of 1:5 to 5:1. For example, in certain embodiments of the compositions as otherwise described herein, the ratio of silicon hydride functional groups to heterocycloalkyl functional groups is within the range of 1:5 to 4:1, or 1:2.5 to 2.5:1, or 1:4.5 to 4.5:1, or 1:5 to 3:1, or 1:5 to 2:1, or 1:5 to 1:1, or 1:4 to 5:1, or 1:3 to 5:1, or 1:2 to 5:1, or 1:1 to 5:1, or 1:4 to 4:1, or 1:3 to 3:1, or 1:1.25 to 1.25:1, or 1:1.2 to 1.2:1, or 1:1.15 to 1.15:1, or 1:1.1 to 1.1:1. In some embodiments, there is an excess of heterocycloalkyl functional groups; heterocycloalkyl functional groups (especially epoxy groups) can react with one another (i.e., in addition to being hydrosilylated). Accordingly, in certain embodiments, the ratio of silicon hydride functional groups to heterocycloalkyl functional groups is in the range of 1:5 to 1:1, or 1:4 to 1:1, or 1:3 to 1:1, or 1:2 to 1:1, or 1.5:1 to 1:1, or 1.25:1 to 1:1.

In certain embodiments of the compositions as otherwise described herein, the polymerizable composition is substantially free of hydrosilylatable ethylenic unsaturations, including, for example, vinyl functional groups. The present inventors have determined that hydrosilylation of epoxides can form polymers without the need to hydrosilylate ethylenic unsaturations as is conventional. For example, in certain embodiments of the compositions as otherwise described herein, the atoms comprising hydrosilylatable ethylenic unsaturations present in the polymerizable composition comprise less than 0.5 at. %, less than 0.4 at. %, less than 0.3 at. %, less than 0.2 at. %, less than 0.1 at. %, less than 0.05 at. %, or less than 0.01 at. % of the polymerizable composition. In certain embodiments of the compositions as otherwise described herein, the ratio of hydrosilylatable ethylenic unsaturations to silicon hydride functional groups is less than 0.05, less than 0.01, less than 0.005, or even less than 0.001.

The present inventors have determined that borane catalysts can be useful to catalyze the hydrosilylation of reactive heterocycloalkyl groups to provide a crosslinked silicone material. Accordingly, the polymerizable compositions described herein have an effective amount of a borane catalyst. As used herein, an "effective amount" is an amount effective to cause hydrosilylation of reactive heterocycloalkyl groups to provide a substantially polymerized material. In certain embodiments of the compositions of the disclosure, the borane catalyst is present in an amount within the range of about 0.0005 wt % to about 10 wt % based on the total weight of the polymerizable composition. For example, in certain embodiments of the compositions as otherwise described herein, the borane catalyst is present in an amount within the range of about 0.0005 wt % to about 7 wt %, or about 0.0005 wt % to about 5 wt %, or about 0.0005 wt % to about 3 wt %, or about 0.0005 wt % to about 2 wt %, or about 0.0005 wt % to about 1 wt %, or about 0.05 wt % to about 10 wt %, or about 0.01 wt % to about 7 wt %, or about 0.01 wt % to about 5 wt %, or about 0.01 wt % to about 3 wt %, or about 0.01 wt % to about 2 wt %, or about 0.01 wt % to about 1 wt %, or about 0.1 wt % to about 10 wt %, or about 0.1 wt % to about 7 wt %, or about 0.1 wt % to about 5 wt %, or about 0.1 wt % to about 3 wt %, or about 0.1 wt % to about 2 wt %, or about 0.1 wt % to about 1 wt %, based on the total weight of the polymerizable composition. In certain embodiments, the borane catalyst is present in an amount if at least about 0.005 wt %, e.g., at least about 0.05 wt %, at least about 0.5 wt %, or at least about 5 wt % of the composition. Of course, the person of ordinary skill in the art will appreciate that in some cases the effective amount of the borane catalyst will be outside of these ranges.

As described above, the polymerizable composition includes an effective amount of a borane catalyst. In certain embodiments of the compositions as otherwise described herein, the borane catalyst comprises or is a compound of the formula $B(R^C)_q(R^D)_r$ wherein each $R^C$ is independently $C_8$-$C_{14}$ aryl, optionally substituted with one or more groups that are independently $C_1$-$C_3$ fluoroalkyl, halogen, nitro, or CN; each $R^D$ is independently halogen; q is 1-3; r is 0-2; and the sum of q and r is 3. For example, in certain embodiments of the compositions as otherwise described herein, the borane catalyst comprises or is a compound of the formula $B(R^C)_q(R^D)_r$, in which $R^C$ is $C_6$ aryl, optionally substituted with one or more groups that are independently $C_1$-$C_3$ fluoroalkyl, halogen, nitro, or CN, q is 3, and r is 0.

In certain embodiments of the compositions as otherwise described herein, the borane catalyst comprises $B(C_6F_5)_3$ or a tetra(pentafluorophenyl)borate salt such as $[(C_6F_5)_3PF][B(C_6F_5)_4]$.

In certain embodiments of the compositions as otherwise described herein, the borane catalyst comprises or is a borate complex. For example, in certain embodiments of the compositions as otherwise described herein, the borane catalyst comprises a carbamato borate such as, for example, a carbazole-based compound such as

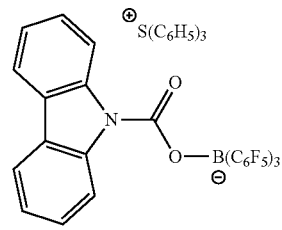

While the polymerizable compositions described herein may include a number of additional components, such as additives and/or fillers, they can be in substantial part formed from the materials described herein. For example, in certain embodiments of the compositions as otherwise described herein, the total amount of first, second and third organosiloxanes or organosilanes and borane catalyst is at least about 20%, for example, at least about 30 wt % of the composition. For example, in certain embodiments of the compositions as otherwise described herein, the total amount of first, second and third organosiloxanes or organosilanes and borane catalyst in at least about 40 wt %, or at least about 50 wt %, or at least about 60 wt %, or at least about 70 wt %, or at least about 80 wt %, or at least about 85 wt %, or at least about 90 wt %, or at least about 95 wt %, or at least about 98 wt %, or at least about 99 wt % of the composition.

In certain such embodiments, the polymerizable composition is substantially free of (e.g., less than 0.1 wt %, or less than 0.01 wt %, or less than 0.001 wt %) of transition metal hydrosilylation catalysts, such as such as platinum-based catalysts, ruthenium-based catalysts, palladium-based catalysts, osmium-based catalysts, iridium-based catalysts, titanium-based catalysts, tin-based catalysts and rhodium-based catalysts.

However, in alternative embodiments, one or more other catalysts is present in the polymerizable composition.

As noted above, the polymerizable compositions described herein can include a variety of other components.

For example, in certain embodiments as otherwise described herein, the polymerizable composition further includes one or more adhesion promoters. A variety of adhesion promoters are known in the art, such as for example, silanes, silicones, etc. Typically, the adhesion promoter is a silicon-based adhesion promoter such as silane or silicone. Suitable silicone-based adhesion promoters can differ from other silicon-based ingredients of the polymerizable compositions composition of the disclosure (e.g., the first organosiloxanes or organosilanes, the second organosiloxanes or organosilanes, and/or the third organosiloxanes or organosilanes) in: structure, viscosity, average molecular weight, siloxane units, and/or unit sequence. Suitable silicon-based adhesion promoters include, but are not limited to, (aminoalkyl)alkoxysilane, (aminoalkyl)trialkoxysilane, (aminoalkyl)alkyl-dialkoxysilane, bis(trialkoxysilylalkyl)amine, tris(trialkoxysilylalkyl)amine, tris(trialkoxysilylalkyl)-cyanurate, tris(trialkoxysilylalkyl)isocyanurate, (epoxyalkyl)alkoxysilane, (epoxyalkyl)-alkyldialkoxysilane, (epoxyalkyl)trialkoxysilane, and (mercaptoalkyl)alkoxysilane, as well as various (meth)acryl-, alkyl-, aryl-, vinyl-, and/or epoxy-functionalized alkoxysilanes. The person of ordinary skill in the art will select an appropriate adhesion promoter for a desired substrate and polymerizable composition. Moreover, organic-functionalized silicon hydrides can in some embodiments help to improve adhesion to a substrate.

In certain embodiments of the compositions as otherwise described herein, the polymerizable composition comprises one or more adhesion promoters in a total amount within the range of up to about 10 wt % of the composition, e.g., within the range of about 0.1 wt % to about 10 wt % based on the total weight of the polymerizable composition. For example, in certain embodiments of the compositions as otherwise described herein, the polymerizable composition further comprises one or more adhesion promoters in a total amount within the range of about 0 wt % to about 10 wt %, or about 0 wt % to about 8 wt %, or about 0 wt % to about 5 wt %, or about 0 wt % to about 2 wt %, or about 0.1 wt % to about 8 wt %, or about 0.1 wt % to about 5 wt %, or about 0.1 wt % to about 2 wt %, or about 1 wt % to about 10 wt %, or about 1 wt % to about 8 wt %, or about 1 wt % to about 5 wt %, or about 2 wt % to about 10 wt %, or about 2 wt % to about 8 wt %, or about 2 wt % to about 5 wt %, or about 5 wt % to about 10 wt %, or about 8 wt % to about 10 wt %. In certain embodiments, the total amount of first, second and third organosiloxanes or organosilanes, one or more adhesion promoters, and borane catalyst is at least about 20 wt %, e.g., at least about 30 wt %, at least about 50 wt %, at least about 70 wt %, at least about 80 wt %, at least about 90 wt %, or at least about 95 wt % of the composition. However, in other embodiments, substantially no adhesion promoter is present.

In certain embodiments of the compositions as otherwise described herein, the polymerizable composition further comprises one or more fillers. A variety of fillers are known in the art, made from materials such as, for example, silicone resin, other polymers, glasses, minerals, and metal oxides, nitrides, carbonates, or carbides. Such fillers may be in the form of, for example, powder, flake, or fibers. For example, in certain embodiments of the compositions as otherwise described herein, the polymerizable composition further comprises silica as a filler.

In certain embodiments of the compositions as otherwise described herein, the polymerizable composition comprises one or more fillers in a total amount within the range of up to about 75 wt % based on the total weight of the polymerizable composition, e.g., up to about 40 wt % of the composition, or about 15 wt % to about 75 wt %, or within the range of about 0.1 wt % to about 40 wt % of the composition. For example, in certain embodiments of the compositions as otherwise described herein, the polymerizable composition further comprises one or more fillers in a total amount within the range of about 15 wt % to about 55 wt %, or about 15 wt % to about 50 wt %, or about 15 wt % to about 45 wt %, or about 15 wt % to about 40 wt %, or about 15 wt % to about 35 wt %, or about 15 wt % to about 30 wt %, or about 15 wt % to about 25 wt %, or about 20 wt % to about 60 wt %, or about 25 wt % to about 60 wt %, or about 30 wt % to about 60 wt %, or about 35 wt % to about 60 wt %, or about 40 wt % to about 60 wt %, or about 20 wt % to about 55 wt %, or about 25 wt % to about 50 wt %, or about 30 wt % to about 45 wt %. In certain embodiments, the total amount of first, second and third organosiloxanes or organosilanes, filler and borane catalyst is at least about 20 wt %, e.g., at least about 30 wt %, at least about 50 wt %, at least about 70 wt %, at least about 80 wt %, at least about 90 wt %, or at least about 95 wt % of the composition.

The presently-disclosed polymerizable compositions can in certain embodiments be used as substantially solvent-free formulations. Accordingly, in certain embodiments, a polymerizable composition as otherwise described herein has less than 5 wt %, less than 2 wt %, or even less than 1 wt % of solvent.

But the present inventors have also noted that the presently-disclosed polymerizable compositions can be dispersed (e.g., dissolved or suspended) in a solvent to be used in forming coatings, e.g., by spray-coating, dip coating, or spin coating. Accordingly, another aspect of the disclosure is a solvent-borne coating composition, comprising a polymerizable composition as described herein, dispersed in a solvent. The choice of solvent will depend on the desired application. Suitable solvents include, but are not limited to, water, hydrocarbon solvent (e.g., pentane, hexane, xylene, toluene, etc.), ethyl acetate, hexamethyldisiloxane, dimethylformamide, ether, and any combination thereof. In certain such embodiments, the total amount of the first, second, and/or third organosiloxanes or organosilanes, tackifier, and borane catalyst is at least about 0.5 wt %, e.g., at least about 0.05 wt %, or at least about 0.1 wt % of the coating composition, or in the range of 0.05 wt % to 10 wt %, or 0.05 wt % to 2 wt %, or 0.05 wt % to 0.8 wt %, or 0.1 wt % to 0.5 wt % of the coating composition (i.e., including solvent). And in certain such embodiments, the total amount of the first, second and third organosiloxanes or organosilanes, the borane catalyst and the solvent in the composition is at least about 70 wt %, at least about 80 wt %, at least about 90 wt %, at least about 95 wt %, or even at least about 99 wt %. In certain such embodiments, the solvent has a boiling point of no more than 250° C., e.g., no more than 200° C. or even no more than 175° C., at atmospheric pressure. A variety of solvents, including water and a variety of conventional organic solvents, can be used. The solvent need not itself be a solvent for the polymerizable composition, provided the polymerizable composition is otherwise dispersible in the solvent.

The use of organosiloxanes or organosilane materials as claimed allows the person of ordinary skill in the art to provide the polymerizable composition having a desired viscosity while maintaining the desirable properties for the polymerized product, e.g., for use as an adhesive or sealant. In certain embodiments as otherwise described herein, the polymerizable composition has a viscosity less than about 10,000 cP at 25° C. In certain embodiments as otherwise described herein, the polymerizable composition has a viscosity up to about 1,000,000 cP at 25° C. Viscosity is measured with a DHR1 rheometer using the shear rate sweep experiment. For example, shear rate may range from 0.01/s to 1000/s. In certain embodiments, the polymerizable compositions of the disclosure may exhibit Newtonian fluidic behavior (i.e., viscosity substantially invariant with shear rate) For example, in various embodiments as otherwise described herein, the photocurable composition has a viscosity at 25° C. of less than 5,000 cP, or less than 4,000 cP, or even less than 2,500 cP. In various other embodiments as otherwise described herein, the photocurable composition has a viscosity at 25° C. of up to about 100,000 cP, or up to about 500,000 cP, or even up to about 1,000,000 cP. In certain embodiments as otherwise described herein, the photocurable composition has a viscosity at 25° C. of about 50 cP to about 10,000 cP, or about 50 cP to about 5,000 cP, or about 50 cP to about 2,500 cP, or about 50 cP to about 1,000 cP, or about 100 cP to about 10,000 cP, or about 100 cP to about 5,000 cP, or about 100 cP to about 2,500 cP, or about 100 cP to about 1,000 cP, or about 1,000 cP to about 10,000 cP, or about 1,000 cP to about 5,000 cP, or about 1,000 cP to about 2,500 cP, or about 10,000 cP to about 1,000,000 cP, or about 10,000 cP to about 500,000 cP, or about 10,000 cP to about 250,000 cP, or about 10,000 cP to about 100,000 cP, or about 50,000 cP to about 1,000,000 cP, or about 50,000 cP to about 500,000 cP, or about 50,000 cP to about 250,000 cP, or about 50,000 cP to about 100,000 cP, or about 100,000 cP to about 1,000,000 cP, or about 100,000 cP to about 500,000 cP, or about 100,000 cP to about 250,000 cP, or about 500,000 cP to about 1,000,000 cP. But the person of ordinary skill in the art will appreciate that formulations of other viscosities can be used.

When used as an adhesive (e.g., pressure-sensitive adhesive), sealant or release material, the person of ordinary skill in the art can use conventional additives used in such materials.

When used as an release material, the person of ordinary skill in the art can use conventional additives used in such materials. For example, an adhesion inhibitor, such as a polymeric adhesion inhibitor can be used to provide the materials with desirably low levels of adhesion after being cured. The adhesion inhibitor can be, for example, a fluoropolymer, or a silicone polymer, e.g., bearing fluorinated or phenyl-containing side groups.

The present inventors have determined that the polymerizable compositions of the disclosure can have longer working times as compared to conventional metal-catalyzed compositions. As used herein, the "working time" is quantified as the time after which the initial viscosity of the polymerizable composition has quadrupled when held at 25° C. and at 50% relative humidity. The compositions disclosed herein can be made to be relatively stable at room temperature, allowing for long working times and pot lives. In certain embodiments as otherwise described herein, the polymerizable composition has a working time of at least 5 minutes, at least 20 minutes, at least 2 hours, at least 12 hours, at least 2 days, e.g., at least 7 days or even at least 10 days as measured for a ⅛ inch diameter bead at 25° C., 50% relative humidity. The working time may be adjusted by those of skill in the art depending on the desired application, for example, by adjusting the polymerization temperature.

In certain embodiments, the polymerizable compositions of the disclosure have service temperature within the range of about −65° C. to about 300° C., e.g., in the range of about −20° C. to about 300° C., or about −40° C. to about 250° C., or about −55° C. to about 180° C.

Another aspect of the disclosure is a method of preparing a crosslinked silicone material. The method includes providing a polymerizable composition as described herein, then polymerizing the polymerizable composition. The amounts and identities of the various components of the polymerizable composition can be as otherwise described above.

As described above, the method includes polymerizing the polymerizable composition. In certain embodiments of the methods as otherwise described herein, polymerizing the polymerizable composition comprises exposing (e.g., heating) the polymerizable composition to a temperature within the range of about −20° C. to about 250° C., for a time sufficient for polymerization to occur. For example, in certain embodiments of the methods as otherwise described herein, polymerizing the polymerizable composition comprises exposing the polymerizable composition to a temperature within the range of about 0° C. to about 250° C., or 30° C. to about 250° C., or 50° C. to about 250° C., or about 90° C. to about 250° C., or about 100° C. to about 250° C., or about 125° C. to about 250° C., or about 150° C. to about 250° C., or about 180° C. to about 250° C., or about 0° C. to about 200° C., or about 0° C. to about 180° C., or about 0° C. to about 150° C., or about 0° C. to about 100° C., or about 0° C. to about 90° C., or about 0° C. to about 30° C., or about 20° C. to about 225° C., or about 20° C. to about 200° C., or about 20° C. to about 175° C., or about 20° C. to about 150° C., or about 20° C. to about 125° C. or about 20° C. to about 100° C., or about 30° C. to about 225° C., or about 30° C. to about 200° C., or about 30° C. to about 180° C., or about 30° C. to about 150° C., or about 30° C. to about 100° C. or about 30° C. to about 90° C., or about 40° C. to about 200° C., or about 50° C. to about 180° C., or about 90° C. to about 180° C., or about 60° C. to about 170° C., or about 70° C. to about 160° C.

In certain embodiments of the methods as otherwise described herein, polymerizing the polymerizable composition comprises irradiating the polymerizable composition. For example, in certain embodiments of the methods as otherwise described herein, polymerizing the polymerizable composition comprises irradiating the polymerizable composition with light having a wavelength of less than about 400 nm, such as, for example, less than about 350 nm, or less than about 300 nm.

In certain embodiments of the methods as otherwise described herein, polymerizing the polymerizable composition is carried out within the range of about 1 minutes to about 10 days, or about 10 minutes to about 10 days, or about 90 minutes to about 10 days, or 2 hours to about 10 days, or about 3 minutes to about 7 days, or about 10 minutes to about 7 days, or about 90 minutes to about 7 days, or 2 hours to about 7 days, or about 1 minute to about 2 days, or about 3 minutes to about 2 days, or about 10 minutes to about 2 days, or about 90 minutes to about 2 days, or 2 hours to about 2 days, or about 1 minute to about 24 hours, or about 3 minutes to about 24 hours, or about 10 minutes to about 24 hours, or about 90 minutes to about 24 hours, or 2 hours to about 24 hours. The polymerization time may be adjusted by those of skill in the art depending on the desired application, for example, by adjusting the polymerization temperature or irradiation wavelength.

For example, in certain embodiments of the methods as otherwise described herein, the polymerizable composition comprises a borane catalyst comprising a borate complex such as, for example, a carbazole-based compound of Formula IV, and polymerizing the polymerizable composition comprises irradiating the polymerizable composition with light having a wavelength of about 254 nm. In certain such embodiments, irradiation causes the borate complex to react to form a triarylborane, such as, for example, $B(C_6F_5)_3$.

In certain embodiments of the methods as otherwise described herein, irradiating the polymerizable composition comprises using pattered radiation, thereby providing a polymerized material having a shape. In certain such embodiments, pattered radiation is formed using a photomask. In other such embodiments, patterned radiation is formed using diffractive optics. In other such embodiments, patterned radiation is formed by rastering. In certain embodiments, the polymerizable composition is in the form of a thin film. In certain embodiments, the patterned radiation is provided at a surface of a body of the polymerizable composition, and operates to polymerize only a top portion of the polymerizable composition.

Another aspect of the disclosure is a polymerized composition, prepared according to the methods as otherwise described herein. Advantageously, the present inventors have determined that the at least one silicon hydride functional group of the first organosiloxane or organosilane and the at least one heterocycloalkyl functional group of the second organosiloxane or organosilane react, in the presence of the borane catalyst, to form a crosslink comprising a heterocycloalkyl-hydrosilyl addition product. Desirably, formation of the heterocycloalkyl-hydrosilyl addition product does not produce undesirable byproducts. For example, in certain embodiments of the methods as otherwise described herein, polymerizing the polymerizable composition involves the crosslinking reaction of Scheme I:

Scheme I

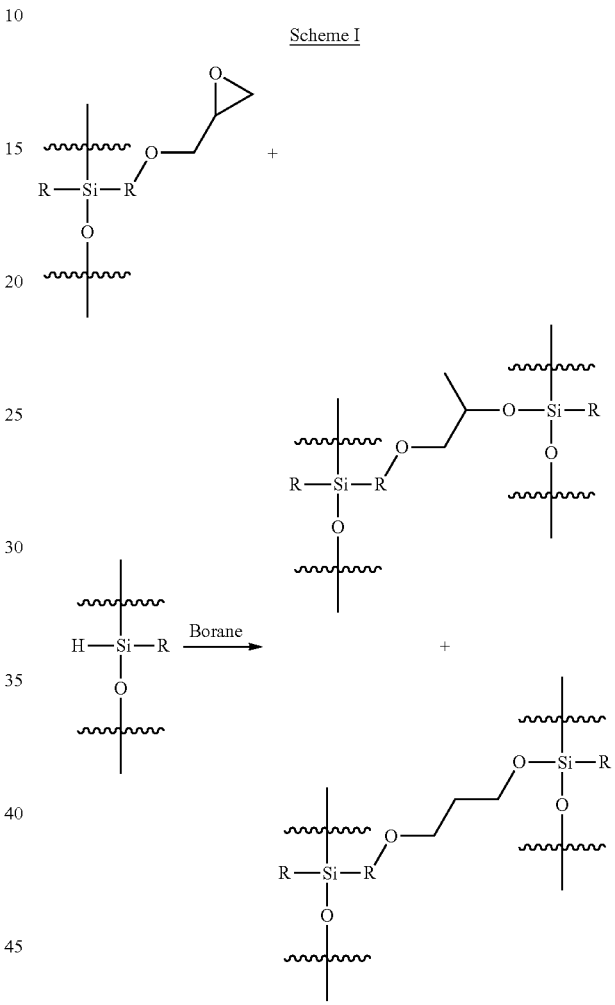

In another example, in certain embodiments of the methods as otherwise described herein, polymerizing the polymerizable composition involves the reaction of Scheme II:

Scheme II

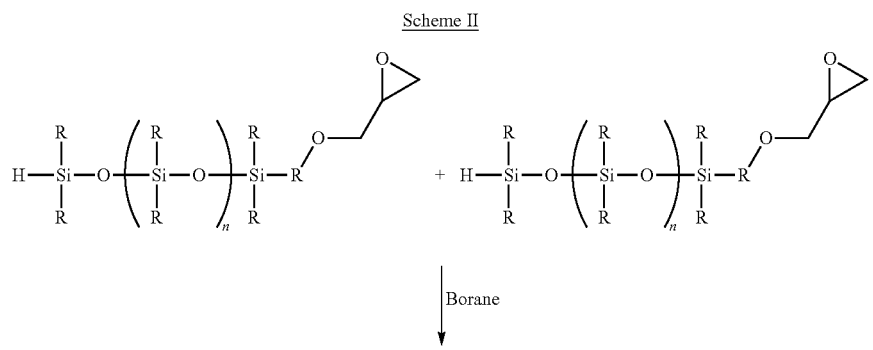

-continued

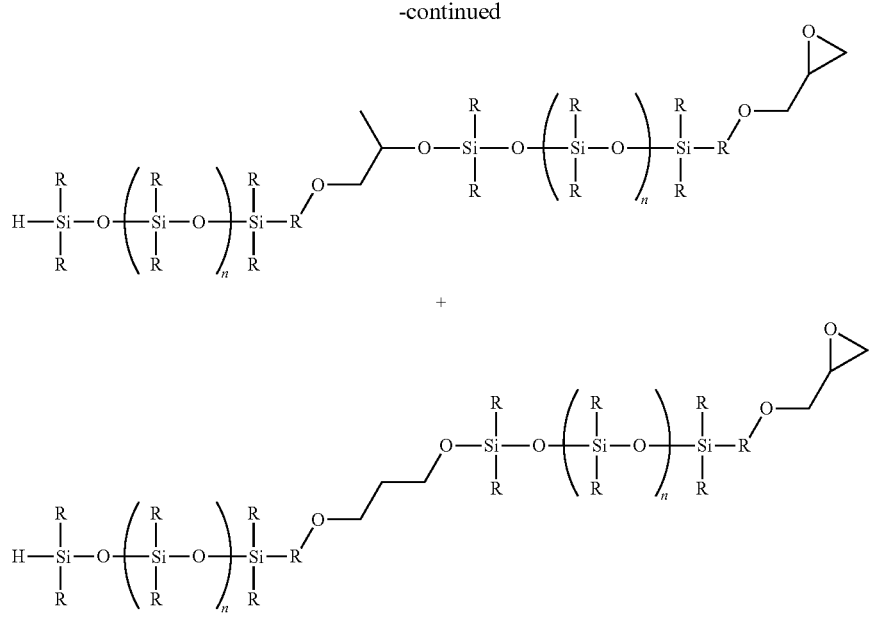

Accordingly another aspect of the disclosure is a polymerized composition that is the polymerized product of a polymerizable composition as otherwise described herein. In certain embodiments of the compositions as otherwise described herein, the molar ratio of a total of heterocycloalkyl-hydrosilyl addition products to a total of heterocycloalkyl-heterocycloalkyl addition products is at least 1.5:1. For example, in certain embodiments of the compositions as otherwise described herein, the molar ratio of a total of heterocycloalkyl-hydrosilyl addition products to a total of heterocycloalkyl-heterocycloalkyl addition products is at least 2:1, or at least 2.5:1, or at least 3:1.

In certain embodiments of the polymerized compositions as otherwise described herein, the molar ratio of a total of heterocycloalkyl-hydrosilyl addition products to a total of unreacted heterocycloalkyl functional groups is at least 10:1. For example, in certain embodiments of the compositions as otherwise described herein, the molar ratio of a total of heterocycloalkyl-hydrosilyl addition products to a total of unreacted heterocycloalkyl functional groups is at least 25:1, or at least 50:1, or at least 75:1, or at least 100:1, or at least about 250:1, or at least about 500:1, at least about 750:1, or at least about 1000:1. The person of ordinary skill in the art will appreciate that, even if a heterocycloalkyl functional group does is not hydrosilylated, it can nonetheless undergo addition between heterocycloalkyl groups.

The polymerized product of a polymerizable composition as otherwise described herein may be further characterized by its tensile properties, such as tensile strength and elongation at break. Tensile properties is measured using ASTM D 412 test method with median peak stress values recorded as pounds per square inch (psi) for tensile strength and peak strain values recorded as percent elongation-at-break. For example, the polymerized product may have elongation of greater than about 25%, for example, greater than about 50%, or greater than about 100%, or greater than 500%, or greater than 800%, or even up to 1200%, or within the range of about 25% to about 800%, or about 50% to about 800%, or about 100% to about 800%, or about 250% to about 800%, or about 500% to about 800%, or about 25% to about 500%, or about 50% to about 500%, or about 100% to about 500%, or about 250% to about 500%, or about 100% to about 800%, or about 250% to about 800%, or about 500% to about 800%. The polymerized product may have tensile strength up to about 425 psi, for example, up to about 400 psi, or up to 300 psi, or up to 200 psi, or within the range of about 95 psi to about 400 psi, or about 95 psi to about 300 psi, or about 95 psi to about 200 psi, or about 125 psi to about 400 psi, or about 125 psi to about 300 psi, or about 125 psi to about 200 psi, or about 150 psi to about 400 psi, or about 150 psi to about 300 psi, or about 150 psi to about 200 psi, or about 200 psi to about 400 psi, or about 300 psi to about 400 psi.

The polymerizable compositions and polymerized products as otherwise described herein may be further characterized by its peel bond strength. Peel bond strength is measured using ASTM C 794 test method, on a polymerized product of the polymerizable composition of the disclosure. For example, in certain embodiments the polymerized product may have peel bond strength within the range of about 25 to about 55 lbs/inch.

The polymerizable compositions and polymerized products as otherwise described herein can have a variety of hardnesses, e.g., in some embodiments, a Shore A durometer (Shore A) hardness up to 65. The Shore hardness is determined in accordance with ASTM C 661 on a polymerized product of the polymerized composition of the disclosure. For example, in certain embodiments the polymerized product of a polymerizable composition as otherwise described herein may have Shore A hardness within the range of about 4 to about 65, of about 9 to about 65, or about 4 to 55, or about 9 to about 55, or about 20 to about 50, such as about 30 to about 50, or about 40 to about 50.

The person of ordinary skill in the art will appreciate that the compositions described herein can find use in a wide variety of applications. They can be formulated as one-part or two-part systems, and the properties can be selected by the person of ordinary skill in the art to be useful in a variety of processes, for example, injection molding, transfer molding, reactive extrusion, continuous printing, batched printing, adhesive techniques, sealing techniques, coating techniques, encapsulation techniques, photolithography, and 3D printing, to name a few. A wide variety of articles can be formed using the compositions and methods described herein, including those suitable for life science applications (e.g., medical or biopharma devices), retail and consumer applications, and various industrial applications (e.g., electronic devices such as microelectronic devices, electrooptic devices, and optical devices, and in construction, fluid system, and automotive applications).

Figure 2:
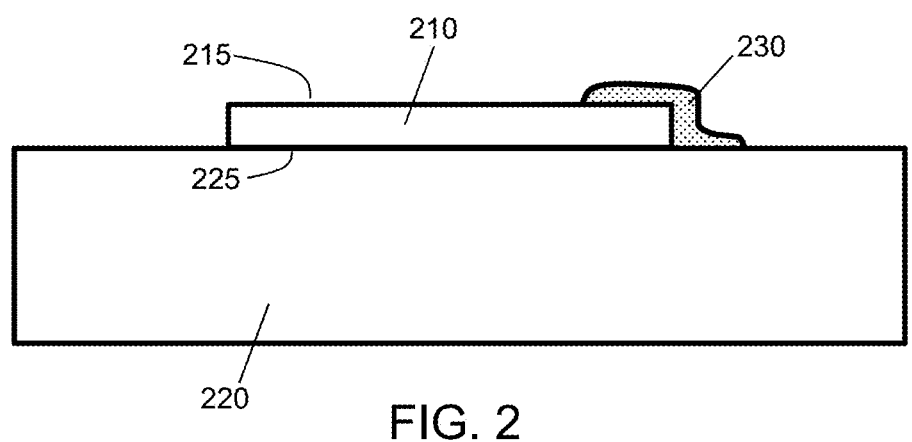
FIG. 2 is a schematic cross-sectional view of an article according to another embodiment of the disclosure.

Another aspect of the disclosure is an article comprising a first surface; a second surface; and a polymerized composition adhering or sealing the first surface to the second surface, wherein the adhesive is a polymerization product of a polymerizable composition according the disclosure. One embodiment of such an article is shown in FIG. 1. Here, a first component 110 has a first surface 115, and a second component has a second surface 125. Polymerized composition 130 adheres the first surface 115 to the second surface 125. Another embodiment of such an article is shown in FIG. 2. Here, a first component 210 has a first surface 215, and a second component has a second surface 225. Polymerized composition 230 seals the first surface 215 to the second surface 225.

While in certain embodiments, the polymerized composition can be substantially completely polymerized. However, as the person of ordinary skill in the art will appreciate, the polymerized compositions need not be fully polymerized; polymerized compositions that retain some degree of unreacted silicon hydride functional groups and/or unreacted reactive heterocycloalkyl functional groups can still provide desirable properties to a material, e.g., adhesive or sealant properties. For example, the polymerized composition may have, in certain embodiments, up to 50 mol %, up to 20 mol %, up to 10 mol %, up to 5 mol %, or up to 1 mol % unreacted silicon hydride functional groups and/or unreacted reactive heterocycloalkyl functional groups.

In certain embodiments of the article of the disclosure, the first surface is a silicone polymer surface; and the second surface is a non-silicone polymer surface (e.g., a polyolefin surface). In certain embodiments of the article of the disclosure, the first surface is a non-silicone polymer surface (e.g., a polyolefin surface); and the second surface is a silicone polymer surface.

The polymerized composition can take many forms. For example, in certain embodiments of the disclosure, the polymerized composition is in the form of a thin film. In certain such embodiments, the thin film may have a thickness of about 1 µm to about 200 µm, or about 5 µm to about 180 µm, or about 30 µm to 150 µm. Of course, in other embodiments, depending on the particular application, the polymerized composition can be provided as a thicker layer, or as a body of any desired shape.

Various articles of the disclosure may be prepared by sealing or affixing a first surface to a second surface. Certain such methods include disposing a polymerizable composition as described herein such that it is in contact with the first surface and the second surface; and then polymerizing the polymerizable composition to adhere or seal the first surface to the second surface.

The compositions of the disclosure can be polymerized in a variety of ways. For example, in certain embodiments as otherwise described herein, the polymerizable composition can be polymerized by thermal polymerization. In certain embodiments, polymerizing the polymerizable composition comprises exposing (e.g., heating) the polymerizable composition to a temperature within the range of about −20° C. to about 250° C. For example, in certain embodiments of the methods as otherwise described herein, polymerizing the polymerizable composition comprises exposing the polymerizable composition to a temperature within the range of about 0° C. to about 250° C., or 30° C. to about 250° C., or 50° C. to about 250° C., or about 90° C. to about 250° C., or about 100° C. to about 250° C., or about 125° C. to about 250° C. or about 150° C. to about 250° C., or about 180° C. to about 250° C., or about 0° C. to about 200° C., or about 0° C. to about 180° C., or about 0° C. to about 150° C., or about 0° C. to about 100° C., or about 0° C. to about 90° C., or about 0° C. to about 30° C., or about 20° C. to about 225° C., or about 20° C. to about 200° C., or about 20° C. to about 175° C., or about 20° C. to about 150° C., or about 20° C. to about 125° C., or about 20° C. to about 100° C., or about 30° C. to about 225° C., or about 30° C. to about 200° C., or about 30° C. to about 180° C., or about 30° C. to about 150° C., or about 30° C. to about 100° C., or about 30° C. to about 90° C. or about 40° C. to about 200° C., or about 50° C. to about 180° C., or about 90° C. to about 180° C., or about 60° C. to about 170° C., or about 70° C. to about 160° C., or about 30° C. to about 90° C.

In certain embodiments of the methods of preparing the article as otherwise described herein, polymerizing the polymerizable composition comprises irradiating the polymerizable composition. For example, in certain embodiments of the methods as otherwise described herein, polymerizing the polymerizable composition comprises irradiating the polymerizable composition with light having a wavelength of less than about 400 nm, such as, for example, less than about 350 nm, or less than about 300 nm.

The exposure and/or irradiation can be performed for an amount of time sufficient to polymerize the material. The person of ordinary skill in the art will select polymerization conditions appropriately. In certain embodiments of the methods of preparing the article as otherwise described herein, polymerizing the polymerizable composition is carried out within the range of about 1 minutes to about 10 days, or about 10 minutes to about 10 days, or about 90 minutes to about 10 days, or 2 hours to about 10 days, or about 3 minutes to about 7 days, or about 10 minutes to about 7 days, or about 90 minutes to about 7 days, or 2 hours to about 7 days, or about 1 minute to about 2 days, or about 3 minutes to about 2 days, or about 10 minutes to about 2 days, or about 90 minutes to about 2 days, or 2 hours to about 2 days, or about 1 minute to about 24 hours, or about 3 minutes to about 24 hours, or about 10 minutes to about 24 hours, or about 90 minutes to about 24 hours, or 2 hours to about 24 hours. The polymerization time may be adjusted by those of skill in the art depending on the desired application, for example, by adjusting the polymerization temperature or irradiation wavelength.

Figure 3:
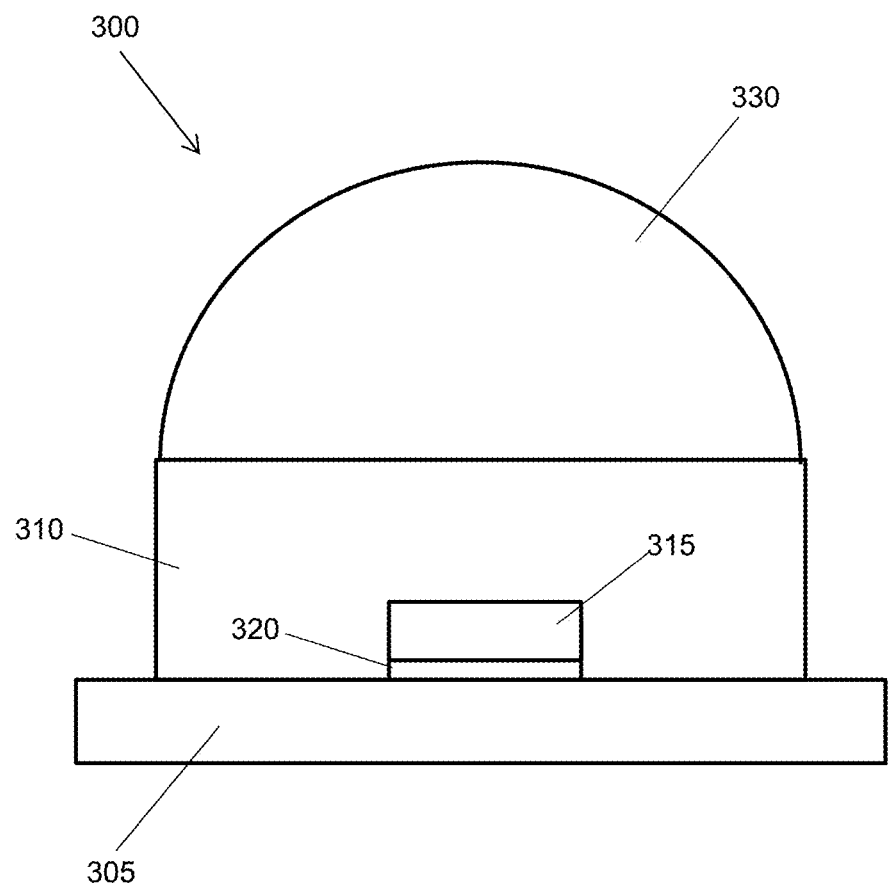
FIG. 3 is a schematic cross-sectional view of an electrooptic device according to one embodiment of the disclosure.

For example, one embodiment of the disclosure is an electrooptic device that includes an electrooptic die; an die attachment material adhering the electrooptic die to a substrate; and an encapsulant material encapsulating the electrooptic die, in which one or more of the die attachment material and the encapsulant material are a polymerized composition of a polymerizable composition as described herein. In certain such embodiments, the encapsulant material is itself shaped as a lens or a mirror. Another embodiment of the disclosure is an electrooptic device that includes an electrooptic die; an die attachment material adhering the electrooptic die to a substrate; an encapsulant material encapsulating the electrooptic die; and an optic material disposed on the encapsulant and configured in an operative optical beam path of the electrooptic die, in which one or more of the die attachment material, the optic material and the encapsulant material are a polymerized composition of a polymerizable composition as described herein. In certain such embodiments, the optic material is shaped as a lens or a mirror. The electrooptic device can be, for example, in the form of a light-emitting diode or a photodetector. One embodiment of an electrooptic device is shown in schematic cross-sectional view in FIG. 3. Here, electrooptic device 300 (in the form of a light-emitting diode) includes an electrooptic die 315, adhered to a substrate 305 by die attachment material 320; an encapsulant material 310; and an optic material 330 shaped as a lens. Any or all of the die attachment material, the encapsulant material and the optic material can be formed of a polymerized composition of a polymerizable composition as described herein.

Another aspect of the disclosure is a polymerizable composition that includes
one or more organosiloxanes or organosilanes, the one or more organosiloxanes or organosilanes comprising one or more of
one or more first organosiloxanes or organosilanes, each comprising a plurality of silicon hydride functional groups, present in an amount within the range of about 0.05 wt % to about 90 wt %;
one or more second organosiloxanes or organosilanes, each comprising a plurality of reactive heterocycloalkyl functional groups, present in an amount within the range of about 0.05 wt % to about 90 wt %; and
one or more third organosiloxanes or organosilanes, each comprising at least about one silicon hydride functional group and at least about one reactive heterocycloalkyl functional group, present in an amount within the range of about 0.05 wt % to about 90 wt %;
one or more tackifiers, present in an amount within the range of about 10 wt % to about 99.95 wt %; and
an effective amount of a borane catalyst, present, for example, in an amount within the range of 0.0005 wt % to about 10 wt %,
wherein the ratio of reactive heterocycloalkyl functional groups to reactive silicon hydride functional groups in the composition is in the range of 1:5 to 5:1.

Such compositions can be formulated and cured, for example, as otherwise as described above.

In certain embodiments (i.e., to make a pressure-sensitive adhesive) the polymerizable compositions of the disclosure include one or more tackifiers. The one or more tackifiers is present in an amount within the range of about 10 wt % to about 99.95 wt % based on the total weight of the polymerizable composition. For example, in certain embodiments of the compositions as otherwise described herein, one or more tackifiers is present in an amount within the range of about 10 wt % to about 99 wt %, or about 10 wt % to about 95 wt %, or about 10 wt % to about 90 wt %, or about 10 wt % to about 85 wt %, or about 10 wt % to about 80 wt %, or about 10 wt % to about 75 wt %, or about 10 wt % to about 70 wt %, or about 10 wt % to about 65 wt %, or about 10 wt % to about 60 wt %, or about 10 wt % to about 55 wt %, or about 10 wt % to about 50 wt %, or about 10 wt % to about 45 wt %, or about 10 wt % to about 40 wt %, or about 10 wt % to about 35 wt %, or about 10 wt % to about 30 wt %, or about 15 wt % to about 99.95 wt %, or about 20 wt % to about 99.95 wt %, or about 20 wt % to about 99 wt %, or about 20 wt % to about 95 wt %, or about 20 wt % to about 90 wt %, or about 20 wt % to about 85 wt %, or about 20 wt % to about 80 wt %, or about 02 wt % to about 75 wt %, or about 20 wt % to about 70 wt %, or about 20 wt % to about 65 wt %, or about 20 wt % to about 60 wt %, or about 20 wt % to about 55 wt %, or about 20 wt % to about 50 wt %, or about 20 wt % to about 45 wt %, or about 20 wt % to about 50 wt %, or about 20 wt % to about 45 wt %, or about 20 wt % to about 40 wt %, or about 20 wt % to about 35 wt %, or about 20 wt % to about 30 wt %, or about 15 wt % to about 99.95 wt %, or about 20 wt % to about 99.95 wt %, or about 25 wt % to about 99.95 wt %, or about 30 wt % to about 99.95 wt %, or about 35 wt % to about 99.95 wt %, or about 40 wt % to about 99.95 wt %, or about 45 wt % to about 99.95 wt %, or about 50 wt % to about 99.95 wt %, or about 55 wt % to about 99.95 wt %, or about 60 wt % to about 99.95 wt %, or about 65 wt % to about 99.95 wt %, or about 70 wt % to about 99.95 wt %, or about 50 wt % to about 95 wt %, or about 50 wt % to about 90 wt %, or about 50 wt % to about 85 wt %, or about 50 wt % to about 80 wt %, or about 25 wt % to about 75 wt %, or about 30 wt % to about 70 wt % based on the total weight of the polymerizable composition.

The tackifier can be any that is known in the art suitable for use in pressure-sensitive adhesives and includes both solid and liquid tackifiers. The tackifier can include, but is not limited to, amorphous tackifier resins of all types known to tackify adhesives, including silicone-based (including dendrimeric silicones), rosin-based and hydrogenated rosin-based, hydrocarbon resin-based and hydrogenated hydrocarbon resin-based, phenolic resin-based, terpene resin-based, terpene phenolic resin-based, styrenated terpene resin-based, hydrogenated terpene resin-based, polyester resin-based, pure monomer aromatic-based, aromatic acrylic-based, liquid resin types, and functionalized types thereof. These tackifiers may also be in a hydrogenated form.

In certain embodiments of the compositions as otherwise described herein, the one or more tackifiers include terpene resins, petroleum hydrocarbons resins, piperylene and isoprene resin, hydrogenated resins, and silicone resins.

The person of ordinary skill in the art will appreciate that the first, second, and/or third organosiloxanes or organosilanes and the tackifier can be combined in various combinations and amounts. For example, in certain embodiments as otherwise described herein, the composition includes one or more first organosiloxanes or organosilanes present in an amount within the range of about 0.05 wt % to about 30 wt %; one or more second organosiloxanes or organosilanes present in an amount within the range of about 70 wt % to about 89.95 wt %; and one or more tackifiers in an amount within the range of about 10 wt % to about 30 wt %. In other embodiments as otherwise described herein, the composition includes one or more first organosiloxanes or organosilanes present in an amount within the range of about 1 wt % to about 30 wt %, about 5 wt % to about 30 wt %, or about 10 wt % to about 30 wt %; one or more second organosiloxanes or organosilanes present in an amount within the range of about 70 wt % to about 89.5 wt %, about 70 wt % to about 85 wt %, or about 70 wt % to about 80 wt %; and one or more tackifiers present in an amount within the range of about 10 wt % to about 30 wt %, about 15 wt % to about 30 wt %, or about 20 wt % to about 30 wt %. In other embodiments as otherwise described herein, the composition includes one or more first organosiloxanes or organosilanes present in an amount within the range of about 30 wt % to about 70 wt %; one or more second organosiloxanes or organosilanes present in an amount within the range of about 15 wt % to about 55 wt %; and one or more tackifiers present in an amount within the range of about 15 wt % to about 55 wt %. In other embodiments as otherwise described herein, the composition includes one or more first organosiloxanes or organosilanes present in an amount within the range of about 40 wt % to about 59.95 wt %; one or more second organosiloxanes or organosilanes present in an amount within the range of about 0.05 wt % to about 30 wt %; and one or more tackifiers present in an amount within the range of about 40 wt % to about 59.9 wt %. In certain such embodiments, substantially no third organosiloxane or organosilane is present (e.g., no more than 0.5 wt %, or no more than 0.1 wt %).

In other embodiments as otherwise described herein, the composition includes one or more third organosiloxanes or organosilanes present in an amount within the range of about 30 wt % to about 90 wt %; and one or more tackifiers in an amount within the range of about 10 wt % to about 70 wt %. For example, in certain such embodiments, the one or more third organosiloxanes or organosilanes is present in an amount within the range of about 50 wt % to about 90 wt %, or about 70 wt % to about 90 wt %. In certain such embodiments, substantially no first organosiloxane or organosilane or second organosiloxane or organosilane is present (e.g., no more than 0.5 wt %, or no more than 0.1 wt % of each).

In other embodiments as otherwise described herein, a polymerizable composition includes one or more first organosiloxanes or organosilanes in an amount within the range of about 5 wt % to about 75 wt %; one or more second organosiloxanes or organosilanes in an amount up to about 75 wt %; one or more third organosiloxanes or organosilanes in an amount up to about 75 wt %; and one or more tackifiers in an amount in the range of about 10 wt % to about 85 wt %.

In other embodiments as otherwise described herein, the one or more tackifiers is present in a total amount in the range of about 20 wt % to about 80 wt %, and the total amount of any first organosiloxanes or organosilanes, any second organosiloxanes or organosilanes and any third organosiloxanes or organosilanes is in the range of about 15 wt % to about 85 wt %.

In other embodiments as otherwise described herein, the one or more tackifiers is present in a total amount in the range of about 20 wt % to about 80 wt %, and the total amount of any first organosiloxanes or organosilanes, any second organosiloxanes or organosilanes, and any third organosiloxanes or organosilanes is in the range of about 15 wt % to about 85 wt %.

Another aspect of the disclosure is an article comprising a substrate; and an adhesive disposed on a first surface of the substrate, wherein the adhesive is a polymerized product of a polymerizable composition according the disclosure.

Figure 4:
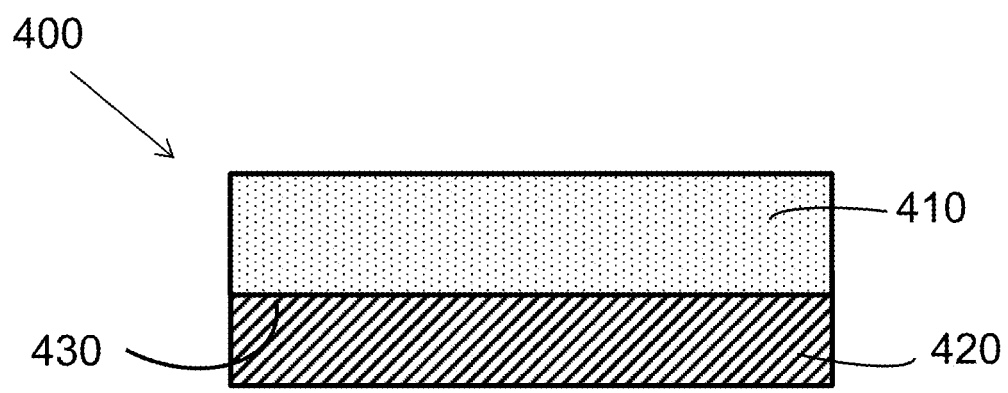
FIG. 4 is a schematic cross-sectional view of an article according to one embodiment of the disclosure.

One embodiment of the article of the disclosure is illustrated in FIG. 4. Here, article 400 includes a substrate 410 and the adhesive 420 (e.g., a polymerized product of a polymerizable composition according the disclosure) in contact with the substrate surface 430. The substrate surface 430 may comprise a primer coating (not shown).

In certain embodiments of the article of the disclosure, the substrate is a backing liner. Standard backing liner may be used, such cellulosic material (e.g. paper), non-silicone film (e.g., thermoplastic material or polymer, blends of polymers, or filled polymer films), cardboard, stock card, woven and nonwoven webs, glass (e.g., uncoated cloth or cloth coated with PTFE/silicone rubber), glass foil, foams, composite film-foams, metal sheet, metal foil, glass, ceramic, etc. The backing liner may include a single layer or consist of multiple layers including one layer that provides desired rheological and surface properties and another layer which provides the desired physical properties such as tear, elongation, and tensile properties. The single or multiple layer backing liner may be produced in conventional manners such as by casting, calendaring, and extrusion. Further laminating and coextruding techniques may be used to form multiple layer backing liner. In certain embodiments, the backing liner may be paper, such as kraft paper. The exact weight of the paper can vary, and illustrative weights include, but are not limited to, about 25 pounds to about 96 pounds per thousand square feet, for example about 96 pounds per thousand square feet, or about 75 pounds per thousand square feet, or about 60 pounds per thousand square feet, or about 42 pounds per thousand square feet. In certain embodiments, the backing liner may polymer film, such as polyethylene terephthalate (PET), polyethylene (PE), high density polyethylene (HDPE), polypropylene (PP), polytetrafluoroethylene (PTFE), polyester, polyimide, and polyolefin. The exact thickness of the polymer film can vary, and illustrative thicknesses include, but are not limited to, about 0.4 mil to about 20 mils, for example about 1 mils, or about 2 mils, or about 3 mils, or about 4 mils, or about 1 mil to about 4 mils, or about 0.4 mil to about 40 mils, or about 1 mils to about 40 mils, or about 2 mils to about 40 mils, or about 5 mil to about 40 mils, or about 10 mils to about 40 mils, or about 20 mils to about 40 mils, or about 1 mils to about 20 mils, or about 2 mils to about 20 mils, or about 5 mil to about 20 mils, or about 10 mils to about 20 mils.

In certain embodiments, the substrate is a release liner. In other embodiments, a separate release liner is used in conjunction with the adhesive disposed on a substrate. A release liner is configured to allow the adhesive to release cleanly therefrom, so that it can be peeled away to expose adhesive surface. The release liner can be coated with a suitable release coating, or can be formed from a material that itself provides suitable release properties. Release coatings and materials are known and include materials such as, for example, silicone (such as fluorosilicone), fluoropolymers, polyethylene, polycarbamate, polyacrylics, and the like. In certain embodiments, the release coating may be coated onto the release liner to form a release coat with a dry coat weight from 0.5 to 6 g/m$^2$, e.g., from 2 to 3 g/m$^2$.

Figure 5:
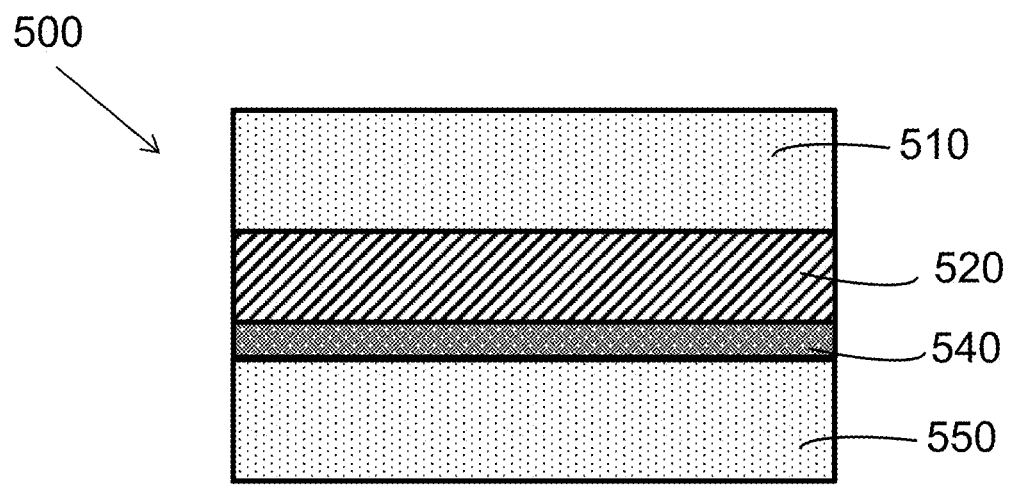
FIG. 5 is a schematic cross-sectional view of an article according to one embodiment of the disclosure.

One embodiment of the article of the disclosure comprising a release coating is illustrated in FIG. 5. Here, article 500 includes a substrate 510 that is in contact with the first surface of the adhesive 520 (e.g., a polymerized product of a polymerizable composition according the disclosure). The surface of the substrate 510 that is in contact with the adhesive may comprise a primer coating (not shown). The article also comprises a release liner 550 coated with a release coating 540 in contact with the second surface of the adhesive 520.

Figure 6:
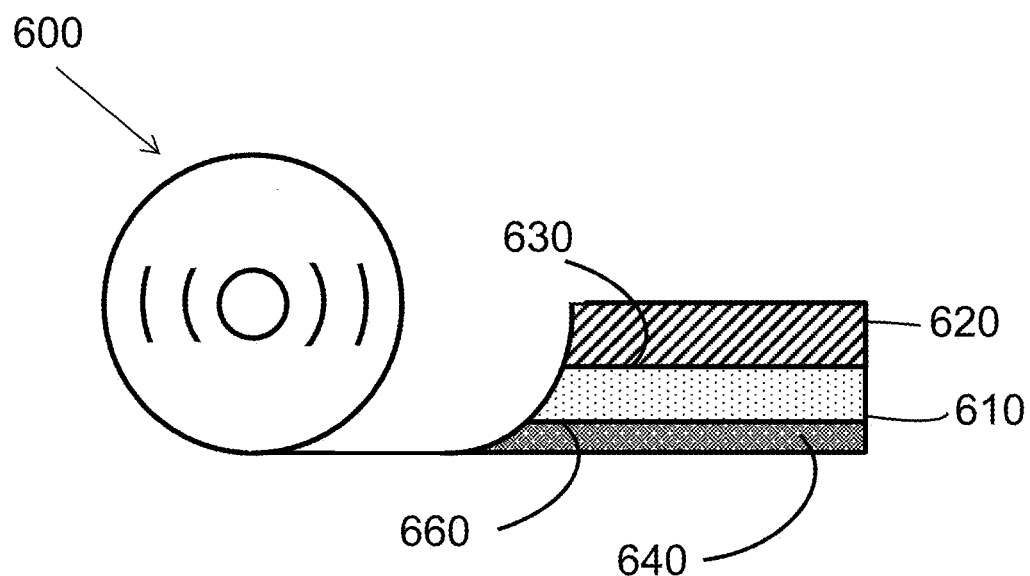
FIG. 6 is a schematic cross-sectional view of an article according to one embodiment of the disclosure.

In certain embodiments, such as those for applications of a single-sided tape, the side of the release liner surface opposite of the surface in contact with the adhesive may be coated with a suitable release coating. Such embodiment of the article of the disclosure is illustrated in FIG. 6. Here, article 600 in a form of a roll includes a substrate 610 and the adhesive 620 (e.g., a polymerized product of a polymerizable composition according the disclosure) in contact with the first surface 630 of the substrate. The surface 630 may comprise a primer coating (not shown). The substrate 610 also comprises a release coating 640 in contact with the second surface 660 of the substrate. When article 300 is rolled up, the adhesive 620 is in contact with the release coating 640.

The release liner may also be coated with a suitable release primer, which acts to improve anchorage of the adhesive to the release liner. Suitable primers include, but are not limited to, solvent-based or aqueous acrylic polymers, ethylene-vinyl acetate copolymers, fluorinated polymers, ethylene-vinyl acetate-acrylic copolymers, styrene-butadiene copolymers, and styrene-butadiene-acrylonitrile copolymers. In certain embodiments, the primer may be coated onto the release liner to form a primer coat with a dry coat weight from 0.5 to 6 g/m², e.g., from 2 to 3 g/m². The layer of adhesive as otherwise described herein is then applied to the primer coat.

The release force properties of the release liner will vary depending on the use of the article. Release force is measured using PSTC 4 test procedure ("Relative Performance of Release Coatings") as set forth in Pressure Sensitive Tape Council Test Methods. For example, the release liner may have release force of about 1 gf/inch to about 150 gf/inch, for example, about 1 gf/in to about 100 gf/inch, or about 1 gf/in to about 50 gf/inch, or about 1 gf/in to about 10 gf/inch, or about 10 gf/in to about 150 gf/inch, or about 10 gf/in to about 100 gf/inch, or about 10 gf/in to about 50 gf/inch, or about 50 gf/in to about 150 gf/inch, or about 50 gf/in to about 100 gf/inch, or about 100 gf/in to about 150 gf/inch.

In one embodiment of the article of the disclosure, the adhesive is in the form of a thin film. In certain such embodiments, the thin film may have a thickness of about 0.01 µm to about 500 µm, about 0.01 µm to about 200 µm, about 0.01 µm to about 1 µm, or about 0.01 µm to about 0.5 µm, or about 0.01 µm to 0.1 µm, or about 0.01 µm to 0.07 µm, or about 0.04 µm to 0.07 µm, or about 1 µm to about 200 µm, or about 5 µm to about 180 µm, or about 30 µm to 150 µm.

One of skill in the art may select the adhesive with particular adhesion properties depending on the desired use, generally ranging from about 0.01 N/dm to about 100 N/dm, for example, about 0.1 N/dm to about 100 N/dm, or about 1 N/dm to about 100 N/dm, or about 10 N/dm to about 100 N/dm, or about 50 N/dm to about 100 N/dm, or about 0.01 N/dm to about 80 N/dm, or about 0.1 N/dm to about 80 N/dm, or about 1 N/dm to about 80 N/dm, or about 10 N/dm to about 80 N/dm, or about 50 N/dm to about 80 N/dm, or about 0.01 N/dm to about 50 N/dm, or about 0.1 N/dm to about 50 N/dm, or about 1 N/dm to about 50 N/dm, or about 10 N/dm to about 50 N/dm, at a peel angle of 180°, measured according to PSTC-1 and PSTC-3 at a peel rate of 12.7 cm/min. Adhesives having higher peel adhesion levels will usually require backing liner having a higher tensile strength.

In certain embodiments, the articles of the disclosure have service temperature within the range of −80° C. to about 300° C.

The article of the disclosure may be prepared by disposing a polymerizable composition of the disclosure onto a substrate; and polymerizing the polymerizable composition to provide an adhesive disposed on the substrate.

Particular experiments can be performed as described below:

One or more organosiloxanes and the tackifier are added to a glass container. Solvent is optionally added to provide a homogeneous mixture. A mechanical mixer is then used to stir the mixture. The borane catalyst is then added dropwise to the mixture, and the mixing is continued for another 30 minutes. The mixture is then applied to the backing liner, and after removing any solvent by evaporation, and appropriate curing, the article of the disclosure is obtained.

An article of the disclosure is prepared according to the general procedure provided above, with the suitable materials outlined in the table below.

| Ex. No. | Backing liner | Adhesive thickness |
|---|---|---|
| 1 | 1 mil polyethylene terephthalate (PET) | 2 mil (~50 µm) |
| 2 | 4 mil high density polyethylene (HDPE) | 2 mil (~50 µm) |

In certain embodiments, the polymerizable compositions as otherwise described herein has, when polymerized, a release force of no more than 200 gf/inch (e.g., no more than 100 gf/inch or no more than 50 gf/inch) as measured by PSTC 4 test procedure.

The term "release force" relates to the force required to remove a unit width of pressure sensitive adhesive tape, which has been in contact with a release liner for a given period of time, from a standard test panel, as measured by the PSTC 4 test procedure ("Relative Performance of Release Coatings") as set forth in the Pressure Sensitive Tape Council Test Methods, hereby incorporated herein by reference in its entirety. Notably, the polymerized products of the compositions of the disclosure have release forces of no more than about 200 gf/inch, e.g., no more than about 100 gf/inch, no more than about 75 gf/inch, no more than about 50 gf/inch, no more than about 25 gf/inch, no more than about 10 gf/inch or even no more than about 5 gf/inch; such release forces can make the materials particularly suitable as release materials. In certain embodiments, the polymerized products have a release force in the range of about 1 gf/inch to about 200 gf/inch, or about 1 gf/inch to about 100 gf/inch, or about 1 gf/inch to about 75 gf/inch, or about 1 gf/inch to about 50 gf/inch, or about 1 gf/inch to about 25 gf/inch, or about 1 gf/inch to about 10 gf/inch, or about 5 gf/inch to about 150 gf/inch, or about 5 gf/inch to about 100 gf/inch, or about 5 gf/inch to about 75 gf/inch, or about 5 gf/inch to about 50 gf/inch, or about 5 gf/inch to about 25 gf/inch, or about 10 gf/inch to about 150 gf/inch, or about 10 gf/inch to about 100 gf/inch, or about 10 gf/inch to about 75 gf/inch, or about 10 gf/inch to about 50 gf/inch, or about 25 gf/inch to about 150 gf/inch, or about 25 gf/inch to about 100 gf/inch, or about 25 gf/inch to about 75 gf/inch, or about 25 gf/inch to about 50 gf/inch. Based on the disclosure herein, the person of ordinary skill in the art will provide a material having a desired release force.

In certain desirable embodiments, the first organosiloxane or organosilane includes one or more aryl (e.g., phenyl or substituted phenyl such as fluorophenyl or alkylphenyl) groups and/or one or more fluorinated groups (e.g., fluoroaryl or fluoroalkyl groups). Use of such materials in appropriate amounts, as determined by the person of ordinary skill in the art based on the present disclosure, can help to provide a lower release force.

Second organosiloxanes or organosilanes that include, for example, aryl groups (e.g., phenyl or substituted phenyl such as fluorophenyl or alkylphenyl) and/or fluorinated groups (e.g., fluorinated alkyl or fluorinated aryl) can help to provide desirably low release forces.

As above, third organosiloxanes or organosilanes including fluorinated groups or aryl groups can help to provide a desirably low release force.

Another aspect of the disclosure is a release layer disposed on a first surface; the release layer being a polymerization product of a polymerized product of a polymerizable composition as described herein.

Figure 7:
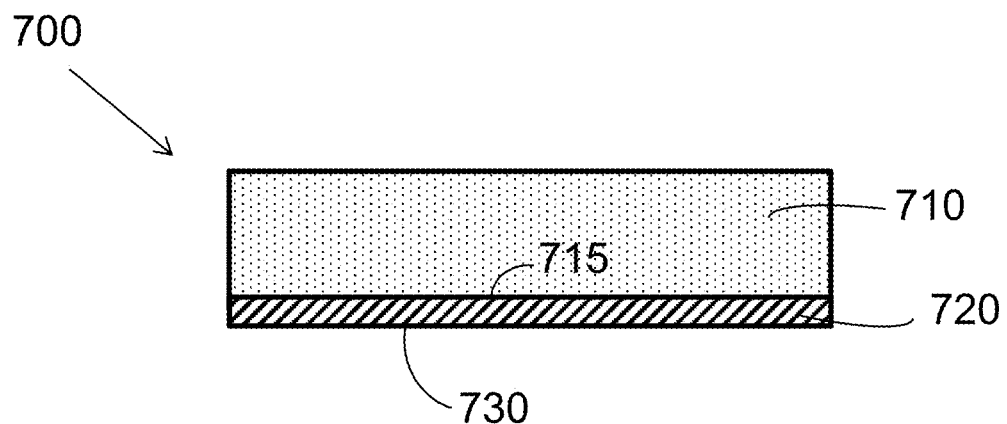
FIG. 7 is a schematic cross-sectional view of a structure including a release material according to one embodiment of the disclosure.

One embodiment of a release layer of the disclosure is illustrated in FIG. 7, here configured as a release liner. Release liner 700 includes a liner backing 710, having a first surface 715, having a release layer 720 disposed thereon. The release layer 720 has a liner release surface 730. The liner release surface of the release layer can provide a low release force as described above, and thus can provide the desired release characteristics to the liner.

In certain embodiments of the release liner of the disclosure, the first surface is a liner backing. Standard liner backing may be used, such as cellulosic material such as paper, non-silicone film (e.g., thermoplastic material or polymer, blends of polymers, or filled polymer films), cardboard, stock card, woven and nonwoven webs, foams, composite film-foams, metal sheet, metal foil, glass, ceramic, etc. The liner backing may include a single layer or consist of multiple layers including one layer that provides desired rheological and surface properties and another layer which provides the desired physical properties such as tear, elongation, and tensile properties. The single or multiple layer liner backing may be produced in conventional manners such as by casting, calendaring, and extrusion. Further laminating and coextruding techniques may be used to form multiple layer liner backing. In certain embodiments, the liner backing may be paper, such as kraft paper. The exact weight of the paper can vary, and illustrative weights include, but are not limited to, about 25 pounds to about 96 pounds per thousand square feet, for example about 96 pounds per thousand square feet, or about 75 pounds per thousand square feet, or about 60 pounds per thousand square feet, or about 42 pounds per thousand square feet. In certain embodiments, the liner backing may polymer film, such as polyethylene terephthalate (PET), polyethylene (PE), high density polyethylene (HDPE), polypropylene (PP), and polyolefin. The exact thickness of the polymer film can vary, and illustrative thicknesses include, but are not limited to, about 0.4 mil to about 20 mils, for example about 1 mils, or about 2 mils, or about 3 mils, or about 4 mils, or about 1 mil to about 4 mils.

Figure 8:
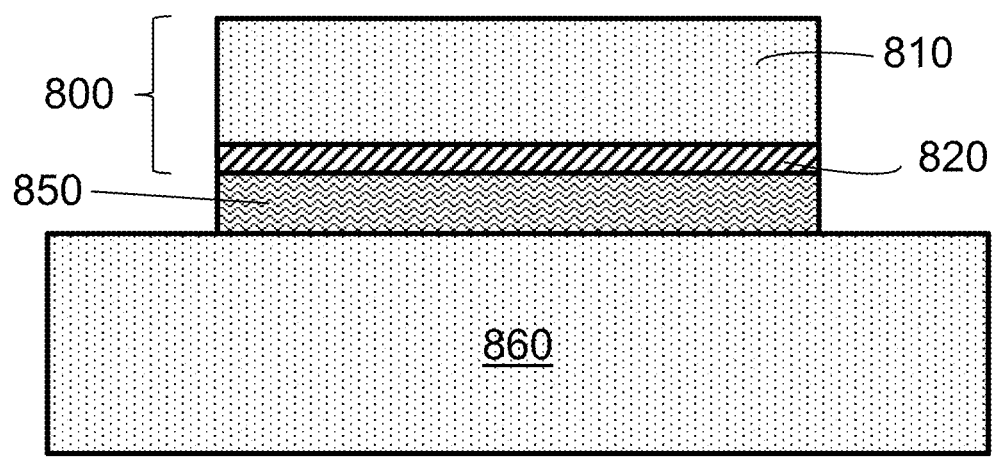
FIG. 8 is a schematic cross-sectional view of a structure including a release material according to one embodiment of the disclosure.

Another embodiment is shown in schematic cross-sectional view in FIG. 8. A release liner 200 (including liner backing 810 and release layer 820) is disposed with its release layer against an adhesive 850 (e.g., a pressure sensitive adhesive.) The adhesive is disposed on a substrate 860. The release liner can be removed, with the low release force of the release layer allowing separation between the release layer and the adhesive, thereby exposing the adhesive, which can be used to adhere another article to the substrate.

But the person of ordinary skill in the art will appreciate that the release layers described herein can provide release properties (and other properties, such as antifouling properties) to a wide variety of articles. Accordingly, the release layers described can be formed on any desirable surface, to provide desirable release properties thereto. The person of ordinary skill in the art will appreciate that the compositions and release layers described herein can find use in a wide variety of applications. A wide variety of articles can be formed using the compositions and methods described herein, including those suitable for life science applications (e.g., medical or biopharma, devices), retail and consumer applications (such as pressure-sensitive adhesive materials), and various industrial applications (e.g., electronic devices such as microelectronic devices, electrooptic devices, and optical devices, and in construction, fluid system, and automotive applications). In certain embodiments, the release layer of the disclosure is used for a pressure-sensitive adhesive tape, a pressure-sensitive adhesive film, a label, or a medical dressing.

The release layer may be applied on the liner backing in a thickness sufficient to provide desired release force properties. In one embodiment of the disclosure, the coating is in the form of a thin film. In certain such embodiments, the thin film may have a thickness of about 0.01 µm to about 20 µm, or about 0.01 µm to about 10 µm, or about 0.01 µm to about 5 µm, or 0.01 µm to about 1 µm, or about 0.01 µm to about 0.5 µm, or about 0.01 µm to 0.1 µm, or about 0.01 µm to 0.07 µm, or about 0.04 µm to 0.07 µm.

The release layer as otherwise described herein may be further characterized by improved release force properties. Release force may be measured using PSTC 4 test procedure ("Relative Performance of Release Coatings") as set forth in Pressure Sensitive Tape Council Test Methods. For example, the release layer may have release force of no more than 200 gf/inch (e.g., no more than 100 gf/inch or no more than 50 gf/inch), for example, about 1 gf/in to about 100 gf/inch, or about 1 gf/in to about 50 gf/inch, or about 1 gf/in to about 10 gf/inch, or about 10 gf/in to about 150 gf/inch, or about 10 gf/in to about 100 gf/inch, or about 10 gf/in to about 50 gf/inch, or about 50 gf/in to about 150 gf/inch, or about 50 gf/in to about 100 gf/inch, or about 100 gf/in to about 150 gf/inch.

The release layer of the disclosure may be prepared by the method comprising: disposing a polymerizable composition of the disclosure onto a first surface; and polymerizing the polymerizable composition to provide the release layer. A general method for doing so is described: One or more organosiloxanes are added to a glass container. The mixture is then dissolved in toluene until homogeneous solution is obtained. A mechanical mixer is then used to stir the mixture. During the mixing, the glass container is kept at a temperature of 60° C. The borane catalyst is then added dropwise to the mixture, and the mixing is continued for another 30 minutes. The mixture is then applied to the liner backing, and after removing solvent by evaporation, the release liner of the disclosure was obtained.

A release liner of the disclosure is prepared according to the general procedure provided above. The materials used are outlined in the table below.

| Ex. No. | Liner backing | Release coating weight/thickness |
|---|---|---|
| 1 | 95 lb/ream[1] Machine Glazed (MG) paper | 1.5 lb/ream<br>1/16 µm or 1/25 µm |
| 2 | 59 lb/ream Kraft paper | 1.5 lb/ream<br>1/16 µm or 1/25 µm |
| 3 | 1 mil polyethylene terephthalate (PET) | 1 lb/ream<br>1/16 µm or 1/25 µm |
| 4 | 4 mil high density polyethylene (HDPE) | 1 lb/ream<br>1/16 µm or 1/25 µm |

[1]ream = 3000 sq ft

The materials of the disclosure are further described by the example formulations below:

Example 1

Two formulations were prepared:

| Component | amount (wt %) |
|---|---|
| Formulation A | |
| Trimethylsilyl terminated poly(dimethylsiloxane-co-methylhydrosiloxane) CAS: 68037-59-2 Viscosity: 8,000~11,000 cSt; Hydride content: ~5% mole | 4.65 |
| Trimethylsilyl terminated poly(dimethylsiloxane-co-methylhydrosiloxane) Viscosity: 5,000~8,000 cSt; Hydride content: ~1% mole | 18.60 |

-continued

| Component | amount (wt %) |
|---|---|
| Hydride-terminated polydimethylsiloxane CAS: 70900-21-9 Viscosity: ~10,000 cSt Hydride content: ~0.23% mole | 23.26 |
| Hydride-terminated polydimethylsiloxane CAS: 70900-21-9 Viscosity: ~500 cSt Hydride content: ~3.3% mole | 9.30 |
| Hydride-terminated polydimethylsiloxane CAS: 70900-21-9 Viscosity: ~100 cSt Hydride content: ~0.23% mole | 4.65 |
| Hydride-terminated polydimethylsiloxane CAS: 70900-21-9 Viscosity: 7~10 cSt Hydride content: ~14% mole | 1.86 |
| (Epoxypropoxypropyl Methylsiloxane)-(Dimethylsiloxane) Copolymer CAS: 68440-71-7 Viscosity: 200~300 cSt Epoxy content: ~6 Eq/kg | 1.40 |
| Epoxy-terminated epoxy-side chain polydimethylsiloxane X-22-9002 (Shin-Etsu) | 23.26 |
| Silica (R106) (Evonik) | 13.02 |
| total | 100 |
| BCF (Sigma) | 100 ppm |

Formulation B

| Component | amount (wt %) |
|---|---|
| Trimethylsilyl terminated poly(dimethylsiloxane-co-methylhydrosiloxane) CAS: 68037-59-2 Viscosity: 8,000~11,000 cSt; Hydride content: ~5% mole | 4.44 |
| Trimethylsilyl terminated poly(dimethylsiloxane-co-methylhydrosiloxane) Viscosity: 5,000~8,000 cSt; Hydride content: ~1% mole | 17.78 |
| Hydride-terminated polydimethylsiloxane CAS: 70900-21-9 Viscosity: ~10,000 cSt Hydride content: ~0.23% mole | 22.23 |
| Hydride-terminated polydimethylsiloxane CAS: 70900-21-9 Viscosity: ~500 cSt Hydride content: ~3.3% mole | 8.88 |
| Hydride-terminated polydimethylsiloxane CAS: 70900-21-9 Viscosity: ~100 cSt Hydride content: ~0.23% mole | 4.44 |
| Hydride-terminated polydimethylsiloxane CAS: 70900-21-9 Viscosity: 7~10 cSt Hydride content: ~14% mole | 1.78 |
| (Epoxypropoxypropyl Methylsiloxane)-(Dimethylsiloxane) Copolymer CAS: 68440-71-7 Viscosity: 200~300 cSt Epoxy content: ~6 Eq/kg | 1.33 |
| Epoxy-terminated epoxy-side chain polydimethylsiloxane X-22-9002 (Shin-Etsu) | 22.23 |
| Silica (R812S) (Evonik) | 16.89 |
| total | 100 |
| BCF (Sigma) | 100 ppm |

The silicone fluids were first weighed and mixed to homogeneity. Silica particles were slowly added and mixed first by hand, then in a high-speed mixer under the following program twice: 800 rpm for 15 s, 2750 rpm for 45 s, 1000 rpm for 15 s, and finally 2000 rpm for 30 s. Catalyst (tris(pentafluorophenyl)borane, BCF) was then added and mixed by hand to homogeneity. The mixture was degassed hunder house vacuum for 15 minutes, then cured in a mold at 100 C for 10 minutes under 10 tons of force in the mold.

Tensile strength was tested by cutting a slab of the cured material using an ASTM-D638 type V cutter. The dimensions of the specimen were measured. The specimen was loaded into the grips of a tensile strength test instrument, and measurements were taken at a speed of two inches per minute.

Tear strength was determined by cutting a slab of the cured material using an ASTM-D624 Type B slit cutter. The dimensions of the specimen were measured, The specimen was loaded into the grips of a tensile strength test instrument, and measurements were taken at a speed of two inches per minute.

Formulation A and Formulation B had the tensile properties listed in the table below:

|  | Formulation A | Formulation B |
|---|---|---|
| Hardness (Shore A) | ~23 | ~25 |
| Break elongation (%) | ~325 | ~300 |
| Modulus at 100% (psi) | ~74.32 | ~39.4 |
| Tear strength (lbf/in) | ~19.45 | ~9.21 |

Example 2

In another experiment, 1.86 grams of EMS-622 ([5-7% (epoxypropoxypropyl)methylsiloxane]-dimethyl siloxane copolymer, 200-300 cSt, Gelest) and BCF (100 ppm) were combined and mixed to homogeneity in a petri dish, then 10 grams of DMS H-25 (Hydride Terminated PDMS, 500 cSt, Gelest) was added and the mixture was mixed to homogeneity. The petri dish was put in a vacuum oven at room temperature to remove bubbles and provide a transparent mixture, and then transferred to a 80° C. oven for curing for two hours.

Figure 9:
FIG. 9 is a photograph of a material of the disclosure.

The sample was easily peeled from the petri dish: a photograph demonstrating its transparency is provided as FIG. 9.

Example 3

Figure 10:
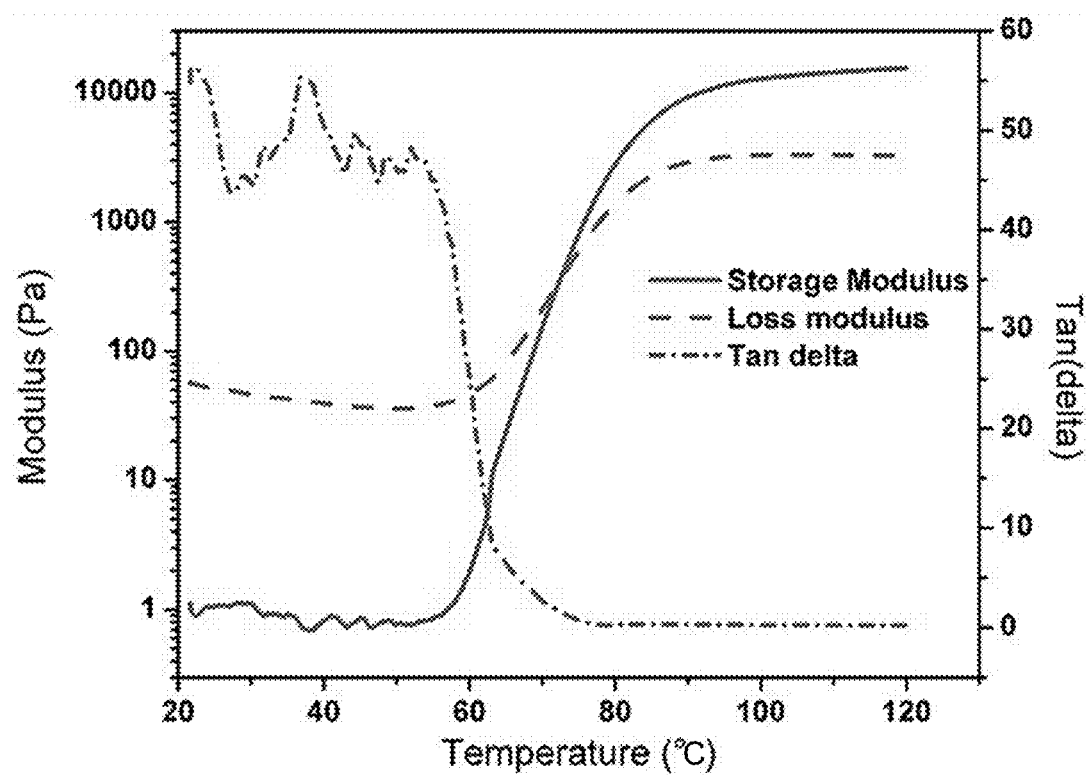
FIG. 10 is a graph of rheology data of a polymerizable composition of the disclosure.

In another experiment, 0.51 grams of EMS-622 ([5-7% (epoxypropoxypropyl)methylsiloxane]-dimethyl siloxane copolymer, 200-300 cSt, Gelest) and BCF (100 ppm) were combined and mixed to homogeneity, then 10 grams of DMS H-41 (Hydride Terminated PDMS, 10,000 cSt, Gelest) was added and the mixture was mixed to homogeneity. Rheology tests on the mixture were performed using a stress-controlled Discovery Hybrid Rheometer (DHR. TA Instruments). A parallel plate fixture with diameter of 25 mm and a gap around 1.5 mm were used for the small amplitude oscillatory shear (SAOS) and steady shear measurement. The temperature was ramped up at 10° C./min. The results are shown in FIG. 10.

The compositions, materials, articles and methods of the disclosure are further described by the following non-limiting enumerated embodiments, which can be combined in any logically and technically consistent manner:

Embodiment 1

A polymerizable composition comprising
one or more organosiloxanes or organosilanes, the one or more organosiloxanes or organosilanes comprising one or more of
one or more first organosiloxanes or organosilanes, each comprising a plurality of silicon hydride functional groups, present in an amount within the range of about 0.05 wt % to about 99.95 wt %;

one or more second organosiloxanes or organosilane, each comprising a plurality of reactive heterocycloalkyl functional groups, present in an amount within the range of about 0.05 wt % to about 99.95 wt %; and one or more third organosiloxanes or organosilanes, each comprising at least about one silicon hydride functional group and at least about one reactive heterocycloalkyl functional group, present in an amount within the range of about 0.05 wt % to about 99.9999 wt %, an effective amount of a borane catalyst, present, for example, in an amount within the range of 0.0005 wt % to about 10 wt %, wherein the ratio of reactive heterocycloalkyl functional groups to reactive silicon hydride functional groups in the composition is in the range of 1:5 to 5:1.

Embodiment 2

A polymerizable composition according to embodiment 1, wherein each heterocycloalkyl functional group is a cyclic ether, e.g., an epoxide functional group or an oxetane functional group, or a cyclic thioether, e.g., an episulfide functional group.

Embodiment 3

A polymerizable composition according to embodiment 1, wherein each heterocycloalkyl functional group is an epoxide.

Embodiment 4

A polymerizable composition according to embodiment 1, wherein each heterocycloalkyl functional group is an oxetane or an episulfide.

Embodiment 5

A polymerizable composition according to any of embodiments 1-4, wherein the polymerizable composition includes one or more first organosiloxanes or organosilanes and one or more second organosiloxanes or organosilanes.

Embodiment 6

A polymerizable composition according to embodiment 5, wherein the polymerizable composition includes less than 1% of the third organosiloxanes or organosilanes.

Embodiment 7

A polymerizable composition according to any of embodiments 1-4, wherein the polymerizable composition includes one or more third organosiloxanes.

Embodiment 8

A polymerizable composition according to embodiment 7, wherein the polymerizable composition includes less than 1% of the first organosiloxanes or organosilanes and the second organosiloxanes or organosilanes.

Embodiment 9

A polymerizable composition according to any of embodiments 1-7, wherein the one or more first organosiloxanes or organosilanes are present in a total amount of about 1 wt % to about 70 wt %.

Embodiment 10

A polymerizable composition according to any of embodiments 1-7, wherein the one or more first organosiloxanes or organosilanes are present in a total amount of about 25 wt % to about 90 wt %.

Embodiment 11

A polymerizable composition according to any of embodiments 1-10, wherein one or more of (e.g., each of) the first organosiloxanes or organosilanes includes about two silicon hydride functional groups (e.g., 1.7 to 2.3 silicon hydride functional groups) (i.e., per molecule on average over the sample).

Embodiment 12

A polymerizable composition according to any of embodiments 1-11, wherein one or more of (e.g., each of) the first organosiloxanes or organosilanes comprises about three or more silicon hydride functional groups, e.g., a number of silicon hydride functional groups within the range of about 4 to about 1000 or 5 to about 1,000. (i.e., per molecule on average over the sample).

Embodiment 13

A polymerizable composition according to any of embodiments 1-12, wherein one or more of (e.g., each of) the first organosiloxanes or organosilanes comprises a number of silicon hydride functional groups within the range of about 10 to about 100. (i.e., per molecule on average over the sample).

Embodiment 14

A polymerizable composition according to any of embodiments 1-13, wherein one or more of (e.g., each of) the first organosiloxane or organosilanes is an organosiloxane comprising about two or more siloxane repeat units, wherein the number of siloxane repeat units comprising a silicon hydride functional group is within the range of about 0.01% to about 100% of the total number of siloxane repeat units; e.g., is within the range of about 0.1% to about 100% of the total number of siloxane repeat units (i.e., per molecule on average over the sample).

Embodiment 15

A polymerizable composition according to any of embodiments 1-13, wherein one or more of (e.g., each of) the first organosiloxane or organosilanes is an organosiloxane comprising about two or more siloxane repeat units, wherein the number of siloxane repeat units comprising a silicon hydride functional group is within the range of about 0.5% to about 20% of the total number of siloxane repeat units (i.e., per molecule on average over the sample).

Embodiment 16

A polymerizable composition according to any of embodiments 1-15, wherein one or more of (e.g., each of) the first organosiloxanes or organosilanes is an organosiloxane comprising two or more siloxane repeat units, wherein the number of siloxane repeat units comprising a silicon hydride functional group is within the range of about 20% to about 60% of the total number of siloxane repeat units (i.e., per molecule on average over the sample).

Embodiment 17

A polymerizable composition according to any of embodiments 1-16, wherein at least one of (e.g., each of) the first organosiloxanes or organosilanes is a compound of Formula I-A:

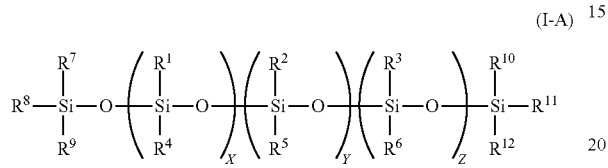

(I-A)

wherein:
each of $R^1$, $R^2$, and $R^3$ is independently hydrogen, $C_1$-$C_{60}$ (e.g., $C_1$-$C_6$ or $C_1$-$C_3$) hydrocarbon;
each of $R^4$, $R^5$, and $R^6$ is independently $C_1$-$C_{60}$ (e.g., $C_1$-$C_6$ or $C_1$-$C_3$) hydrocarbon;
each of $R^7$, $R^9$, $R^{10}$, and $R^{12}$ is independently hydrogen or $C_1$-$C_{60}$ (e.g., $C_1$-$C_6$ or $C_1$-$C_3$) hydrocarbon;
$R^8$ is hydrogen, O, or $C_1$-$C_{60}$ (e.g., $C_1$-$C_6$ or $C_1$-$C_3$) hydrocarbon;
$R^{11}$ is a covalent bond to $R^8$ if $R^8$ is O and is otherwise hydrogen or $C_1$-$C_{60}$ (e.g., $C_1$-$C_6$ or $C_1$-$C_3$) hydrocarbon; and
each of X, Y, and Z is independently 0-20,000, provided that at least one of X, Y and Z is not zero, and that the molecule bears at least two reactive silicon hydride groups.

Embodiment 18

A polymerizable composition according to embodiment 17, wherein
$R^8$ and $R^{11}$ are hydrogen; and
each of $R^7$, $R^9$, $R^{10}$, and $R^{12}$ is independently $C_1$-$C_{60}$ (e.g., $C_1$-$C_6$ or $C_1$-$C_3$) hydrocarbon.

Embodiment 19

A polymerizable composition according to embodiment 18, wherein each of $R^1$, $R^2$, and $R^3$ is independently $C_1$-$C_{60}$ (e.g., $C_1$-$C_6$ or $C_1$-$C_3$) hydrocarbon.

Embodiment 20

A polymerizable composition according to embodiment 18 or embodiment 19, wherein X, Y and Z are 0.

Embodiment 21

A polymerizable composition according to any of embodiments 17-19,
wherein
$R^1$ is $C_1$-$C_{60}$ (e.g., $C_1$-$C_6$ or $C_1$-$C_3$) hydrocarbon;
X is 1-10000 (e.g., 1-1000 or 1-500); and
Y and Z are 0.

Embodiment 22

A polymerizable composition according to embodiment 17, wherein one or more of $R^1$, $R^2$ and $R^3$ is hydrogen.

Embodiment 23

A polymerizable composition according to embodiment 22, wherein
each of $R^1$ and $R^3$ is independently $C_1$-$C_{60}$ hydrocarbon;
$R^2$ is hydrogen;
each of X and Z is independently 0-1000 (e.g., 0-500);
Y is 1-2000 (e.g., 1-500).

Embodiment 24

A polymerizable composition according to embodiment 23, wherein the ratio of Y to the total of X and Z is within the range of 1:199 to 1:4.

Embodiment 25

A polymerizable composition according to embodiment 23, wherein the ratio of Y to the total of X and Z is within the range of 1:4 to 3:2.

Embodiment 26

A polymerizable composition according to any of embodiments 22-25, wherein $R^8$ and $R^{11}$ are not hydrogen.

Embodiment 27

A polymerizable composition according to any of embodiments 22-26, wherein $R^8$ is O and $R^{11}$ is a covalent bond to $R^8$.

Embodiment 28

A polymerizable composition according to any of embodiments 1-27, wherein one or more of (e.g., each of) the first organosiloxanes or organosilanes is a compound of Formula I-B:

(I-B)

wherein:
each of $R^{13}$, $R^{14}$, $R^{15}$, and $R^{16}$ is independently hydrogen, $C_1$-$C_{60}$ (e.g., $C_1$-$C_6$ or $C_1$-$C_3$) hydrocarbon, or $R^L$; and
$R^L$ is

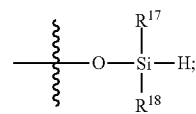

in which
each of $R^{17}$ and $R^{18}$ is independently $C_1$-$C_4$ hydrocarbon, provided that the compound bears at least two reactive silicon hydride groups.

Embodiment 29

A polymerizable composition according to any of embodiments 1-28, wherein the one or more first organosiloxanes or organosilanes comprise a hydride terminated polysiloxane, or a polysiloxane having silicon hydrides along its polysiloxane backbone, or a silane or disiloxane bearing two silicon hydrides.

Embodiment 30

A polymerizable composition according to any of embodiments 1-29 wherein the one or more first organosiloxanes or organosilanes comprise one or more of hydride-terminated PDMS; methylhydrosiloxane-dimethylsiloxane copolymer; polymethylhydrosiloxanes; and methylhydrogen silicone fluid (side chain type); 2,4,6,8-tetramethylcyclotetrasiloxane; and methylhydrosiloxane-phenylmethylsiloxane copolymer.

Embodiment 31

A polymerizable composition according to any of embodiments 1-30, wherein the molecular weight of one or more of (e.g., each of) the first organosiloxanes or organosilanes is within the range of about 130 Da to about 10 kDa.

Embodiment 32

The polymerizable composition of any of embodiments 1-31, wherein one or more (e.g., each) first organosiloxane or organosilane has a $M_w$ of about 88 Da to about 1 MDa; e.g., about 500 Da to about 500 kDa, or about 1 kDa to about 100 kDa; or about 1 kDa to about 10 kDa.

Embodiment 33

A polymerizable composition according to any of embodiments 1-32, wherein the molecular weight of one or more of (e.g., each of) the first organosiloxanes or organosilanes is within the range of about 10 kDa to about 65 kDa.

Embodiment 34

A polymerizable composition according to any of embodiments 1-33, wherein the molecular weight of one or more of (e.g., each of) the first organosiloxanes or organosilanes is within the range of about 25 kDa to about 1 MDa.

Embodiment 35

A polymerizable composition according to any of embodiments 1-7 and 9-34, wherein the one or more second organosiloxanes or organosilanes are present in a total amount of about 1 wt % to about 70 wt %.

Embodiment 36

A polymerizable composition according to any of embodiments 1-7 and 9-34, wherein the one or more second organosiloxanes or organosilanes are present in a total amount of about 25 wt % to about 90 wt %.

Embodiment 37

A polymerizable composition according to any of embodiments 1-36, wherein one or more of (e.g., each of) the second organosiloxanes or organosilanes comprises about two (e.g., 1.7-2.3) reactive heterocycloalkyl functional groups (i.e., per molecule on average over the sample).

Embodiment 38

A polymerizable composition according to any of embodiments 1-37, wherein one or more of the second organosiloxanes or organosilanes comprises at least about two reactive heterocycloalkyl functional groups; or about three or more reactive heterocycloalkyl functional groups, e.g., a number of reactive heterocycloalkyl functional groups within the range of about 2 to about 1000 or about 5 to about 500.

Embodiment 39

A polymerizable composition according to any of embodiments 1-38, wherein one or more of (e.g., each of) the second organosiloxanes or organosilanes comprises a number of reactive heterocycloalkyl groups within the range of about 10 to about 100 (i.e., per molecule on average over the sample).

Embodiment 40

A polymerizable composition according to any of embodiments 1-39, wherein one or more of (e.g., each of) the second organosiloxane or organosilanes is an organosiloxane comprising about two or more siloxane units, and wherein the number of siloxane units comprising a reactive heterocycloalkyl functional group is within the range of about 0.5% to about 20% of the total number of siloxane units, or is within the range of about 0.01% to about 100% of the total number of siloxane repeat units (i.e., per molecule on average over the sample).

Embodiment 41

A polymerizable composition according to any of embodiments 1-39, wherein one or more of (e.g., each of) the second organosiloxane or organosilanes is an organosiloxane comprising about two or more siloxane units, and wherein the number of siloxane units comprising a reactive heterocycloalkyl functional group is within the range of about 2% to about 10% of the total number of siloxane units (i.e., per molecule on average over the sample).

Embodiment 42

A polymerizable composition according to any of embodiments 1-41, wherein at least one (e.g., each of) of the second organosiloxanes or organosilanes is a compound of Formula II-A:

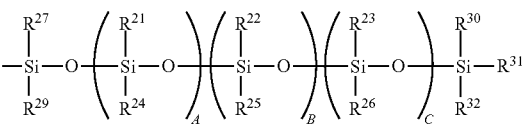

(II-A)

wherein:
each of $R^{21}$, $R^{22}$, $R^{23}$, $R^{27}$, and $R^3$ is independently $C_1$-$C_{60}$ (e.g., $C_1$-$C_6$ or $C_1$-$C_3$) hydrocarbon, $R^A$ or $R^B$;

$R^A$ is

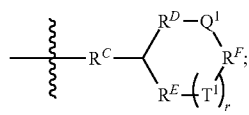

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is

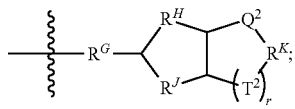

in which
each of $Q^2$ and $T^2$ is independently O, or S;
$R^G$ is $C_{1-20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0;
each of $R^{24}$, $R^{25}$, and $R^{26}$ is independently $C_1$-$C_{60}$ (e.g., $C_1$-$C_6$ or $C_1$-$C_3$) hydrocarbon;
each of $R^{29}$ and $R^{32}$ is independently hydrogen or $C_1$-$C_{60}$ (e.g., $C_1$-$C_6$ or $C_1$-$C_3$) hydrocarbon;
$R^{28}$ is O, or $C_1$-$C_{60}$ hydrocarbon:
$R^{31}$ is a covalent bond to $R^{28}$ if $R^{28}$ is O, or is otherwise $C_1$-$C_{60}$ (e.g., $C_1$-$C_6$ or $C_1$-$C_3$) hydrocarbon;
each of A, B, and C is independently 0-20,000, provided that at least one of A, B and C is not zero, and that the molecule bears at least two reactive heterocycloalkyl groups.

Embodiment 43

A polymerizable composition according to embodiment 42, wherein
each of $R^{21}$, $R^{23}$, $R^{27}$, and $R^{30}$ is independently $C_1$-$C_{60}$ (e.g., $C_1$-$C_6$ or $C_1$-$C_3$) hydrocarbon;
$R^{22}$ is $R^A$ or $R^B$;
sum of A and C is independently 0-1,000;
B is 1-2000.

Embodiment 44

A polymerizable composition according to embodiment 42 or embodiment 43, wherein the ratio of B to the total of A and C is within the range of 1:199 to 1:9.

Embodiment 45

A polymerizable composition according to any of embodiments 42-44, wherein $R^{28}$ is O and $R^{31}$ is a covalent bond to $R^{28}$.

Embodiment 46

A polymerizable composition according to any of embodiments 42-45, wherein at least one (e.g., each of) of the second organosiloxanes or organosilanes is a compound of Formula II-B:

wherein:
each of $R^{33}$, $R^{34}$, $R^{35}$, and $R^{36}$ is independently $C_1$-$C_{60}$ (e.g., $C_1$-$C_6$ or $C_1$-$C_3$) hydrocarbon, $R^A$, $R^B$, or $R^M$;
$R^M$ is

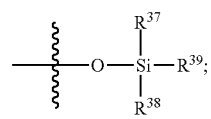

in which
each of $R^{37}$ and $R^{38}$ is independently $C_1$-$C_{60}$ (e.g., $C_1$-$C_6$ or $C_1$-$C_3$) hydrocarbon; and
$R^{39}$ is $R^A$ or $R^B$;
$R^A$ is

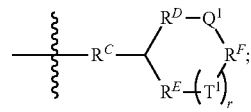

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is

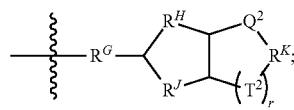

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0, provided that the compound bears at least two reactive heterocycloalkyl functional groups;

Embodiment 47

A polymerizable composition according to any of embodiments 42-46, wherein $R^G$ is linear or branched $C_1$-$C_6$ alkylene.

Embodiment 48

A polymerizable composition according to any of embodiments 1-47, wherein the one or more second organosiloxanes or organosilanes comprise an epoxy-terminated polysiloxane, or a polysiloxane having epoxides along its polysiloxane backbone.

Embodiment 49

A polymerizable composition according to any of embodiments 1-48 wherein the one or more second organosiloxanes or organosilanes comprise one or more of epoxide-terminated polysiloxanes; epoxycyclohexylethylmethylsiloxane-dimethylsiloxane copolymer; 2,4,6,8-tetramethyl-2,4,6,8-tetrakis(propyl glycidyl ether)cyclotetrasiloxane; and epoxy-modified side-chain type silicone fluids (e.g., epoxypropoxypropyl)methylsiloxane-siloxane copolymer).

Embodiment 50

A polymerizable composition according to any of embodiments 1-49, wherein the molecular weight of one or more of (e.g., each of) the second organosiloxanes or organosilanes is within the range of about 350 Da to about 5 kDa.

Embodiment 51

The polymerizable composition of any of embodiments 1-50, wherein one or more (e.g., each) second organosiloxane or organosilane has a $M_w$ of about 200 Da to about 1 MDa: e.g., about 1 kDa to about 50 kDa.

Embodiment 52

A polymerizable composition according to any of embodiments 1-51, wherein the molecular weight of one or more of (e.g., each of) the second organosiloxanes or organosilanes is within the range of about 5 kDa to about 25 kDa.

Embodiment 53

A polymerizable composition according to any of embodiments 1-52, wherein the molecular weight of one or more of (e.g., each of) the second organosiloxanes or organosilanes is within the range of about 25 kDa to about 1 MDa.

Embodiment 54

A polymerizable composition according to any of embodiments 1-5 and 7-34, wherein the one or more third organosiloxanes or organosilanes are present in a total amount of about 1 wt % to about 70 wt %.

Embodiment 55

A polymerizable composition according to any of embodiments 1-5 and 7-34, wherein the one or more third organosiloxanes or organosilanes are present in a total amount of about 25 wt % to about 90 wt %.

Embodiment 56

A polymerizable composition according to any of embodiments 1-55, wherein one or more of (e.g., each of) the third organosiloxanes or organosilanes comprises about one (e.g., 0.7-1.3) silicon hydride functional group and about one (e.g., 0.7-1.3) reactive heterocycloalkyl functional group (i.e., per molecule on average over the sample).

Embodiment 57

A polymerizable composition according to any of embodiments 1-56, wherein one or more of the third organosiloxanes or organosilanes comprises about two or more silicon hydride functional groups and/or about two or more reactive heterocycloalkyl functional groups (i.e., per molecule on average over the sample).

Embodiment 58

A polymerizable composition according to any of embodiments 1-57, wherein one or more of the third organosiloxanes or organosilanes is an organosiloxane comprising two or more siloxane units, and wherein the number of siloxane units comprising a heterocycloalkyl functional group or a silicon hydride functional group is within the range of about 0.01% to about 100% (e.g., about 0.5% to about 50%) of the total number of siloxane units.

Embodiment 59

A polymerizable composition according to any of embodiments 1-58, wherein at least one of (e.g., each of) the third organosiloxanes or organosilanes is a compound of Formula III-A:

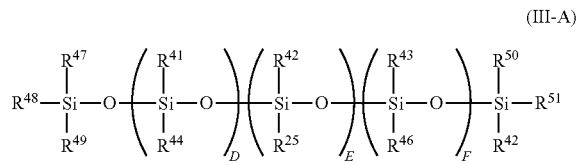

(III-A)

wherein:
each of $R^{41}$, $R^{42}$, $R^{43}$, $R^{47}$, and $R^{50}$ is independently $C_1$-$C_{60}$ (e.g., $C_1$-$C_6$ or $C_1$-$C_3$) hydrocarbon, hydrogen, $R^A$ or $R^B$;
$R^A$ is

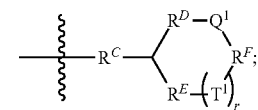

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;

$R^B$ is

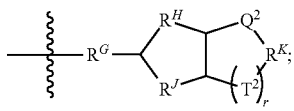

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0:
each of $R^{44}$, $R^{45}$, and $R^{46}$ is independently $C_1$-$C_{60}$ (e.g., $C_1$-$C_6$ or $C_1$-$C_3$) hydrocarbon;
each of $R^{49}$ and $R^{52}$ is independently $C_1$-$C_{60}$ (e.g., $C_1$-$C_6$ or $C_1$-$C_3$) hydrocarbon;
$R^{48}$ is O, or $C_1$-$C_{60}$ hydrocarbon;
$R^{51}$ is a covalent bond to $R^{48}$ if $R^{48}$ is O, or is otherwise $C_1$-$C_{60}$ (e.g., $C_1$-$C_6$ or $C_1$-$C_3$) hydrocarbon;
each of D, E, and F is independently 0-20,000, provided that at least one of D, E and F is not zero, provided that the molecule bears at least one reactive silicon hydride and at least one reactive heterocycloalkyl group.

Embodiment 60

A polymerizable composition according to embodiment 59, wherein
each of $R^{43}$, $R^{47}$, and $R^{50}$ is independently $C_1$-$C_{60}$ (e.g., $C_1$-$C_6$ or $C_1$-$C_5$) hydrocarbon;
$R^{41}$ is H;
$R^{42}$ is $R^A$ or $R^B$;
D is 1-2000;
E is 1-2000; and
F is 0-1,000.

Embodiment 61

A polymerizable composition according to embodiment 59 or embodiment 60, wherein the ratio of E to the total of D and F is within the range of 1:199 to 1:9; and the ratio of D to the total of E and F is within the range of 1:199 to 1:9.

Embodiment 62

A polymerizable composition according to any of embodiments 59-61, wherein $R^{48}$ is O and $R^{51}$ is a covalent bond to $R^{48}$.

Embodiment 63

A polymerizable composition according to any of embodiments 1-62, wherein at least one of (e.g., each of) the third organosiloxanes or organosilanes is a compound of Formula III-B:

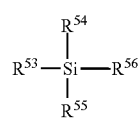

(III-B)

wherein:
each of $R^{53}$, $R^{54}$, $R^{55}$, and $R^{56}$ is independently $C_1$-$C_{60}$ hydrocarbon, H, $R^A$, $R^B$, or $R^M$;
$R^M$ is

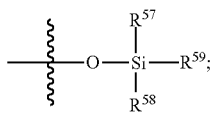

in which
each of $R^{57}$ and $R^{58}$ is independently $C_1$-$C_{60}$ hydrocarbon; and
$R^{59}$ is $R^A$ or $R^B$;
$R^A$ is

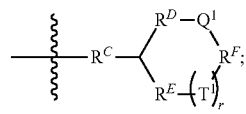

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is r

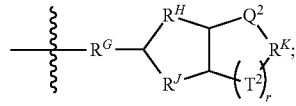

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0, provided that the molecule bears at least one silicon hydride and at least one reactive heterocycloalkyl group.

Embodiment 64

A polymerizable composition according to any of embodiments 59-63, wherein $R^G$ is linear or branched $C_1$-$C_6$ alkylene.

Embodiment 65

A polymerizable composition according to any of embodiments 1-64, wherein the one or more third organosiloxanes or organosilanes comprise one or more of an polysiloxane terminated with one or more epoxides and having one or more silicon hydrides along its backbone, a polysiloxane terminated with one or more silicon hydrides and having one or more epoxides along its backbone; a polysiloxane terminated with a silicon hydride and with an epoxide; or a polysiloxane having one or more silicon hydrides and one or more epoxides along its polysiloxane backbone.

Embodiment 66

A polymerizable composition according to any of embodiments 1-65, wherein the molecular weight of one or more of (e.g., each of) the third organosiloxanes or organosilanes is within the range of about 350 Da to about 5 kDa.

Embodiment 67

The polymerizable composition of any of embodiments 1-66, wherein one or more (e.g., each) third organosiloxane or organosilane has a $M_w$ of about 120 Da to about 1 MDa; or about 1 kDa to about 100 kDa.

Embodiment 68

A polymerizable composition according to any of embodiments 1-67, wherein the molecular weight of one or more of (e.g., each of) the third organosiloxanes or organosilanes is within the range of about 5 kDa to about 25 kDa.

Embodiment 69

A polymerizable composition according to any of embodiments 1-68, wherein the molecular weight of the one or more of the third organosiloxanes or organosilanes is within the range of about 25 kDa to about 1 MDa.

Embodiment 70

A polymerizable composition according to any of embodiments 17-69, wherein each of $R^D$ and $R^E$ is a covalent bond.

Embodiment 71

A polymerizable composition according to any of embodiments 17-69, wherein each of $R^D$ and $R^E$ is independently $C_1$-$C_2$ alkylene.

Embodiment 72

A polymerizable composition according to any of embodiments 17-71, wherein $R^F$ is linear or branched $C_1$-$C_4$ alkylene.

Embodiment 73

A polymerizable composition according to any of embodiments 17-71, wherein $R^F$ is methylene.

Embodiment 74

A polymerizable composition according to any of 17-73, wherein each of $Q^1$ and $T^1$ are O.

Embodiment 75

A polymerizable composition according to any of embodiments 17-74, wherein r is 0.

Embodiment 76

A polymerizable composition according to any of embodiments 17-75, wherein $R^A$ is

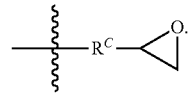

Embodiment 77

A polymerizable composition according to any of embodiments 17-76, wherein $R^C$ is linear or branched $C_1$-$C_6$ heteroalkylene.

Embodiment 78

A polymerizable composition according to any of embodiments 17-77, wherein $R^C$ is

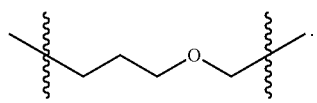 [SMILES: *CCCOC*]

Embodiment 79

A polymerizable composition according to any of embodiments 17-78, wherein $R^H$ is $C_1$-$C_2$ alkylene.

Embodiment 80

A polymerizable composition according to any of embodiments 17-79 wherein $R^J$ is methylene.

Embodiment 81

A polymerizable composition according to any of embodiments 17-80, wherein $R^K$ is methylene.

Embodiment 82

A polymerizable composition according to any of 17-81, wherein each of $Q^2$ and $T^2$ are O.

Embodiment 83

A polymerizable composition according to any of embodiments 17-81, wherein r is 0.

Embodiment 84

A polymerizable composition according to embodiment 83, wherein $R^K$ is a covalent bond.

Embodiment 85

A polymerizable composition according to any of embodiments 17-84, wherein $R^B$ is

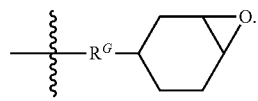

Embodiment 86

A polymerizable composition according to any of embodiments 1-85, wherein the composition comprises one or more first organosiloxanes or organosilanes in an amount within the range of about 0.05 wt % to about 30 wt %;
one or more second organosiloxanes or organosilanes in an amount within the range of about 70 wt % to about 99.95 wt %.

Embodiment 87

A polymerizable composition according to any of embodiments 1-85, wherein the composition comprises
one or more first organosiloxanes or organosilanes in an amount within the range of about 30 wt % to about 70 wt %;
one or more second organosiloxanes or organosilanes in an amount within the range of about 30 wt % to about 70 wt %.

Embodiment 88

A polymerizable composition according to any of embodiments 1-85, wherein the composition comprises
one or more first organosiloxanes or organosilanes in an amount within the range of about 70 wt % to about 99.95 wt %;
one or more second organosiloxanes or organosilanes in an amount within the range of about 0.05 wt % to about 30 wt %.

Embodiment 89

A polymerizable composition according to any of embodiments 86-88, wherein substantially no (e.g., no more than 0.5 wt %) third organosiloxane or organosilane is present.

Embodiment 90

A polymerizable composition according to any of embodiments 1-70, wherein the composition comprises one or more third organosiloxanes or organosilanes in an amount within the range of about 30 wt % to about 99.95 wt %.

Embodiment 91

A polymerizable composition according to embodiment 90, wherein substantially no first organosiloxane or organosilane or second organosiloxane or organosilane is present (e.g., no more than 0.5 wt % of each).

Embodiment 92

A polymerizable composition according to any of embodiments 1-70, wherein substantial amounts of each of the first organosiloxane or organosilane, the second organosiloxane or organosilane, and the third organosiloxane or organosilane are present.

Embodiment 93

A polymerizable composition according to embodiment 92, wherein the composition comprises
one or more first organosiloxanes or organosilanes in an amount within the range of about 5 wt % to about 80 wt %;
one or more second organosiloxanes or organosilanes in an amount within the range of about 5 wt % to about 80 wt %; and
one or more third organosiloxanes or organosilanes in an amount within the range of about 5 wt % to about 80 wt %.

Embodiment 94

A polymerizable composition according to any of embodiments 1-93, wherein the ratio of silicon hydride functional groups to reactive heterocycloalkyl functional groups in the composition is within the range of 1:2 to 2:1, or 1:2.5 to 2.5:1.

Embodiment 95

The polymerizable composition of any of embodiments 1-93, wherein the ratio of silicon hydride functional groups to reactive heterocycloalkyl functional groups in the composition is within the range of 1:1.5 to 1.5:1; e.g., within the range of 1:1.2 to 1.2:1.

Embodiment 96

A polymerizable composition according to any of embodiments 1-93, wherein the ratio of silicon hydride functional groups to reactive heterocycloalkyl functional groups in the composition is within the range of 1:5 to 1:1. e.g., 1:2 to 1:1 or 1:1.5 to 1:1.

Embodiment 97

A polymerizable composition according to any of embodiments 1-96, wherein composition is substantially free of hydrosilylatable ethylenic unsaturations (e.g., less than 0.05 at % e.g., less than 0.01 at % of atoms making up hydrosilylatable ethylenic unsaturations).

Embodiment 98

A polymerizable composition according to any of embodiments 1-97, wherein the ratio of hydrosilylatable ethylenic unsaturations to silicon hydride functional groups is less than 0.05, e.g., less than 0.01, less than 0.005, or even less than 0.001.

Embodiment 99

A polymerizable composition according to any of embodiments 1-79, wherein the borane catalyst comprises a compound of the formula $B(R^C)_q(R^D)_r$
wherein:
each $R^C$ is independently $C_6$-$C_{14}$ aryl, optionally substituted with one or more groups that are independently $C_1$-$C_3$ fluoroalkyl, halogen, nitro, or CN;
each $R^D$ is independently halogen;
q is 1-3;
r is 0-2; and
the sum of q and r is 3.

Embodiment 100

A polymerizable composition according to embodiment 99, wherein the borane catalyst comprises $B(C_6F_5)_3$ or a tetra(pentafluorophenyl)borate salt such as $[(C_6F_5)_3PF][B(C_6F_5)_4]$.

Embodiment 101

A polymerizable composition according to any of embodiments 1-100, wherein the borane catalyst comprises a borate complex.

Embodiment 102

A polymerizable composition according to embodiment 101, wherein the borate complex comprises a carbamato borate.

Embodiment 103

A polymerizable composition according to any of embodiments 1-102, wherein the borane catalyst is present in an amount in the range of about 0.01 wt % to about 2 wt %.

Embodiment 104

A polymerizable composition according to any of embodiments 1-102, wherein the borane catalyst is present in an amount in the range of about 0.1 wt % to about 5 wt %.

Embodiment 105

A polymerizable composition according to any of embodiments 1-105, wherein the total amount of first, second and third organosiloxanes or organosilanes and borane catalyst is at least about 20 wt %, e.g., at least about 30 wt %, or at least about 50 wt % of the composition.

Embodiment 106

A polymerizable composition according to any of embodiments 1-105, wherein the total amount of first, second and third organosiloxanes or organosilanes and borane catalyst is at least about at least about 70 wt %, e.g., at least about 80 wt % of the composition.

Embodiment 107

A polymerizable composition according to any of embodiments 1-105, wherein the total amount of first, second and third organosiloxanes or organosilanes and borane catalyst is at least about 90 wt %, e.g., at least about 95 wt % of the composition.

Embodiment 108

A polymerizable composition according to any of embodiments 1-107, wherein the polymerizable composition further comprises one or more adhesion promoters, e.g., one or more silanes, or any combination thereof, in a total amount up to about 10 wt % of the composition, e.g., within the range of about 0.1 wt % to about 10 wt % of the composition.

Embodiment 109

A polymerizable composition according to any of embodiments 1-108, wherein the polymerizable composition further comprises one or more fillers, e.g., silica or silicone resin, metallic particles, polymeric particles, metal oxides, metal nitrides, metal carbonates, or metal carbides, in a total amount up to about 75 wt % of the composition, e.g., up to about 40 wt % of the composition, or within the range of about 15 wt % to about 75 wt % of the composition, or within the range of about 0.1 wt % to about 40 wt % of the composition.

Embodiment 110

A polymerizable composition according to any of embodiments 1-109, wherein the total amount of first, second and third organosiloxanes or organosilanes, adhesion promoters, fillers, and borane catalyst is at least about 20 wt %, e.g., at least about 30 wt %, at least about 50 wt % of the composition.

Embodiment 111

A polymerizable composition according to any of embodiments 1-109, wherein the total amount of first, second and third organosiloxanes or organosilanes, adhesion promoters, fillers, and borane catalyst is at least about 70 wt %, e.g., at least about 80 wt % of the composition.

Embodiment 112

A polymerizable composition according to any of embodiments 1-109, wherein the total amount of first, second and third organosiloxanes or organosilanes, adhesion promoters, fillers, and borane catalyst is at least about 90 wt %, or at least about 95 wt % of the composition.

Embodiment 113

The polymerizable composition of any of embodiments 1-112, wherein the polymerizable composition is substantially free of transition metal hydrosilylation catalysts.

Embodiment 114

A solvent-borne coating composition, comprising a polymerizable composition according to any of embodiments 1-113, dispersed in a solvent.

Embodiment 115

A coating composition according to embodiment 114, wherein the total amount of the first, second and third organosiloxanes or organosilanes and borane catalyst in the composition is at least about 0.5 wt %. e.g., at least about 2 wt %, or at least about 10 wt % of the coating composition.

Embodiment 116

A coating composition according to embodiment 115, wherein the total amount of the first, second and third organosiloxanes or organosilanes, the borane catalyst and the solvent in the composition is at least about 70 wt %, e.g., at least about 80 wt %, at least about 90 wt %, at least about 95 wt %, or even at least about 99 wt %.

Embodiment 117

A coating composition according to any of embodiments 114-117, wherein the solvent has a boiling point of no more than 250° C., e.g., no more than 200° C., at atmospheric pressure.

Embodiment 118

A method for preparing a cross-linked silicone material, the method comprising providing a polymerizable composition according to any of embodiments 1-117, and polymerizing the polymerizable composition.

Embodiment 119

A method according to embodiment 118, wherein polymerizing comprises exposing the polymerizable composition to a temperature within the range of about −20° C. to about 250° C., e.g., about 0° C. to about 180° C., or about 40° C. to about 140° C.

Embodiment 120

A method according to embodiment 118, wherein polymerizing comprises irradiating the polymerizable composition with light having a wavelength of less than about 400 nm.

Embodiment 121

A method according to embodiment 120, wherein the borane catalyst of the polymerizable composition is in the form of a borate complex, and wherein the irradiation causes the borate complex to react to form a triarylborane.

Embodiment 122

The method according to embodiment 120 or embodiment 121, wherein the irradiation is performed using patterned radiation, thereby providing a polymerized material having a shape.

Embodiment 123

The method according to embodiment 122, wherein the patterned radiation is formed by illumination through a photomask.

Embodiment 124

The method according to embodiment 122, wherein the patterned radiation is formed using diffractive optics.

Embodiment 125

The method according to embodiment 122, wherein the patterned radiation is formed by rastering.

Embodiment 126

The method according to any of embodiments 118-125, wherein the polymerizable composition is in the form of a thin film.

Embodiment 127

The method according to any of embodiments 118-125, wherein the patterned radiation is provided at a surface of a body of the polymerizable composition, and operates to polymerize only a top portion of the polymerizable composition.

Embodiment 128

The method according to embodiment 118 or embodiment 119, wherein the polymerizable composition is formed and polymerized by a process selected from injection molding, transfer molding, reactive extrusion, continuous printing, batched printing, photolithography, and 3D printing.

Embodiment 129

A polymerized composition made by a method of any of embodiments 118-128.

Embodiment 130

A polymerized composition that is the polymerization product of a polymerizable composition of any of embodiments 1-117.

Embodiment 131

The polymerized composition of embodiment 129 or embodiment 130, wherein the molar ratio of a total of heterocycloalkyl-hydrosilyl addition products to a total of heterocycloalkyl-heterocycloalkyl addition products is at least 1.5:1, e.g., at least 2:1, or at least 2.5:1.

Embodiment 132

The use of a polymerized composition according to any of embodiments 129-131 in a product for a life science application, an electronic device such as a microelectronic device, or an electrooptic device.

Embodiment 133

An electrooptic device comprising:
an electrooptic die;
a die attachment material adhering the electrooptic die to a substrate; and
an encapsulant material encapsulating the electrooptic die,
one or more of the die attachment material and the encapsulant material being a polymerized composition according to any of embodiments 129-131.

Embodiment 134

The electrooptic device according to embodiment 133, wherein the encapsulant material is shaped as a lens or a mirror.

Embodiment 135

An electrooptic device comprising:
an electrooptic die;
a die attachment material adhering the electrooptic die to a substrate; and
an encapsulant material encapsulating the electrooptic die; and
an optic material disposed on the encapsulant and configured in an operative optical beam path of the electrooptic die, one or more of the die attachment material, the optic material and the encapsulant material being a polymerized composition according to any of embodiments 129-131.

Embodiment 136

The electrooptic device according to embodiment 135, wherein the optic material is shaped as a lens or a mirror.

Embodiment 137

The electrooptic device according to any of embodiments 133-136, in the form of a light-emitting diode.

Embodiment 138

The electrooptic device according to any of embodiments 133-136, in the form of a photodetector.

Embodiment 139

An article comprising:
a first surface;
a second surface; and
a polymerized composition adhering or sealing the first surface to the second surface, wherein the polymerized composition is a polymerization product of a polymerizable composition according to any of embodiments 1-117.

Embodiment 140

A method for affixing or sealing a first surface to a second surface to prepare the article of embodiment 139, the method comprising
disposing a polymerizable composition according to any of embodiments 1-117 such that it is in contact with the first surface and the second surface; and then
polymerizing the polymerizable composition to adhere or seal the first surface to the second surface.

Embodiment 141

The method of embodiment 140, wherein the polymerizable composition is polymerized by exposing the polymerizable composition to a temperature within the range of about −20° C. to about 200° C., e.g., about 0° C. to about 180° C., or about 40° C. to about 140° C.

Embodiment 142

The method of embodiment 140, wherein the polymerizable composition is polymerized by irradiating the polymerizable composition with light having a wavelength of less than about 400 nm.

Embodiment 143

The method of any of embodiments 140-142, wherein the polymerization of the polymerizable composition is performed over a timeframe of up to 1 min, or up to 10 mins, or up to 60 mins, or no more than 10 days.

Embodiment 144

A polymerizable composition according to any of embodiments 1-117, wherein the one or more first organosiloxanes or organosilanes is present in an amount within the range of about 0.05 wt % to about 90 wt %, the one or more second organosiloxanes or organosilanes is present in an amount within the range of about 0.05 wt % to about 90 wt %, and the polymerizable composition further comprises one or more tackifiers, present in an amount within the range of about 10 wt % to about 99.95 wt %.

Embodiment 145

The polymerizable composition of embodiment 144, wherein the total amount of first organosiloxane or organosilane, second organosiloxane or organosilane, third organosiloxane or organosilane, and tackifier in the composition is at least about 30 wt %.

Embodiment 146

The polymerizable composition of embodiment 144 or embodiment 145, wherein the total amount of first, second, and/or third organosiloxanes or organosilanes, tackifier, and borane catalyst is at least about 20 wt %, e.g., at least about 30 wt %, at least about 50 wt %, at least about 70 wt %, at least about 80 wt %, at least about 90 wt %, or at least about 95 wt % of the composition.

Embodiment 147

The polymerizable composition of any of embodiments 144-146, wherein one or more of the tackifiers is selected from rosin, hydrogenated rosin, hydrocarbon resin, hydrogenated hydrocarbon resin, phenolic resin, terpene resin, terpene phenolic resin, styrenated terpene resin, hydrogenated terpene resin, polyester resin, silicone resins (e.g., dendrimeric resins) and aromatic acrylic tackifiers.

Embodiment 148

The polymerizable composition of any of embodiments 144-147, wherein one or more of the tackifiers is selected from terpene resins, petroleum hydrocarbons resins, piperylene and isoprene resin, hydrogenated resins, and silicone resins.

Embodiment 149

The polymerizable composition of any of embodiments 144-148, wherein the one or more tackifiers is present in a total amount in the range of about 10 wt % to about 80 wt %, and the total amount of any first organosiloxanes or organosilanes, any second organosiloxanes or organosilanes and any third organosiloxanes or organosilanes is in the range of about 15 wt % to about 85 wt %.

Embodiment 150

The polymerizable composition of any of embodiments 144-148, wherein the one or more tackifiers is present in a total amount in the range of about 20 wt % to about 70 wt %, and the total amount of any first organosiloxanes or organosilanes, any second organosiloxanes or organosilanes and any third organosiloxanes or organosilanes is in the range of about 25 wt % to about 75 wt %.

Embodiment 151

The polymerizable composition of any of embodiments 144-148, wherein the polymerizable composition comprises one or more first organosiloxanes or organosilanes in an amount within the range of about 5 wt % to about 75 wt %;

one or more second organosiloxanes or organosilanes in an amount up to about 75 wt %;

one or more third organosiloxanes or organosilanes in an amount up to about 5 wt % to about 75 wt %; and one or more tackifiers in an amount within the range of about 10 wt % to about 85 wt %.

Embodiment 152

A pressure-sensitive adhesive that is the polymerization product of the polymerizable composition of any of embodiments 144-151

Embodiment 153

An article comprising:
a substrate; and
a pressure-sensitive adhesive disposed on the substrate, wherein the pressure-sensitive adhesive is a polymerized product of a polymerizable composition according to any of embodiments 144-151.

Embodiment 154

The article of embodiment 153, wherein the substrate is selected from cellulosic material, film (e.g., thermoplastic material or polymer, blends of polymers, or filled polymer films), cardboard, stock card, woven and nonwoven webs, foams, and composite film-foams, metal sheet, metal foil, glass, ceramic Embodiment 155

The article of embodiment 153 or embodiment 154, wherein the pressure-sensitive adhesive has a thickness of about 0.01 µm to about 500 µm.

Embodiment 156

The article of any of embodiments 152-155, wherein the pressure-sensitive adhesive has adhesion of about 0.01 N/dm to about 100 N/dm at a peel angle of 180° as measured according to PSTC-1.

Embodiment 157

A polymerizable composition according to any of embodiments 1-117, wherein the polymerizable composition when polymerized has a release force of no more than 200 gf/inch (e.g., no more than 100 gf/inch or no more than 50 gf/inch) as measured by PSTC 4 test procedure.

Embodiment 158

The polymerizable composition of embodiment 157, further comprising an adhesion inhibiting component, such as a polymeric adhesion inhibiting component (e.g., a fluoropolymer, or a silicone polymer, e.g., bearing fluorinated or phenyl-containing side groups).

Embodiment 159

The polymerizable composition of embodiment 157 or embodiment 158, wherein the polymerizable composition when polymerized has a release force of no more than about 100 gf/inch, no more than about 75 gf/inch, no more than about 50 gf/inch, no more than about 25 gf/inch, no more than about 10 gf/inch, or no more than about 5 gf/inch), e.g., in the range of about 1 gf/inch to about 100 gf/inch, or about 1 gf/inch to about 75 gf/inch, or about 1 gf/inch to about 50 gf/inch, or about 1 gf/inch to about 25 gf/inch, or about 1 gf/inch to about 10 gf/inch, or about 5 gf/inch to about 150 gf/inch, or about 5 gf/inch to about 100 gf/inch, or about 5 gf/inch to about 75 gf/inch, or about 5 gf/inch to about 50 gf/inch, or about 5 gf/inch to about 25 gf/inch, or about 10 gf/inch to about 150 gf/inch, or about 10 gf/inch to about 100 gf/inch, or about 10 gf/inch to about 75 gf/inch, or about 10 gf/inch to about 50 gf/inch, or about 25 gf/inch to about 150 gf/inch, or about 25 gf/inch to about 100 gf/inch, or about 25 gf/inch to about 75 gf/inch, or about 25 gf/inch to about 50 gf/inch as measured by PSTC 4 test procedure.

Embodiment 160

The polymerizable composition of embodiment 157 or 158, wherein the polymerizable composition when polymerized has a release force of no more than about 25 gf/inch, as measured by PSTC 4 test procedure.

Embodiment 161

The polymerizable composition of embodiment 157 or 158, wherein the polymerizable composition when polymerized has a release force of no more than about 5 gf/inch, as measured by PSTC 4 test procedure.

Embodiment 162

A release material that is the polymerized product of a polymerizable composition of any of embodiments 157-161.

Embodiment 163

The release material of embodiment 162, in the form of a layer having a thickness of about 0.01 µm to about 20 µm, e.g., about 0.01 µm to about 0.5 µm, or about 0.01 µm to 0.1 µm, or about 0.01 µm to 0.07 µm, or about 0.04 µm to 0.07 µm.

Embodiment 164

The release material of embodiment 162 or 163 having a release force of no more than about 200 gf/inch (e.g., no more than about 100 gf/inch, no more than about 75 gf/inch, no more than about 50 gf/inch, no more than about 25 gf/inch, no more than about 10 gf/inch, or no more than about 5 gf/inch).

Embodiment 165

The release material of embodiment 162 or 163 having a release force of no more than about 25 gf/inch.

Embodiment 166

The release material of embodiment 162 or 163 having a release force of no more than about 5 gf/inch.

Embodiment 167

An article comprising:
a substrate;
an adhesive (e.g., a pressure sensitive adhesive) disposed on the substrate; and a release liner having the release material according to any of embodiments 162-166 disposed against the adhesive.

Embodiment 168

A method of exposing an adhesive, comprising
providing an article according to embodiment 167; and
removing the release liner from the adhesive, thereby exposing the adhesive.

Embodiment 169

A release material (e.g., in the form of a layer) disposed on a first surface, the release material being a polymerization product of a polymerizable composition according to any of embodiments 157-161.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes

We claim:

1. A polymerizable composition comprising
one or more organosiloxanes, the one or more organosiloxanes comprising
one or more first organosiloxanes, each comprising a plurality of silicon hydride functional groups but lacking reactive heterocycloalkyl functional groups, present in an amount within the range of about 0.05 wt % to about 99.95 wt %; and
one or more second organosiloxanes, each comprising a plurality of reactive heterocycloalkyl functional groups but lacking reactive silicon hydride functional groups, present in an amount within the range of about 0.05 wt % to about 99.95 wt %; and
an effective amount of a borane catalyst, present in an amount within the range of 0.0005 wt % to about 10 wt %,
wherein the ratio of reactive heterocycloalkyl functional groups to reactive silicon hydride functional groups in the composition is in the range of 1:5 to 5:1.

2. A polymerizable composition according to claim 1, wherein each heterocycloalkyl functional group is an epoxide.

3. A polymerizable composition according to claim 1, wherein the one or more first organosiloxanes are present in a total amount of about 25 wt % to about 90 wt %.

4. A polymerizable composition according to claim 1, wherein at least one of the first organosiloxanes is a compound of Formula I-A:

(I-A)

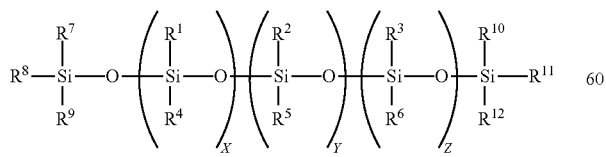

wherein:
each of $R^1$, $R^2$, and $R^3$ is independently hydrogen, $C_1$-$C_{60}$ (e.g., $C_1$-$C_6$ or $C_1$-$C_3$) hydrocarbon;

each of $R^4$, $R^5$, and $R^6$ is independently $C_1$-$C_{60}$ (e.g., $C_1$-$C_6$ or $C_1$-$C_3$) hydrocarbon;
each of $R^7$, $R^9$, $R^{10}$, and $R^{12}$ is independently hydrogen or $C_1$-$C_{60}$ (e.g., $C_1$-$C_6$ or $C_1$-$C_3$) hydrocarbon;
$R^8$ is hydrogen, O, or $C_1$-$C_{60}$ (e.g., $C_1$-$C_6$ or $C_1$-$C_3$) hydrocarbon;
$R^{11}$ is a covalent bond to $R^8$ if $R^8$ is O and is otherwise hydrogen or $C_1$-$C_{60}$ (e.g., $C_1$-$C_6$ or $C_1$-$C_3$) hydrocarbon; and
each of X, Y, and Z is independently 0-20,000, provided that at least one of X, Y and Z is not zero, and that the molecule bears at least two reactive silicon hydride groups.

5. A polymerizable composition according to claim 1, wherein the one or more first organosiloxanes comprise one or more of hydride-terminated PDMS; methylhydrosiloxane-dimethylsiloxane copolymer; polymethylhydrosiloxanes; and methylhydrogen silicone fluid (side chain type); 2,4,6,8-tetramethylcyclotetrasiloxane; and methylhydrosiloxane-phenylmethylsiloxane copolymer.

6. A polymerizable composition according to claim 1, wherein the one or more second organosiloxanes are present in a total amount of about 25 wt % to about 90 wt %.

7. A polymerizable composition according to claim 1, wherein at least one of the second organosiloxanes is a compound of Formula II-A:

(II-A)

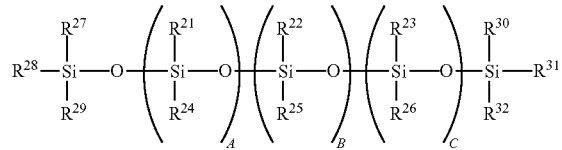

wherein:
each of $R^{21}$, $R^{22}$, $R^{23}$, $R^{27}$, and $R^{30}$ is independently $C_1$-$C_{60}$ (e.g., $C_1$-$C_6$ or $C_1$-$C_3$) hydrocarbon, $R^A$ or $R^B$;
$R^A$ is

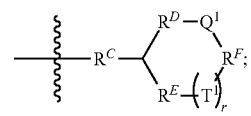

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is

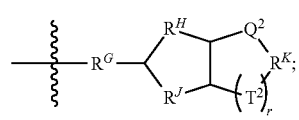

in which
each of $Q^2$ and $T^2$ is independently O, or S;
$R^G$ is $C_1$-$C_{20}$ hydrocarbonylene;

each of $R^H$ and $R^J$ is independently $C_1$-$C_5$ hydrocarbonylene;

r is 0 or 1;

$R^K$ is $C_1$-$C_6$ hydrocarbonylene if r is 1; and $R^K$ is $C_1$-$C_6$ hydrocarbonylene or a covalent bond if r is 0;

each of $R^{24}$, $R^{25}$, and $R^{26}$ is independently $C_1$-$C_{60}$ (e.g., $C_1$-$C_6$ or $C_1$-$C_3$) hydrocarbon;

each of $R^{29}$ and $R^{32}$ is independently hydrogen or $C_1$-$C_{60}$ (e.g., $C_1$-$C_6$ or $C_1$-$C_3$) hydrocarbon;

$R^{28}$ is O, or $C_1$-$C_{60}$ hydrocarbon;

$R^{31}$ is a covalent bond to $R^{28}$ if $R^{28}$ is O, or is otherwise $C_1$-$C_{60}$ (e.g., $C_1$-$C_6$ or $C_1$-$C_3$) hydrocarbon;

each of A, B, and C is independently 0-20,000, provided that at least one of A, B and C is not zero, and that the molecule bears at least two reactive heterocycloalkyl groups.

8. A polymerizable composition according to claim 1, wherein the one or more second organosiloxanes comprise one or more of epoxide-terminated polysiloxanes; epoxycyclohexylethylmethylsiloxane-dimethylsiloxane copolymer; 2,4,6,8-tetramethyl-2,4,6,8-tetrakis(propyl glycidyl ether)cyclotetrasiloxane; and epoxy-modified side-chain type silicone fluids (e.g., epoxypropoxypropyl)methylsiloxane-siloxane copolymer).

9. A polymerizable composition according to claim 1, wherein the ratio of silicon hydride functional groups to reactive heterocycloalkyl functional groups in the composition is within the range of 1:1.5 to 1.5:1.

10. A polymerizable composition according to claim 1, wherein the ratio of hydrosilylatable ethylenic unsaturations to silicon hydride functional groups is less than 0.05.

11. A polymerizable composition according to claim 1, wherein the borane catalyst comprises a compound of the formula $B(R^C)_q(R^D)_r$ wherein:
each $R^C$ is independently $C_6$-$C_{14}$ aryl, optionally substituted with one or more groups that are independently $C_1$-$C_3$ fluoroalkyl, halogen, nitro, or CN;
each $R^D$ is independently halogen;
q is 1-3;
r is 0-2; and
the sum of q and r is 3.

12. A polymerizable composition according to claim 1, wherein the borane catalyst is present in an amount in the range of about 0.1 wt % to about 5 wt %.

13. A polymerizable composition according to claim 1, wherein the total amount of first and second organosiloxanes, any third organosiloxanes if present, adhesion promoters, fillers, and borane catalyst is at least about 70 wt % of the composition.

14. A solvent-borne coating composition, comprising a polymerizable composition according to claim 1, dispersed in a solvent.

15. A method for preparing a cross-linked silicone material, the method comprising
providing a polymerizable composition comprising
one or more organosiloxanes or organosilanes, the one or more organosiloxanes or organosilanes comprising one or more of
one or more first organosiloxanes or organosilanes, each comprising a plurality of silicon hydride functional groups but lacking reactive heterocycloalkyl functional groups, present in an amount within the range of about 0.05 wt % to about 99.95 wt %;
one or more second organosiloxanes or organosilane, each comprising a plurality of reactive heterocycloalkyl functional groups but lacking reactive silicon hydride functional groups, present in an amount within the range of about 0.05 wt % to about 99.95 wt %; and
one or more third organosiloxanes or organosilanes, each comprising at least about one silicon hydride functional group and at least about one reactive heterocycloalkyl functional group, present in an amount within the range of about 0.05 wt % to about 99.9999 wt %,
wherein if the one or more third organosiloxanes or organosilanes is absent, then both one or more first organosiloxanes or organosilanes and one or more second organosiloxanes or organosilanes are present in the polymerizable composition, and
an effective amount of a borane catalyst, present in an amount within the range of 0.0005 wt % to about 10 wt %,
wherein the ratio of reactive heterocycloalkyl functional groups to reactive silicon hydride functional groups in the composition is in the range of 1:5 to 5:1, and
polymerizing the polymerizable composition under conditions sufficient to cause silicon hydrides to hydrosilylate reactive heterocycloalkyl groups with ring opening to form silyl ethers, thereby providing crosslinks to the crosslinked silicone material.

16. A polymerized composition that is the polymerization product of a polymerizable composition comprising
one or more organosiloxanes or organosilanes, the one or more organosiloxanes or organosilanes comprising one or more of
one or more first organosiloxanes or organosilanes, each comprising a plurality of silicon hydride functional groups but lacking reactive heterocycloalkyl functional groups, present in an amount within the range of about 0.05 wt % to about 99.95 wt %;
one or more second organosiloxanes or organosilane, each comprising a plurality of reactive heterocycloalkyl functional groups but lacking reactive silicon hydride functional groups, present in an amount within the range of about 0.05 wt % to about 99.95 wt %; and
one or more third organosiloxanes or organosilanes, each comprising at least about one silicon hydride functional group and at least about one reactive heterocycloalkyl functional group, present in an amount within the range of about 0.05 wt % to about 99.9999 wt %,
wherein if the one or more third organosiloxanes or organosilanes is absent, then both one or more first organosiloxanes or organosilanes and one or more second organosiloxanes or organosilanes are present in the polymerizable composition, and
an effective amount of a borane catalyst, present in an amount within the range of 0.0005 wt % to about 10 wt %,
wherein the ratio of reactive heterocycloalkyl functional groups to reactive silicon hydride functional groups in the composition is in the range of 1:5 to 5:1, and
wherein the polymerization causes silicon hydrides to hydrosilylate reactive heterocycloalkyl groups with ring opening to form silyl ethers, thereby providing crosslinks to the crosslinked silicone material.

17. A polymerized composition according to claim 16, wherein the one or more first organosiloxanes or organosilanes is present in the polymerizable composition in an amount within the range of about 0.05 wt % to about 90 wt %, the one or more second organosiloxanes or organosilanes is present in the polymerizable composition in an amount within the range of about 0.05 wt % to about 90 wt %, and the polymerizable composition further comprises one or more tackifiers, present in an amount within the range of about 10 wt % to about 99.95 wt %.

18. An article comprising:
   a substrate; and
   a pressure-sensitive adhesive disposed on the substrate, wherein the pressure-sensitive adhesive is a polymerized product of a composition according to claim 16.

19. A polymerized composition according to claim 16, having a release force of no more than 200 gf/inch as measured by the PSTC 4 test procedure.

20. A polymerizable composition according to claim 1, having less than 1 wt % of one or more third organosiloxanes, each comprising at least about one silicon hydride functional group and at least about one reactive heterocycloalkyl functional group.

21. A polymerizable composition according to claim 1, having in the range of about 0.05 wt % to about 90 wt % of one or more third organosiloxanes, each comprising at least about one silicon hydride functional group and at least about one reactive heterocycloalkyl functional group.

22. A polymerized composition according to claim 16, wherein the one or more third organosiloxanes or organosilanes are present in the polymerizable composition in a total amount of about 25 wt % to about 99.5 wt %.

23. A polymerized composition according to claim 16, wherein at least one of the third organosiloxanes or organosilanes is a compound of Formula III-A:

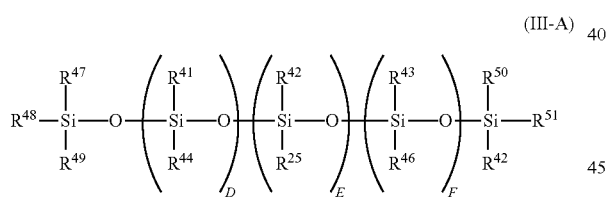

(III-A)

wherein:
each of $R^{41}$, $R^{42}$, $R^{43}$, $R^{47}$, and $R^{50}$ is independently $C_1$-$C_{60}$ (e.g., $C_1$-$C_6$ or $C_1$-$C_3$) hydrocarbon, hydrogen, $R^A$ or $R^B$;
$R^A$ is

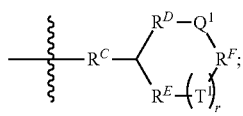

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;

$R^B$ is

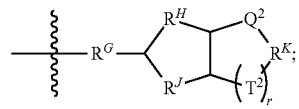

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0;
each of $R^{44}$, $R^{45}$, and $R^{46}$ is independently $C_1$-$C_{60}$ (e.g., $C_1$-$C_6$ or $C_1$-$C_3$) hydrocarbon;
each of $R^{49}$ and $R^{52}$ is independently $C_1$-$C_{60}$ (e.g., $C_1$-$C_6$ or $C_1$-$C_3$) hydrocarbon;
$R^{48}$ is O, or $C_1$-$C_{60}$ hydrocarbon;
$R^{51}$ is a covalent bond to $R^{48}$ if $R^{48}$ is O, or is otherwise $C_1$-$C_{60}$ (e.g., $C_1$-$C_6$ or $C_1$-$C_3$) hydrocarbon;
each of D, E, and F is independently 0-20,000, provided that at least one of D, E and F is not zero, provided that the molecule bears at least one reactive silicon hydride and at least one reactive heterocycloalkyl group.

24. A polymerized composition according to claim 16, wherein each heterocycloalkyl functional group is an epoxide.

25. A polymerized composition according to claim 16, wherein at least one of the first organosiloxanes or organosilanes is a compound of Formula I-A:

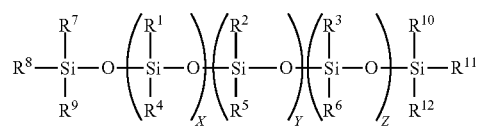

(I-A)

wherein:
each of $R^1$, $R^2$, and $R^3$ is independently hydrogen, $C_1$-$C_{60}$ (e.g., $C_1$-$C_6$ or $C_1$-$C_3$) hydrocarbon;
each of $R^4$, $R^5$, and $R^6$ is independently $C_1$-$C_{60}$ (e.g., $C_1$-$C_6$ or $C_1$-$C_3$) hydrocarbon;
each of $R^7$, $R^9$, $R^{10}$, and $R^{12}$ is independently hydrogen or $C_1$-$C_{60}$ (e.g., $C_1$-$C_6$ or $C_1$-$C_3$) hydrocarbon;
$R^8$ is hydrogen, O, or $C_1$-$C_{60}$ (e.g., $C_1$-$C_6$ or $C_1$-$C_3$) hydrocarbon;
$R^{11}$ is a covalent bond to $R^8$ if $R^8$ is O and is otherwise hydrogen or $C_1$-$C_{60}$ (e.g., $C_1$-$C_6$ or $C_1$-$C_3$) hydrocarbon; and
each of X, Y, and Z is independently 0-20,000, provided that at least one of X, Y and Z is not zero, and that the molecule bears at least two reactive silicon hydride groups.

26. A polymerized composition according to claim 16, wherein the one or more first organosiloxanes or organosilanes-comprise one or more of hydride-terminated PDMS; methylhydrosiloxane-dimethylsiloxane copolymer; polymethylhydrosiloxanes; and methylhydrogen silicone fluid (side chain type); 2,4,6,8-tetramethylcyclotetrasiloxane; and methylhydrosiloxane-phenylmethylsiloxane copolymer.

27. A polymerized composition according to claim 16, wherein at least one of the second organosiloxanes or organosilanes is a compound of Formula II-A:

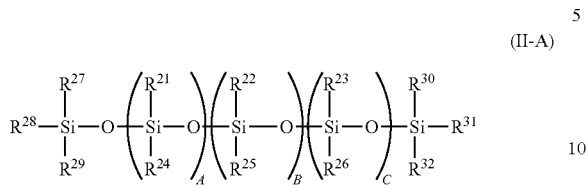

(II-A)

wherein:
each of $R^{21}$, $R^{22}$, $R^{23}$, $R^{27}$, and $R^{30}$ is independently $C_1$-$C_{60}$ (e.g., $C_1$-$C_6$ or $C_1$-$C_3$) hydrocarbon, $R^A$ or $R^B$;
$R^A$ is

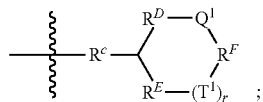

in which
each of $Q^1$ and $T^1$ is independently O, or S;
$R^C$ is $C_1$-$C_{20}$ hydrocarbonylene;
each of $R^D$ and $R^E$ is independently $C_1$-$C_6$ hydrocarbonylene or a covalent bond;
r is 0 or 1; and
$R^F$ is $C_1$-$C_6$ hydrocarbonylene;
$R^B$ is

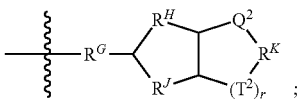

in which
each of $Q^2$ and $T^2$ is independently O, or S;
$R^G$ is $C_1$-$C_{20}$ hydrocarbonylene;
each of $R^H$ and $R^J$ is independently $C_1$-$C_5$ hydrocarbonylene;
r is 0 or 1;
$R^K$ is $C_1$-$C_6$ hydrocarbonylene if r is 1; and
$R^K$ is $C_1$-$C_6$ hydrocarbonylene or a covalent bond if r is 0;
each of $R^{24}$, $R^{25}$, and $R^{26}$ is independently $C_1$-$C_{60}$ (e.g., $C_1$-$C_8$ or $C_1$-$C_3$) hydrocarbon;
each of $R^{29}$ and $R^{32}$ is independently hydrogen or $C_1$-$C_{60}$ (e.g., $C_1$-$C_6$ or $C_1$-$C_3$) hydrocarbon;
$R^{28}$ is O, or $C_1$-$C_{60}$ hydrocarbon;
$R^{31}$ is a covalent bond to $R^{28}$ if $R^{28}$ is O, or is otherwise $C_1$-$C_{60}$ (e.g., $C_1$-$C_6$ or $C_1$-$C_3$) hydrocarbon;
each of A, B, and C is independently 0-20,000, provided that at least one of A, B and C is not zero, and that the molecule bears at least two reactive heterocycloalkyl groups.

28. A polymerized composition according to claim 16, wherein the one or more second organosiloxanes or organosilanes comprise one or more of epoxide-terminated polysiloxanes; epoxycyclohexylethylmethylsiloxane-dimethylsiloxane copolymer; 2,4,6,8-tetramethyl-2,4,6,8-tetrakis(propyl glycidyl ether)cyclotetrasiloxane; and epoxy-modified side-chain type silicone fluids (e.g., epoxypropoxypropyl)methylsiloxanesiloxane copolymer).

29. A polymerized composition according to claim 16, wherein the ratio of silicon hydride functional groups to reactive heterocycloalkyl functional groups in the polymerizable composition is within the range of 1:1.5 to 1.5:1.

30. A polymerized composition according to claim 16, wherein the ratio of hydrosilylatable ethylenic unsaturations to silicon hydride functional groups in the polymerizable composition is less than 0.05.

* * * * *